(12) United States Patent
Aragaki

(10) Patent No.: US 8,115,833 B2
(45) Date of Patent: Feb. 14, 2012

(54) IMAGE-ACQUISITION APPARATUS

(75) Inventor: Hideya Aragaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 481 days.

(21) Appl. No.: 12/067,479

(22) PCT Filed: Sep. 28, 2006

(86) PCT No.: PCT/JP2006/319296
§ 371 (c)(1),
(2), (4) Date: Feb. 10, 2009

(87) PCT Pub. No.: WO2007/037325
PCT Pub. Date: Apr. 5, 2007

(65) Prior Publication Data
US 2009/0167901 A1   Jul. 2, 2009

(30) Foreign Application Priority Data
Sep. 28, 2005   (JP) .................................. 2005-283021

(51) Int. Cl.
*H04N 5/217* (2011.01)
(52) U.S. Cl. ........ 348/241; 348/243; 348/246; 348/247; 348/223.1
(58) Field of Classification Search ............... 348/222.1, 348/223.1–229.1, 241, 243, 246, 247
See application file for complete search history.

(56) References Cited

U.S. PATENT DOCUMENTS

| 5,155,586 | A | 10/1992 | Levy et al. |
| 2005/0001907 | A1* | 1/2005 | Hoshuyama ............... 348/222.1 |
| 2005/0001913 | A1 | 1/2005 | Hoshuyama |
| 2005/0099515 | A1 | 5/2005 | Tsuruoka |
| 2005/0157189 | A1 | 7/2005 | Sambongi |
| 2005/0163371 | A1 | 7/2005 | Nystrom et al. |

FOREIGN PATENT DOCUMENTS

| JP | 05-227541 | 9/1993 |
| JP | 08-018852 | 1/1996 |
| JP | 2001-118062 | 4/2001 |
| JP | 2004-088149 | 3/2004 |
| JP | 2004-287794 | 10/2004 |

(Continued)

OTHER PUBLICATIONS

Stephen M. Pizer, et al., Adaptive Histogram Equalization and its Variations; Computer Vision, Graphics, and Image Processing, 1987, pp. 355-368, Academic Press.

(Continued)

*Primary Examiner* — Yogesh Aggarwal
(74) *Attorney, Agent, or Firm* — Volpe and Koenig, P.C.

(57) ABSTRACT

The object is to provide a uniform impression of noise for an entire image signal by performing grayscale conversion and noise reduction in a balanced manner. The signal processing unit performs first signal conversion on an image signal from an image-acquisition device and transfers the processed image signal to a correction-coefficient calculation unit. The correction-coefficient calculation unit calculates, on the basis of the image signal from the signal processing unit, an area correction coefficient for each area used for grayscale conversion of each area. A noise reducing unit uses the area correction coefficients calculated by the correction-coefficient calculation unit to perform noise reduction on the image signal from the image-acquisition device and transfers the processed signal to the signal processing unit. The signal processing unit performs grayscale conversion on the areas of the noise-reduced image signal and transfers the signal to the compressing unit using the area correction coefficients.

2 Claims, 42 Drawing Sheets

FOREIGN PATENT DOCUMENTS

| | | |
|---|---|---|
| JP | 2005-026962 | 1/2005 |
| JP | 2005-130297 | 5/2005 |

OTHER PUBLICATIONS

T.L. Ji, et al., Adaptive Image Contrast Enhancement Based on Human Visual Properties; 8197 IEEE Transactions on Medical Imaging 13; Dec. 1994, No. 4.

Dah-Chung Chang et al., Image Contrast Enhancement Based on a Histogram Transformation of Local Standard Deviation; IEEE Transaction on Medical Imaging, vol. 17, No. 4, Aug. 1998.

European Search Report dated May 29, 2009.

* cited by examiner

SIMPLIFICATION
OF NOISE MODEL $$N = \frac{N_{n+1} - N_n}{L_{n-1} - L_n}(l - L_n) + N_n$$

$$N = k_g \cdot N_l$$

METHOD OF CALCULATING
AMOUNT OF NOISE FROM
SIMPLIFIED NOISE MODEL

IMAGE-ACQUISITION APPARATUS

TECHNICAL FIELD

The present invention relates to an image-acquisition apparatus and an image-processing apparatus that carry out grayscale conversion and, more specifically, relates to an image-acquisition apparatus and an image-processing apparatus that control noise reduction such that the entire image signal has a uniform impression of noise.

BACKGROUND ART

In current digital still cameras and video cameras, the grayscale range (about 10 to 12 bits) of an image signal in input and processing systems is set larger than the grayscale range of the final output signal (normally 8 bits) to prevent degradation of the image quality caused by cancellation of digits during digital signal processing. In such a case, it is necessary to perform grayscale conversion so as to match the grayscale range of an output system, and usually, conversion is performed according to a fixed grayscale characteristic for a typical scene.

However, when an image signal having a grayscale range that is subjectively preferable for, for example, the human vision system, grayscale conversion must be performed for each area in the image signal (hereinafter, this is referred to as "space-variant grayscale conversion").

For example, Publication of Japanese Patent No. 3465226 discloses a method of adaptively performing grayscale conversion for areas obtained by dividing an image signal on the basis of texture information.

Noise reduction is typically performed on an image signal. For example, Japanese Unexamined Patent Application, Publication No. 2004-88149 discloses a method of performing noise reduction by estimating the amount of noise in each area in the image signal.

Patent Document 1:
Publication of Japanese Patent No. 3465226
Patent Document 2:
Japanese Unexamined Patent Application, Publication No. 2004-88149

DISCLOSURE OF INVENTION

According to the method in Publication of Japanese Patent No. 3465226, sufficient improvement is achieved even when the scene has a large light-to-dark ratio since space-variant grayscale conversion is performed. However, since the change in the amount of noise in each area differs, there is a problem in that the impression of noise in the entire image signal becomes unbalanced.

According to the method of Japanese Unexamined Patent Application, Publication No. 2004-88149, highly accurate noise reduction is possible by modeling the amount of noise on the basis of the image-acquisition device and image-acquisition conditions and appropriately estimating the amount of noise according to the signal-value level in an image signal. However, when space-variant grayscale conversion is performed, there is a problem in that the amount of noise cannot be accurately estimated because the change in the amount of noise in each area differs even when the signal-value level is the same.

When space-variant grayscale conversion is performed, the change in the amount of noise caused by the grayscale conversion differs in areas in the input image signal containing approximately the same amount of noise (for example, noise is reduced when it is multiplied by a gain of one or less). Therefore, a sense of unnaturalness is generated in the entire image signal.

The present invention provides an image-acquisition apparatus, an image processing apparatus, and an image processing program that can provide a uniform impression of noise in the entire image signal, even when grayscale conversion is performed, by performing grayscale conversion and noise reduction in a balanced manner.

Means for Solving the Problems

A first aspect of the present invention provides an image-acquisition apparatus for performing grayscale conversion on each area in an image, the image-acquisition apparatus including a first signal processing unit for performing first signal conversion on an image signal from an image-acquisition device; a correction-coefficient calculation unit for calculating area correction coefficients, which are correction coefficients for each area that are used for grayscale conversion of each area, from the image signal obtained through the first signal conversion; a noise reducing unit for performing noise reduction on the image signal from the image-acquisition device using the area correction coefficients; and a second signal processing unit for performing grayscale conversion on each area in the image signal obtained through the noise reduction using the area correction coefficients.

According to such a configuration, the first signal conversion is performed on the image signal from the image-acquisition device at the first signal conversion processing unit, and the area correction coefficients used for grayscale conversion in each area, i.e., the correction coefficients associated with space-variant grayscale conversion, are calculated on the basis of the image signal on which the first signal conversion has been performed. Next, noise reduction using the area correction coefficients is performed on the image signal from the image-acquisition device at the noise reducing unit, and subsequently, grayscale conversion of the areas using the area correction coefficients is performed on the noise-reduced image signal at the second signal processing unit.

In this way, correction coefficients associated with space-variant grayscale conversion are calculated for the image signal on which predetermined signal processing has been performed, and noise reduction and grayscale conversion are performed on the image signal from the image-acquisition device using the correction coefficients. Therefore, it is possible to reduce the sense of unnaturalness caused by a difference in the impression of noise in different enhanced areas when space-variant grayscale conversion is carried out. Furthermore, it is possible to perform highly accurate noise reduction since noise reduction is performed on the image signal from the image-acquisition device.

This aspect is described below by specifically associating it with an embodiment described below. The embodiment corresponding to this aspect is the first embodiment, and, for example, the first and second signal processing units of this aspect both correspond to the signal processing unit 105, which is shown in FIG. 1. More specifically, the second signal processing unit corresponds to the correction-coefficient multiplication unit 126, which is shown in FIG. 2. The calculation unit, for example, corresponds to the correction-coefficient calculation unit 106, which is shown in FIG. 1. The noise reducing unit, for example, corresponds to the noise reducing unit 109, which is shown in FIG. 1.

This aspect may be preferably used, for example, for an image-acquisition apparatus, which is shown in FIG. 1, to perform predetermined signal processing on an image signal from the image-acquisition device (lens system 100, CCD 101, and so on) at the signal processing unit 105; to calculate the correction coefficients associated with the space-variant grayscale conversion at the correction-coefficient calculation unit 106; to perform noise reduction, using the correction coefficients, on the image signal from the image-acquisition device at the noise reducing unit 109; and to perform grayscale conversion on the noise-reduced image signal at the correction-coefficient multiplication unit 126 (see FIG. 2) included in the signal processing unit 105.

A second aspect of the present invention provides an image-acquisition apparatus for performing grayscale conversion on each area in an image, the image-acquisition apparatus including a first signal processing unit for performing first signal conversion on an image signal from an image-acquisition device; a correction-coefficient calculation unit for calculating area correction coefficients, which are correction coefficients for each area that are used for grayscale conversion of each area, from the image signal obtained through the first signal conversion; a noise reducing unit for performing noise reduction on the image signal obtained through the first signal conversion using the area correction coefficients; and a second signal processing unit for performing grayscale conversion on each area in the image signal obtained through noise reduction using the area correction coefficients.

According to such a configuration, the first signal conversion is performed on the image signal from the image-acquisition device at the first signal conversion processing unit, and the area correction coefficients used for grayscale conversion in each area, i.e., the correction coefficients associated with space-variant grayscale conversion, are calculated on the basis of the image signal on which the first signal conversion has been performed. Next, noise reduction using the area correction coefficients is performed at the noise reducing unit on the image signal on which the first signal conversion has been performed, and subsequently, grayscale conversion of the areas is performed on the noise-reduced image signal at the second signal processing unit using the area correction coefficients.

In this way, correction coefficients associated with space-variant grayscale conversion are calculated for the image signal on which predetermined signal processing has been performed, and noise reduction and grayscale conversion are performed, using the correction coefficients, on the image signal on which predetermined signal processing has been performed. Therefore, it is possible to reduce the sense of unnaturalness caused by a difference in the impression of noise in different enhanced areas when space-variant grayscale conversion is carried out. Furthermore, it is possible to perform highly accurate noise reduction since noise reduction is performed on the image signal from the image-acquisition device. Furthermore, since the overall processing is performed sequentially, there is an advantage in that the image-acquisition apparatus is highly compatible with conventional signal processing systems and can be used for various apparatuses.

This aspect is described below by specifically associating it with an embodiment described below. The embodiment corresponding to this aspect is the second embodiment, whose overall structure is shown in FIG. 18, and, for example, the first signal processing unit of this aspect corresponds to the signal processing unit 200, which is shown in FIG. 18. The calculation unit, for example, corresponds to the correction-coefficient calculation unit 106. The noise reducing unit, for example, corresponds to the noise reducing unit 209. The second signal processing unit, for example, corresponds to the correction-coefficient multiplication unit 201.

This aspect may be preferably used, for example, for an image-acquisition apparatus, which is shown in FIG. 18, to perform predetermined signal processing on an image signal from the image-acquisition device at the signal processing unit 200; to calculate the correction coefficients associated with the space-variant grayscale conversion at the correction-coefficient calculation unit 106; to perform noise reduction using the correction coefficients on the image signal from the image-acquisition device at the noise reducing unit 209; and to perform grayscale conversion on the noise-reduced image signal at the correction-coefficient multiplication unit 201.

In the image-acquisition apparatus, the correction-coefficient calculation unit may include an extracting unit for extracting pixel values of pixels corresponding to the areas from the image signal obtained through the first signal conversion and may calculate the area correction coefficients on the basis of the pixel values of the pixels corresponding to the areas, the pixel values being extracted by the extracting unit.

According to such a configuration, pixel values of the pixels corresponding to the areas of the image signal on which predetermined image processing is performed are extracted at the extracting unit. Then, the area correction coefficients are calculated on the basis of the pixel values of the pixels corresponding to the areas extracted by the extracting unit. In this case, the extracting unit may extract target pixels and prescribed areas including the target pixels from the image signal obtained through the first signal conversion and may calculate the correction coefficients for the prescribed areas. In this way, the size of the prescribed areas can be changed. As a result, there is an advantage in that accuracy and processing speed can be adjusted, thus improving the flexibility of the processing.

In the image-acquisition apparatus, the correction-coefficient calculation unit may include a histogram calculation unit for calculating a histogram of the areas for the image signal corresponding to the areas extracted by the extracting unit and may calculate the area correction coefficients on the basis of the histogram.

According to such a configuration, a histogram of the areas for the image signal corresponding to the areas extracted by the extracting unit is calculated at the histogram calculation unit of the correction-coefficient calculation unit. Then, at the correction-coefficient calculation unit, the area correction coefficients are calculated on the basis of the histogram. In this way, since the correction coefficients associated with grayscale conversion are calculated on the basis of the histogram, optimal grayscale conversion for each area is possible, and a high-quality image signal can be obtained.

In the image-acquisition apparatus, the first signal processing unit may include a reduction-ratio setting unit for setting a reduction ratio for the image signal from the image-acquisition device and a reduced-image creating unit for creating a reduced-image signal on the basis of the reduction ratio, and performs the first signal conversion by performing signal conversion on the reduced-image signal, and the correction-coefficient calculation unit may first calculate uncorrected area correction coefficients from the image signal obtained through the first signal conversion and then calculate the area correction coefficients by correcting the uncorrected area correction coefficients on the basis of the reduction ratio such that the area correction coefficients correspond to the image signal from the image-acquisition device.

According to such a configuration, the reduction-ratio setting unit sets an arbitrary reduction ratio, and a reduced image (reduced-size image) is created at the reduced-image creating unit on the basis of the set reduction ratio. Then, the correction-coefficient calculation unit calculates uncorrected area correction coefficients from the reduced-image signal on which the first signal conversion has been performed and then calculates the area correction coefficients corresponding to the image signal from the image-acquisition device by expanding and correcting the uncorrected area correction coefficients to correspond to the image signal from the image-acquisition device (i.e., the original image signal).

In this way, since a reduced-image signal is created from the original image signal and uncorrected correction coefficients are calculated using this reduced-image signal, the processing speed can be increased. Moreover, since the reduction-ratio setting unit for setting the reduction ratio is provided, an arbitrary reduction ratio can be set. As a result, image quality and processing time can be adjusted, and thus improving the flexibility of the processing.

In the image-acquisition apparatus, the noise reducing unit may include a noise-estimating unit for estimating an amount of noise in the image signal from the image-acquisition device and a smoothing unit for performing smoothing on the basis of the amount of noise and the area correction coefficients, and may perform noise reduction by smoothing.

According to such a configuration, noise reduction is performed by estimating the amount of noise in the image signal from the image-acquisition device at the noise reducing unit and performing smoothing on the image signal on the basis of the amount of noise and the area correction coefficients.

In this way, since the noise reducing unit corrects the estimated amount of noise on the basis of the area correction coefficients, noise enhanced in each area by grayscale conversion can be reduced in a balanced manner. In such a case, it is possible to perform accurate noise reduction by estimating the amount of noise for each area extracted by the extracting unit using the noise-estimating unit.

In the image-acquisition apparatus, the noise reducing unit may include a noise-estimating unit for estimating an amount of noise in the image signal obtained through the first signal conversion and a smoothing unit for performing smoothing on the basis of the amount of noise and the area correction coefficients, and may perform noise reduction by smoothing.

According to such a configuration, the amount of noise in the image signal obtained through the first signal conversion is estimated by the noise-estimating unit, and the smoothing unit performs smoothing on the image signal obtained through the first signal conversion on the basis of the amount of noise and the area correction coefficients. In this way, noise reduction is performed.

In this way, since the noise reducing unit corrects the estimated amount of noise on the basis of the area correction coefficients, noise enhanced in each area by grayscale conversion can be reduced in a balanced manner. In such a case, it is possible to perform accurate noise reduction by estimating the amount of noise for each area extracted by the extracting unit using the noise-estimating unit.

The image-acquisition apparatus may further include a noise-model storing unit for storing a reference noise model for estimating the amount of noise according to a change in at least one of the image-acquisition device, ISO sensitivity, a color signal, and the area correction coefficients, wherein the noise-estimating unit may estimate the amount of noise using the reference noise model.

According to such a configuration, since the amount of noise is estimated by using a reference noise model for estimating the amount of noise according to a change in at least one of the image-acquisition device, ISO sensitivity, a color signal, and the area correction coefficients, it is possible to estimate, in a highly accurate manner, the amount of noise that corresponds to the image-acquisition device, ISO sensitivity, a color signal, and the area correction coefficients.

In the image-acquisition apparatus, the reference noise model may be obtained by deriving a function in which a signal-value level of an image signal to be processed and the area correction coefficients are independent variables.

In this way, by using the reference noise model that is obtained by deriving a function in which a signal-value level of an image signal to be processed and the area correction coefficients are independent variables, it is possible to estimate, in a highly accurate manner, the amount of noise on the basis of the signal-value level and the area correction coefficients.

In the image-acquisition apparatus, the reference noise model may be obtained by deriving a function in which a signal-value level of an image signal to be processed and the area correction coefficients are independent variables, the function being derived according to at least one of linear approximation, logarithmic approximation, and polynomial approximation.

In this way, by using a reference noise model that is obtained by deriving a function in which a signal-value level of an image signal to be processed and the area correction coefficients are independent variables according to at least one of linear approximation, logarithmic approximation, and polynomial approximation, the accuracy of the noise model can be improved, and it is possible to obtain a high-quality image signal. By deriving a function, the cost of the system can be reduced.

In the image-acquisition apparatus, the first signal processing unit may perform the first signal conversion and at least one of white balance processing, interpolation, chroma enhancement, and edge enhancement.

According to such a configuration, since the first signal processing unit performs at least one of white balance processing, interpolation, chroma enhancement, and edge enhancement in addition to the first signal conversion, the image signal from the image-acquisition device can be suitably adjusted.

In the image-acquisition apparatus, the first signal processing unit may include an edge-enhancement processing unit for performing the first signal conversion and edge enhancement, and the edge-enhancement processing unit may include an edge-enhancement-coefficient calculation unit for calculating edge enhancement coefficients from an image signal to be processed and an edge enhancement unit for performing edge enhancement on the image signal to be processed on the basis of the edge enhancement coefficients.

According to such a configuration, the first signal processing unit includes the edge-enhancement processing unit for performing edge enhancement in addition to first signal conversion. Edge enhancement coefficients are calculated from the image signal to be processed at this edge-enhancement processing unit, and edge enhancement on the image signal to be processed at the edge enhancement unit on the basis of the edge enhancement coefficients is performed.

In this way, since edge enhancement coefficients are calculated from the image signal and edge enhancement is performed on the basis of the edge enhancement coefficients, the effect of edge enhancement can be adjusted at the edge portions and the flat portions, and a high-quality image signal can be obtained.

In the image-acquisition apparatus, the edge-enhancement processing unit may further include an edge-correction-coefficient calculation unit for calculating edge correction coefficients from the edge enhancement coefficients, and the noise reducing unit may perform noise reduction using the area correction coefficients and the edge correction coefficients.

According to such a configuration, edge correction coefficients are calculated at the edge-correction-coefficient calculation unit from the edge enhancement coefficients calculated at the edge-enhancement-coefficient calculation unit, and noise reduction is performed at the noise reducing unit using the edge correction coefficients and the area correction coefficients. In this way, by performing noise reduction on the basis of the area correction coefficients, the balance between the different impressions of noise in the prescribed areas caused by grayscale conversion can be improved.

Since the edge enhancement unit performs edge enhancement on the basis of the edge correction coefficients, the effect of edge enhancement can be adjusted at the edge portions and the flat portions, and a high-quality image signal can be obtained.

In the image-acquisition apparatus, the second signal processing unit may perform grayscale conversion on each area by multiplying the image signal obtained through noise reduction by the area correction coefficients.

According to such a configuration, the second signal processing unit performs grayscale conversion on the areas by multiplying the image signal obtained through noise reduction by the area correction coefficients. In this way, since grayscale conversion is performed by multiplication, it is possible to increase the processing speed.

A third aspect of the present invention provides an image processing apparatus for performing grayscale conversion on each area in an image, the image processing apparatus including a correction-coefficient calculation unit for calculating area correction coefficients, which are correction coefficients for each area that are used for grayscale conversion of each area, from a first image signal; a conversion unit for performing grayscale conversion of each area in the first image signal using the area correction coefficients; and a noise reducing unit for performing noise reduction on the first image signal obtained through the grayscale conversion using the area correction coefficients.

According to such a configuration, correction coefficients associated with space-variant grayscale conversion are calculated for the image signal on which predetermined image processing is performed, and grayscale conversion and noise reduction are performed using the correction coefficients at the conversion unit and the noise reducing unit, respectively.

In this way, it is possible to reduce the sense of unnaturalness caused by a difference in the impression of noise in different enhanced areas when space-variant grayscale conversion is carried out.

This aspect is described below by specifically associating it with an embodiment described below. The embodiment corresponding to this aspect is the third embodiment, whose overall structure is shown in FIG. 25, and, for example, the correction-coefficient calculation unit of this aspect corresponds to the correction-coefficient calculation unit 106. The conversion unit, for example, corresponds to the signal processing unit 105. The noise reducing unit corresponds to, for example, the noise reducing unit 209.

This aspect may be preferably used, for example, for an image processing apparatus, which is shown in FIG. 25, to calculate correction coefficients associated with space-variant grayscale conversion at the correction-coefficient calculation unit 106 from an image signal on which predetermined image processing is performed, to perform grayscale conversion using the correction coefficients at the signal processing unit 105, and to perform noise reduction using the correction coefficients at the noise reducing unit 209.

In the image processing apparatus, the correction-coefficient calculation unit may include an extracting unit for extracting a second image signal, corresponding to the areas, from the first image signal and may calculate the area correction coefficients on the basis of the second image signal, corresponding to the areas, which is extracted by the extracting unit.

According to such a configuration, pixel values of pixels corresponding to areas are extracted at the extracting unit from the image signal on which predetermined image processing is performed. Then, area correction coefficients are calculated on the basis of the image signal corresponding to the areas extracted by the extracting unit or on the basis of, for example, pixel values of the pixels corresponding to the areas. In such a case, the extracting unit may extract target pixels and prescribed areas including the target pixels from the image signal obtained through the first signal conversion and may calculate the correction coefficients for each prescribed area.

In this way, it is possible to change the size of the prescribed areas. As a result, the extracting unit may extract target pixels and prescribed areas including the target pixels from the image signal obtained through the first signal conversion and calculate correction coefficients for each prescribed area.

In this way, the size of the prescribed areas can be changed. As a result, there is an advantage in that accuracy and processing speed can be adjusted, thus improving the flexibility of the processing.

In the image processing apparatus, the correction-coefficient calculation unit may include a histogram calculation unit for calculating a histogram of the areas from the second image signal, corresponding to the areas, which is extracted by the extracting unit and may calculate the area correction coefficients on the basis of the histogram.

According to such a configuration, a histogram of the areas from the second image signal corresponding to the areas, which is extracted by the extracting unit, is calculated at the histogram calculation unit of the correction-coefficient calculation unit. Then, the area correction coefficients are calculated on the basis of the histogram at the correction-coefficient calculation unit. In this way, since correction coefficients associated with grayscale conversion are calculated on the basis of the histogram, it is possible to perform optimal grayscale conversion for each area and obtain a high-quality image signal.

The image processing apparatus may further include a reduction-ratio setting unit for setting a reduction ratio for the first image signal; and a reduced-image creating unit for creating a reduced-image signal on the basis of the reduction ratio, wherein the correction-coefficient calculation unit may first calculate uncorrected area correction coefficients from the reduced-image signal and then calculate the area correction coefficients by correcting the uncorrected area correction coefficients on the basis of the reduction ratio such that the area correction coefficients correspond to the first image signal.

According to such a configuration, an arbitrary reduction ratio is set by the reduction-ratio setting unit and a reduced image is created on the basis of the set reduction ratio at the reduced-image creating unit. Then, the correction-coefficient calculation unit calculates uncorrected area correction coefficients on the basis of the reduced-image signal and calculates the area correction coefficients by expanding and correcting the uncorrected area correction coefficients to correspond to the unreduced image signal on which predetermined image processing has been performed.

In this way, since a reduced-image signal is created from the image signal on which predetermined image processing has been performed and uncorrected area correction coefficients are calculated using the reduced-image signal, the processing speed can be increased. Moreover, since the reduction-ratio setting unit for setting a reduction ratio is included, it is possible to set an arbitrary reduction ratio. Therefore, image quality and processing time can be adjusted thus improving the flexibility of the processing.

In the image processing apparatus, the noise reducing unit may include a noise-estimating unit for estimating an amount of noise in the first image signal obtained through the grayscale conversion and a smoothing unit for performing smoothing on the basis of the amount of noise and the area correction coefficients, and may perform noise reduction by smoothing.

According to such a configuration, noise reduction is performed by estimating the amount of noise in an image signal obtained through grayscale conversion at the noise-estimating unit and performing smoothing based on the amount of noise and the area correction coefficients at the smoothing unit on the image signal obtained by grayscale conversion.

In this way, since the estimated amount of noise is corrected on the basis of the area correction coefficients at the noise reducing unit, noise enhanced by grayscale conversion in each area can be reduced in a balanced manner. In such a case, it is possible to perform accurate noise reduction by estimating the amount of noise for each area extracted by the extracting unit at the noise-estimating unit.

The image processing apparatus may further include a noise-model storing unit for storing a reference noise model for estimating the amount of noise according to a change in at least one of the image-acquisition device, ISO sensitivity, a color signal, and the area correction coefficients, wherein the noise-estimating unit may estimate the amount of noise using the reference noise model.

According to such a configuration, since the amount of noise is estimated using a reference noise model for estimating the amount of noise according to a change in at least one of the image-acquisition device, ISO sensitivity, a color signal, and the area correction coefficients, it is possible to estimate in a highly accurate manner the amount of noise according to the image-acquisition device, ISO sensitivity, a color signal, and the area correction coefficients.

In the image processing apparatus, the reference noise model may be obtained by deriving a function in which a signal-value level of an image signal to be processed and the area correction coefficients are independent variables, the function being derived according to at least one of linear approximation, logarithmic approximation, and polynomial approximation.

In this way, by using a reference noise model that is obtained by deriving a function in which a signal-value level of an image signal to be processed and the area correction coefficients are independent variables according to at least one of linear approximation, logarithmic approximation, and polynomial approximation, the accuracy of the noise model can be improved, and it is possible to obtain a high-quality image signal. By deriving a function, the cost of the system can be reduced.

In the image processing apparatus, the reference noise model may be obtained by deriving a function in which a signal-value level of an image signal to be processed and the area correction coefficients are independent variables.

In this way, by using the reference noise model that is obtained by deriving a function in which the signal-value level of an image signal to be processed and the area correction coefficients are independent variables, it is possible to estimate in a highly accurate manner the amount of noise on the basis of the signal-value level and the area correction coefficients.

In the image processing apparatus, the conversion unit may include an edge-enhancement processing unit for performing edge enhancement and grayscale conversion on each area, and the edge-enhancement processing unit may include an edge-enhancement-coefficient calculation unit for calculating edge enhancement coefficients from the first image signal and an edge enhancement unit for performing edge enhancement on the first image signal on the basis of the edge enhancement coefficients.

According to such a configuration, the conversion unit includes edge-enhancement processing unit for performing edge enhancement in addition to grayscale conversion. Edge enhancement coefficients are calculated from the image signal on which predetermined image processing is performed at the edge-enhancement processing unit, and edge enhancement based on the edge enhancement coefficients is performed on the image signal on which predetermined image processing is performed at the edge enhancement unit.

In this way, since edge enhancement coefficients are calculated from the image signal and edge enhancement is performed on the basis of the edge enhancement coefficients, the effect of edge enhancement can be adjusted at the edge portions and the flat portions, and a high-quality image signal can be obtained.

In the image processing apparatus, the edge enhancement unit may further include an edge-correction-coefficient calculation unit for calculating edge correction coefficients from the edge enhancement coefficients, and the noise reducing unit may perform noise reduction using the area correction coefficients and the edge correction coefficients.

According to such a configuration, edge correction coefficients are calculated at the edge-correction-coefficient calculation unit from the edge enhancement coefficients calculated at the edge-enhancement-coefficient calculation unit, and noise reduction using the edge correction coefficients and the area correction coefficients is performed at the noise reducing unit. In this way, by performing noise reduction on the basis of the area correction coefficients, the balance between the different impressions of noise in the prescribed areas caused by grayscale conversion can be improved.

Since the edge enhancement unit performs edge enhancement on the basis of the edge correction coefficients, the effect of edge enhancement can be adjusted at the edge portions and the flat portions, and a high-quality image signal can be obtained.

In the image processing apparatus, the conversion unit may perform grayscale conversion on each area by multiplying the first image signal by the area correction coefficients.

According to such a configuration, the conversion unit performs grayscale conversion of each area by multiplying the image signal on which predetermined image processing is performed by the area correction coefficients. In this way, since grayscale conversion is performed by multiplication, it is possible to increase the processing speed.

A fourth aspect of the present invention provides an image processing program for instructing a computer to perform grayscale conversion on each area in an image, the program including the steps of performing first signal conversion on an image signal from an image-acquisition device; calculating area correction coefficients, which are correction coefficients for each area that are used for grayscale conversion of each area, from the image signal obtained through the first signal conversion; performing noise reduction using the area correction coefficients on the image signal from the image-acquisition device; and performing grayscale conversion using the area correction coefficients on each area in the image signal obtained through the noise reduction.

A fifth aspect of the present invention provides an image processing program for instructing a computer to perform grayscale conversion on each area in an image, the program including the steps of performing first signal conversion on an image signal from an image-acquisition device; calculating area correction coefficients, which are correction coefficients for each area that are used for grayscale conversion of each area, from the image signal obtained through the first signal conversion; performing noise reduction on the image signal obtained through the first signal conversion using the area correction coefficients; and performing grayscale conversion using the area correction coefficients on each area in the image signal obtained through noise reduction.

A sixth aspect of the present invention provides an image processing program for instructing a computer to perform grayscale conversion on each area in an image, the program including the steps of calculating area correction coefficients, which are correction coefficients for each area that are used for grayscale conversion of each area, from the image signal; performing grayscale conversion on each area in the image signal using the area correction coefficients; and performing noise reduction using the area correction coefficients on the image signal obtained through grayscale conversion.

In the image processing program, the first signal conversion may include an edge enhancement step of performing edge enhancement, and the edge enhancement step includes the steps of calculating edge enhancement coefficients from an image signal to be processed, and performing edge enhancement on the image signal to be processed on the basis of the edge enhancement coefficients.

In the image processing program, the edge enhancement further may include the step of calculating edge correction coefficients from the edge enhancement coefficients, and, in the noise reduction step, noise reduction may be performed using the area correction coefficients and the edge correction coefficients.

A seventh aspect of the present invention provides an image processing apparatus for performing grayscale conversion, the image processing apparatus including a calculation unit for calculating correction coefficients used for the grayscale conversion from an image signal; a noise reducing unit for performing noise reduction on the image signal using the correction coefficients; and a conversion unit for performing the grayscale conversion on the noise-reduced image signal using the correction coefficients.

According to these configurations, since correction coefficients associated with grayscale conversion are calculated for an image signal on which predetermined image processing is performed and noise reduction and grayscale conversion are performed using the correction coefficients, the sense of unnaturalness caused by a difference in the impression of noise in the pixels can be reduced.

This aspect is described below by specifically associating it with an embodiment described below. The embodiments corresponding to this aspect are the first, second, fourth, and fifth embodiments whose overall structures are shown in FIGS. 1, 18, 32, and 37. For example, the calculation unit of this aspect corresponds to the correction-coefficient calculation unit 106, which is shown in FIG. 1 or 18, or the correction-coefficient calculation unit 501, which is shown in FIG. 32 or 37. The noise reducing unit corresponds to, for example, noise reducing unit 209. The conversion unit corresponds to, for example, signal processing unit 105, 200, 500, or 504 or the correction-coefficient multiplication unit 126 or 201.

This aspect may be preferably used, for example, for an image processing apparatus, which is shown in FIG. 1, to calculate correction coefficients associated with grayscale conversion for each pixel or each prescribed area at the correction-coefficient calculation unit 106, which is shown in FIG. 1, from an image signal on which predetermined image processing is carried out, to perform noise reduction on the image signal using correction coefficients at the noise reducing unit 109, and to perform grayscale conversion on the noise-reduced image signal using the correction coefficients at the signal processing unit 105 and the correction-coefficient multiplication unit 126 (see FIG. 2).

An eighth aspect of the present invention provides an image processing apparatus for performing grayscale conversion, the image processing apparatus including a calculation unit for calculating correction coefficients used for the grayscale conversion from an image signal; a conversion unit for performing the grayscale conversion on the image signal using the correction coefficients; and a noise reducing unit for performing noise reduction on the image signal converted by the conversion unit using the correction coefficients.

According to such a configuration, since correction coefficients associated with grayscale conversion are calculated for an image signal on which predetermined image processing is performed and noise reduction and grayscale conversion are performed using the correction coefficients, the sense of unnaturalness caused by a difference in the impression of noise in the pixels can be reduced.

This aspect is described below by specifically associating it with an embodiment described below. The embodiments corresponding to this aspect are the third and sixth embodiments whose overall structures are shown in FIGS. 25 and 41. For example, the calculation unit of this aspect corresponds to, for example, the correction-coefficient calculation unit 106, which is shown in FIG. 25, or the correction-coefficient calculation unit 501, which is shown in FIG. 41. The conversion unit corresponds to, for example, the signal processing unit 105 or 500. The noise reducing unit corresponds to, for example, the noise reducing unit 209.

This aspect may be preferably used, for example, for an image processing apparatus, which is shown in FIG. 25, to calculate correction coefficients associated with grayscale conversion for each pixel or each prescribed area at the correction-coefficient calculation unit 106 from an image signal on which predetermined image processing is carried out, to perform grayscale conversion on the image signal using the correction coefficients at the signal processing unit 105, and to perform noise reduction on the grayscale-converted image signal using the correction coefficients at the noise reducing unit 209.

In the image processing apparatus, the noise reducing unit may include noise estimation unit for estimating an amount of noise of the image signal, and smoothing unit for performing smoothing on the basis of the amount of noise and the correction coefficients.

According to this configuration, the amount of noise in the image signal is estimated, and noise reduction is performed on the basis of the amount of noise and the correction coefficients. In this way, for example, accurate noise reduction can be performed by estimating the amount of noise of each area. Moreover, since the estimated amount of noise is corrected on the basis of the correction coefficients, noise enhanced in each area by grayscale conversion can be reduced in a balanced manner.

In the image processing apparatus, the noise estimation unit may include a recording unit for recording at least one reference noise model corresponding to an image-acquisition device, ISO sensitivity, a color signal, and correction coefficients.

According to such a configuration, since the amount of noise is estimated using a reference noise model corresponding to the image-acquisition device, ISO sensitivity, a color signal, and the correction coefficients, it is possible to estimate in a highly accurate manner the amount of noise according to the image-acquisition device, ISO sensitivity, a color signal, and the correction coefficients.

In the image processing apparatus, the conversion unit may include an edge-enhancement-coefficient calculation unit for calculating edge enhancement coefficients from the image signal, an edge-correction-coefficient calculation unit for calculating edge correction coefficients from the edge enhancement coefficients, and an edge enhancement unit for performing edge enhancement on the image signal on the basis of the edge enhancement coefficients.

According to such a configuration, since the edge enhancement coefficients and the edge correction coefficients are calculated from the image signal and edge enhancement is performed on the basis of edge enhancement coefficients, the effect of edge enhancement can be adjusted at the edge portions and the flat portions, and a high quality image signal can be obtained.

In the image processing apparatus, the noise reducing unit may perform noise reduction on the basis of the correction coefficients and the edge correction coefficients.

According to such a configuration, since noise reduction is performed on the basis of the correction coefficients and the edge correction coefficients, the balance of the different impressions of noise due to grayscale conversions between each pixel can be improved, and effect of the noise reduction can be adjusted between the enhanced edge portions and flat portions.

A ninth aspect of the present invention provides an image processing method for performing grayscale conversion, the image processing method including the steps of calculating correction coefficients used for the grayscale conversion from an image signal; performing noise reduction on the image signal using the correction coefficients; and performing grayscale conversion on the noise-reduced image signal using the correction coefficients.

A tenth aspect of the present invention provides an image processing method for performing grayscale conversion, the image processing method comprising the steps of calculating correction coefficients used for the grayscale conversion from an image signal; performing grayscale conversion on the image signal using the correction coefficients; and performing noise reduction on the converted image signal using the correction coefficients.

The present invention has an advantage in that a uniform impression of noise is provided in the entire image signal even when grayscale conversion is performed by performing grayscale conversion and noise reduction in a balanced manner.

Furthermore, the above-described image processing apparatus according to each aspect is an apparatus having a function of processing image data and can be suitably used for, for example, an image-acquisition apparatus, such as a digital still camera.

EXPLANATION OF REFERENCE SIGNS

Figure 1:
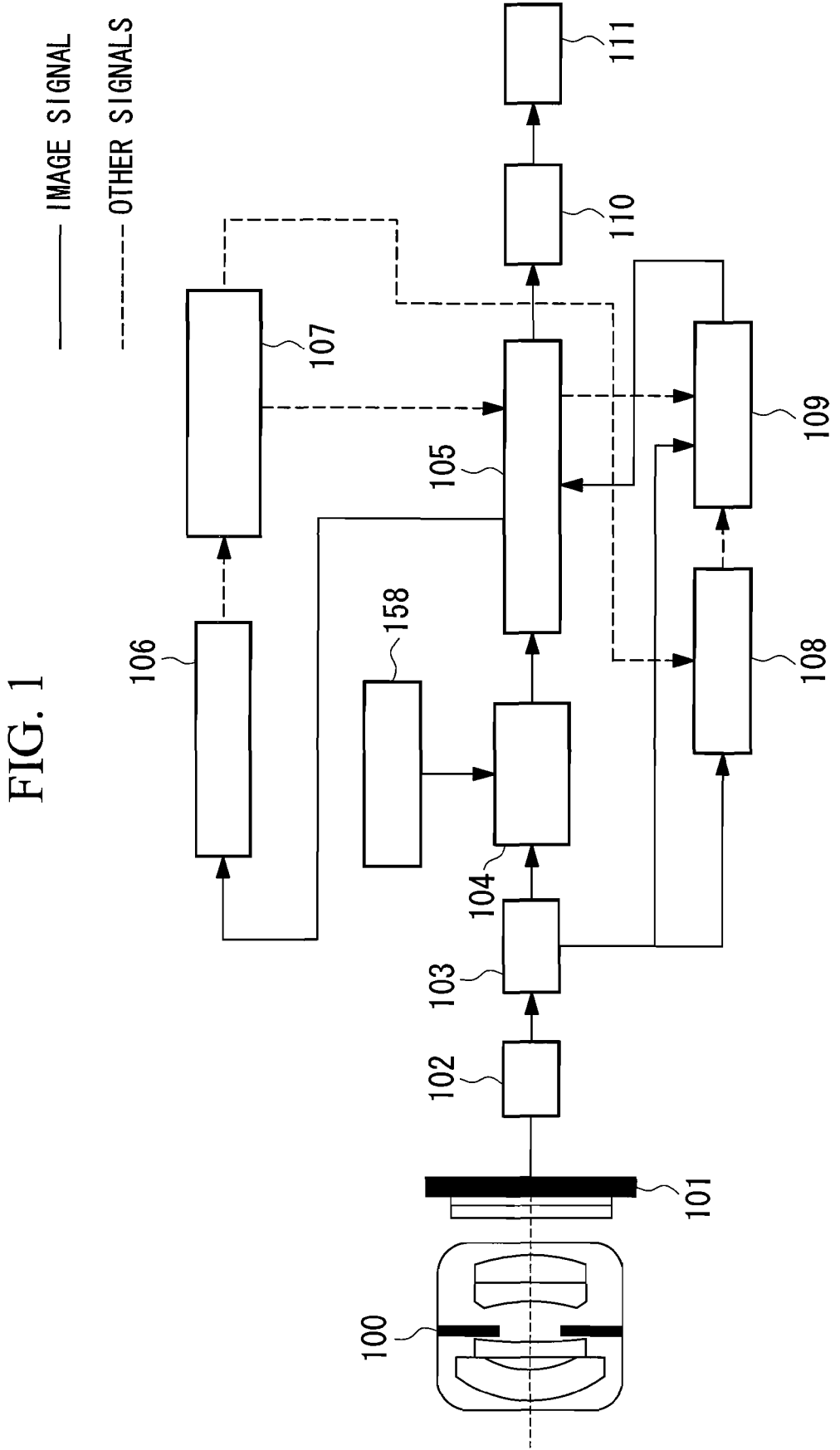
FIG. 1 is a block diagram of the overall structure of an image-acquisition apparatus according to a first embodiment of the present invention.

104: reduced-image creating unit
105 and 200: signal processing unit
106: correction-coefficient calculation unit
107: correction-coefficient map buffer
108 and 208: noise estimating unit
109 and 209: noise reducing unit
120: WB unit
121: correction unit
122: chroma adjustment unit
123: grayscale conversion unit
124: Y/C separation unit
125: edge enhancement processing unit
126 and 201: correction-coefficient multiplication unit
132: filter ROM
133: filter processing unit
134: edge-correction-coefficient calculation ROM
135: edge-correction-coefficient calculation unit
137: edge enhancement unit

BEST MODE FOR CARRYING OUT THE INVENTION

Embodiments of an image-acquisition apparatus according to the present invention will be described below with reference to the drawings.

First Embodiment

FIG. 1 is a block diagram of an example configuration of an image-acquisition apparatus according to a first embodiment of the present invention. In FIG. 1, a lens system 100 and a CCD 101 are disposed in this order along the optical axis. The CCD 101 is connected to an A/D converter 102. The A/D converter 102 is connected to a buffer 103. The buffer 103 is connected to a reduced-image creating unit 104, a noise estimating unit 108, and a noise reducing unit 109. A reduction-ratio setting unit 158 is connected to the reduced-image creating unit 104. The reduced-image creating unit 104 is connected to a signal processing unit 105. The signal processing unit 105 is connected to a correction-coefficient calculation unit 106, the noise reducing unit 109, and a compressing unit 110. The correction-coefficient calculation unit 106 is connected to a correction-coefficient map buffer 107. The correction-coefficient map buffer 107 is connected to the signal processing unit 105 and the noise estimating unit 108. The noise estimating unit 108 is connected to the noise reducing unit 109. The noise reducing unit 109 is connected to the signal processing unit 105. The compressing unit 110 is connected to an output unit 111, such as a memory card.

Next, the operation of the image-acquisition apparatus having the above-described configuration will be briefly described.

When the user pushes a shutter button (not shown) after image-acquisition conditions, such as ISO sensitivity, are set via an external I/F (not shown), a subject image formed by the lens system 100 is converted from an optical subject into an electric signal by the CCD 101 and is output as an analog signal. The CCD 101 according to this embodiment is assumed to be a single-chip CCD having a Bayer primary-color filter disposed on the front surface. The analog signal is converted into a digital signal at the A/D converter 102 and is transferred to the buffer 103. In this embodiment, the A/D converter 102 is assumed to convert an analog signal into a digital signal according to a 12-bit grayscale.

An image signal in the buffer 103 (hereinafter, an image signal transferred from the A/D converter 102 is referred to as "original image signal") is first transferred to the reduced-image creating unit 104. With the aim of increasing the speed of correction coefficient calculation, the reduced-image creating unit 104 creates a reduced-image signal from the image signal on the basis of a reduction ratio that has been set for correction coefficient calculation in the reduction-ratio setting unit 158. As a method of reducing an image, for example, any down-sampling method of the related art may be employed. By setting the reduction ratio to be high or equal magnification to the image signal, emphasis may be placed on the accuracy of the correction coefficient calculation. A reduced-image signal produced in this way is transferred to the signal processing unit 105.

The signal processing unit 105 reads out the reduced-image signal from the reduced-image creating unit 104 and generates an image signal by carrying out WB adjustment, interpolation, chroma enhancement, grayscale conversion, and edge enhancement.

More specifically, the signal processing unit 105 carries out WB adjustment on the input image signal, generates a triple-chip image signal by interpolation, and then carries out chroma enhancement and grayscale conversion. Subsequently, Y/C separation is carried out on the basis of Equations (1); an edge component is calculated from the converted luminance signal Y; edge enhancement is carried out on the basis of the edge component; and the edge-enhanced image signal is transferred to the correction-coefficient calculation unit 106.

$$Y=0.29900R+0.58700G+0.11400B$$

$$Cb=-0.16874R-0.33126G+0.50000B$$

$$Cr=0.50000R-0.41869G-0.08131B \qquad (1)$$

Subsequently, the signal processing unit 105 calculates an edge enhancement coefficient from the edge component that has been calculated for the reduced image and calculates an edge correction coefficient from the edge enhancement coefficient. The edge correction coefficient corresponds to a pixel of the original-image signal and is used for noise reduction to be carried out later. Details will be described below.

The correction-coefficient calculation unit 106 extracts rectangular areas of a predetermined size centered on a target pixel, which, for example, in this embodiment, are each a prescribed area of 16 by 16 pixel units. The correction-coefficient calculation unit 106 sets a grayscale conversion curve on the basis of a histogram of the extracted prescribed areas and determines correction coefficients associated with the target pixels by carrying out grayscale conversion based on the conversion curve. Subsequently, the correction-coefficient calculation unit 106 calculates correction coefficients for pixels of the original image signal (hereinafter these correction coefficients are referred to as "area correction coefficients") corresponding to pixels of the reduced image on the basis of the reduction ratio of the reduced-image signal and records the correction coefficients in the correction-coefficient map buffer 107. In this way, area correction coefficients corresponding to the pixels of the original image signal are recorded in the correction-coefficient map buffer 107. The area correction coefficients are used for noise reduction and signal processing (correction coefficient multiplication) described below.

Next, the noise estimating unit 108 obtains the original image signal from the buffer 103 and extracts, from the original image signal, a rectangular area of a predetermined size centered on a target pixel, which is, for example, a prescribed area of 6 by 6 pixel units in this embodiment. Subsequently, an area correction coefficient is obtained from the correction-coefficient map buffer 107; the amount of noise in the target pixel extracted from the prescribed area is estimated on the basis of the area correction coefficient and the ISO sensitivity set by the external I/F during image acquisition; and the estimated amount of noise is transferred to the noise reducing unit 109.

The noise reducing unit 109 obtains the original image signal from the buffer 103, carries out noise reduction on the target pixels in the original image signal on the basis of the edge correction coefficients calculated by the signal processing unit 105 and the amounts of noise estimated by the noise estimating unit 108, and transfers the noise-reduced image signal to the signal processing unit 105.

Upon reception of the noise-reduced image signal from the noise reducing unit 109, the signal processing unit 105 carries out processing on the image signal, such as WB adjustment, interpolation, chroma enhancement, grayscale conversion, Y/C separation, and edge enhancement. Furthermore, the signal processing unit 105 carries out correction on the processed image signal on the basis of the area correction coefficients obtained from the correction-coefficient map buffer 107. At this time, if the level of the corrected image exceeds a specific level, the level of the image signal is corrected by clipping so that the level is within a specific range. Then, when all of the pixels are corrected, the signal processing unit 105 transfers the final image signal to the compressing unit 110.

The compressing unit 110 converts the processed image signal into an RGB signal on the basis of Equations (2), then carries out compression according to the related art, and transfers the compressed RGB signal to the output unit 111.

$$R=Y+1.40200Cr$$

$$G=Y-0.34414Cb-0.71414Cr$$

$$B=Y+1.77200Cb \qquad (2)$$

The output unit 111 records the image signal on a memory card or the like.

The operation of the above-described image-acquisition apparatus will be described in detail below.

Figure 2:
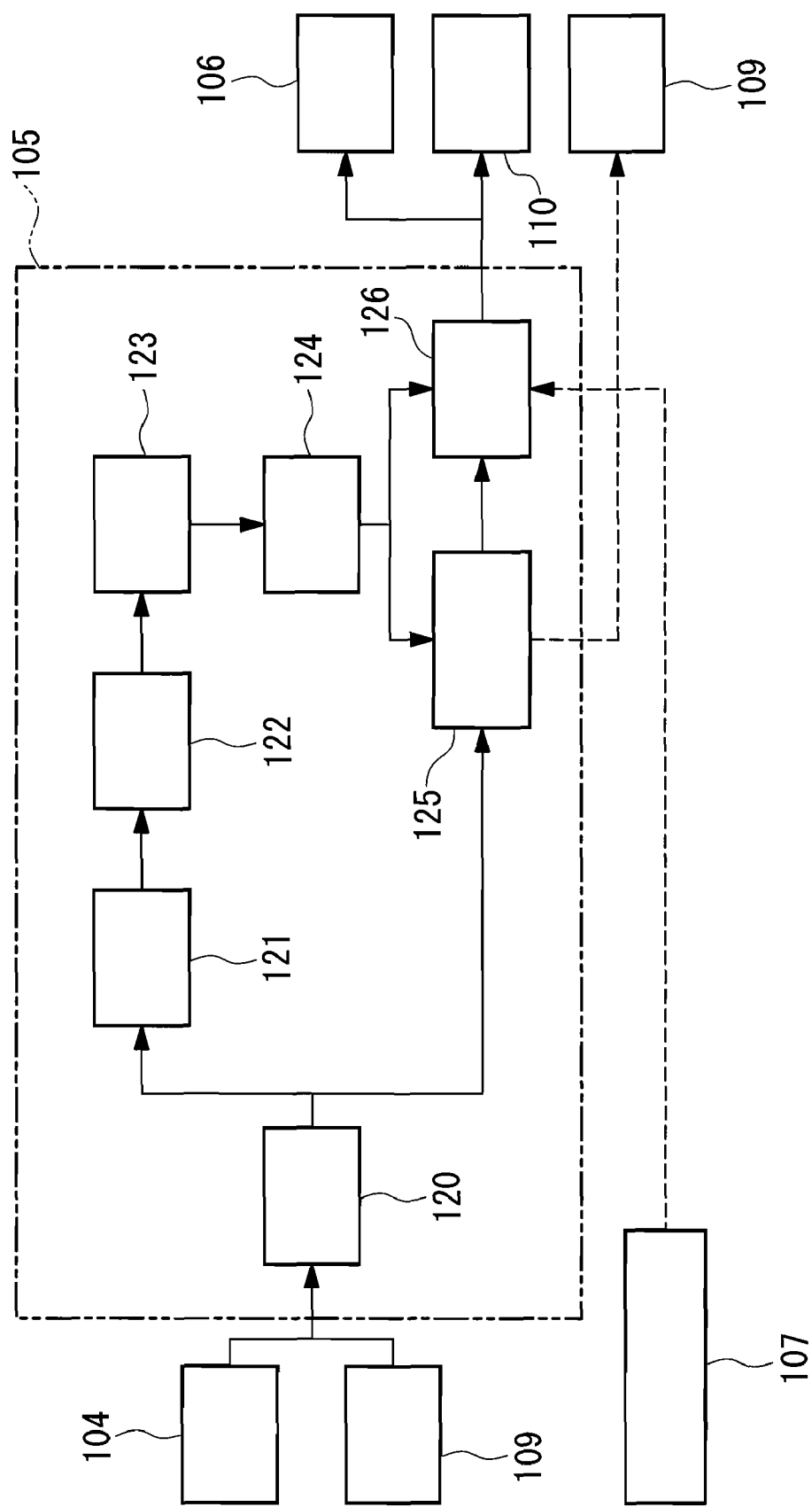
FIG. 2 is a block diagram of the overall structure of a signal processing unit shown in FIG. 1.

FIG. 2 is a block diagram of an example configuration of the signal processing unit 105 according to this embodiment. As shown in FIG. 2, the signal processing unit 105 includes a WB unit 120, an interpolation unit 121, a chroma enhancement unit 122, a grayscale conversion unit 123, a Y/C separation unit 124, an edge enhancement processing unit 125, and a correction-coefficient multiplication unit 126.

The WB unit 120 is connected to the interpolation unit 121 and the edge enhancement processing unit 125. The interpolation unit 121 is connected to the chroma enhancement unit 122. The chroma enhancement unit 122 is connected to the grayscale conversion unit 123. The grayscale conversion unit 123 is connected to the Y/C separation unit 124. The Y/C separation unit 124 is connected to the edge enhancement processing unit 125 and the correction-coefficient multiplication unit 126. The edge enhancement processing unit 125 is connected to the correction-coefficient multiplication unit 126 and the noise reducing unit 109. The correction-coefficient map buffer 107 is connected to the correction-coefficient multiplication unit 126. The correction-coefficient multiplication unit 126 is connected to the correction-coefficient calculation unit 106 and the compressing unit 110.

According to such a configuration, an image signal transferred from the reduced-image creating unit 104 or the noise reducing unit 109 is input to the WB unit 120 included in the signal processing unit 105. The WB unit 120 carries out WB adjustment by multiplying each color signal by a predetermined WB coefficient on the basis of image-acquisition information. The WB-adjusted image signal is transferred to the interpolation unit 121 and the edge enhancement processing unit 125. The interpolation unit 121 carries out interpolation on the WB-adjusted image signal. The interpolated image signal is transferred to the chroma enhancement unit 122. The chroma enhancement unit 122 carries out chroma enhancement by carrying out matrix multiplication on each color signal from the interpolation unit 121. The chroma-enhanced signal is transferred to the grayscale conversion unit 123. The grayscale conversion unit 123 carries out grayscale conversion on the basis of a conversion curve set in advance according to each color signal level. At this time, if the level exceeds the grayscale range, clipping is carried out so that the level does not exceed a predetermined range. The grayscale-converted signal is transferred to the Y/C separation unit 124. The Y/C separation unit 124 separates each color signal into a luminance signal Y and a color-difference signal C on the basis of Equations (1). The separated luminance signal Y is transferred to the edge enhancement processing unit 125, whereas the color-difference signal C is transferred to the correction-coefficient multiplication unit 126.

The edge enhancement processing unit 125 carries out edge enhancement by filtering the color signal from the WB unit 120, extracting the edge component, and adding the edge component to the interpolated luminance signal Y supplied from the Y/C separation unit 124. The edge-enhanced luminance signal Y is transferred to the correction-coefficient multiplication unit 126.

When the image signal input to the signal processing unit 105 is the signal from the noise reducing unit 109, the correction-coefficient multiplication unit 126 obtains area correction coefficients corresponding to the pixels, multiplies the luminance signal Y and the color-difference signal C by the obtained area correction coefficients, and transfers the processed signal to the compressing unit 110. On the other hand, if the image signal input to the signal processing unit 105 is the signal from the reduced-image creating unit 104, the correction-coefficient multiplication unit 126 outputs the signal to the correction-coefficient calculation unit 106 without carrying out the above-described multiplication of the area correction coefficients.

Figure 3:
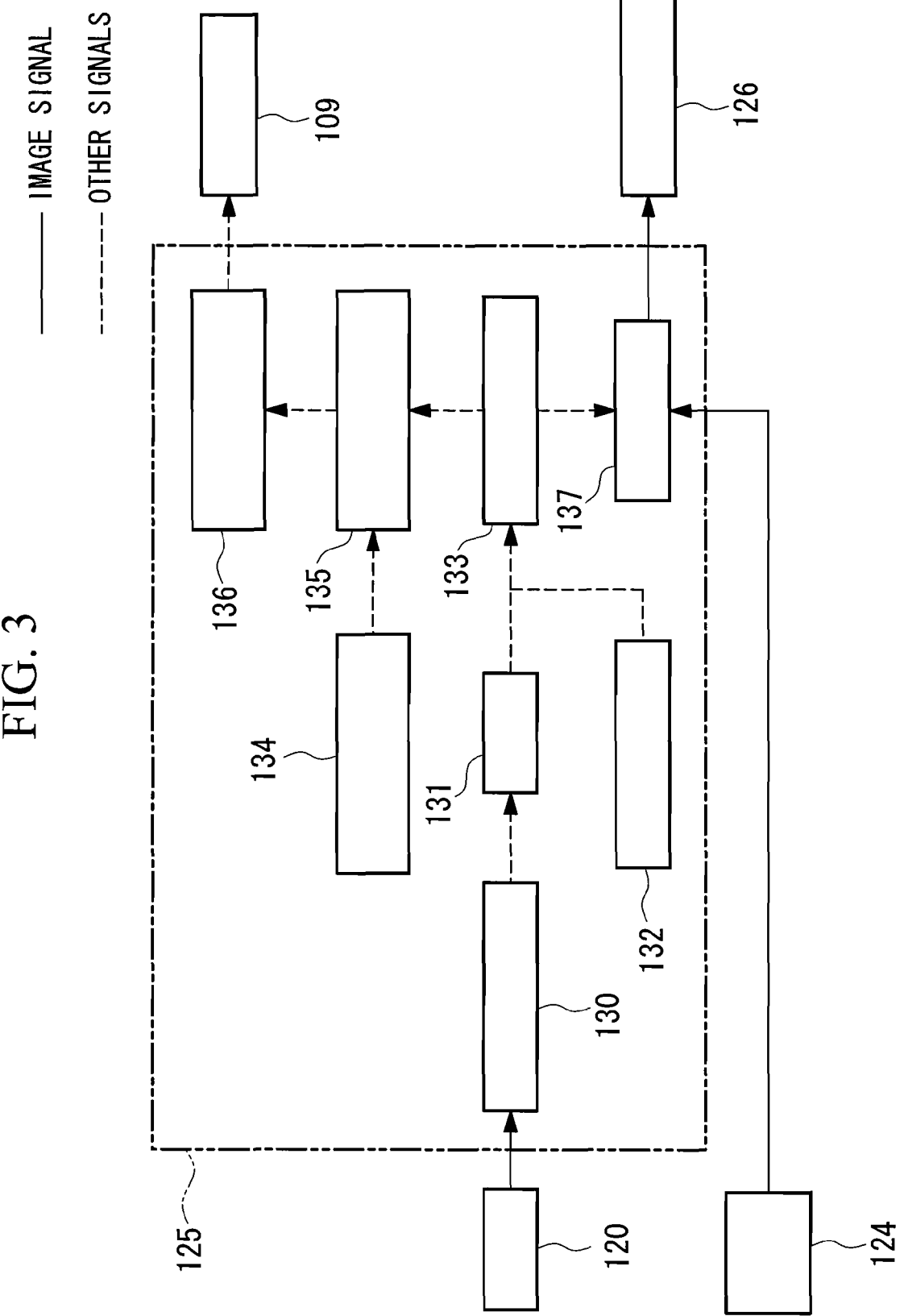
FIG. 3 is a block diagram of the overall structure of an edge enhancement unit shown in FIG. 2.

FIG. 3 is a block diagram of an example configuration of the edge enhancement processing unit 125 shown in FIG. 2. As shown in FIG. 3, the edge enhancement processing unit 125 includes a luminance-signal calculation unit 130, a buffer 131, a filter ROM 132, a filter processing unit 133, an edge-correction-coefficient calculation ROM 134, an edge-correction-coefficient calculation unit 135, an edge-correction-coefficient map buffer 136, and an edge enhancement unit 137.

In the edge enhancement processing unit 125, the luminance-signal calculation unit 130 is connected to the buffer 131. The filter ROM 132 and the buffer 131 are connected to the filter processing unit 133. The filter processing unit 133 is connected to the edge-correction-coefficient calculation unit 135 and the edge enhancement unit 137. The edge enhancement unit 137 is connected to the correction-coefficient multiplication unit 126. The edge-correction-coefficient calculation ROM 134 is connected to the edge-correction-coefficient calculation unit 135. The edge-correction-coefficient calculation unit 135 is connected to the edge-correction-coefficient map buffer 136. The edge-correction-coefficient map buffer 136 is connected to the noise reducing unit 109.

In the edge enhancement processing unit 125 having such a configuration, the WB-adjusted image signal is transferred from the WB unit 120 to the luminance-signal calculation unit 130. The luminance-signal calculation unit 130 reads out the WB-adjusted image signal in pixel units, calculates the luminance signal Y according to Equation (1), and transfers the calculated luminance signal Y to the buffer 131. The buffer 131 temporarily stores the luminance signal from the luminance-signal calculation unit 130.

The filter processing unit 133 reads out, from the filter ROM 132, a filter coefficient required for the processes from edge component extraction to filtering according to the related art. Here, for example, when the filter has a size of 5 by 5 pixels, prescribed areas are read out from the buffer 131 in 5 by 5 pixel units; the edge components associated with these prescribed areas are determined using the filter coefficient read out from the filter ROM 132; and the determined edge components are transferred to the edge-correction-coefficient calculation unit 135 and the edge enhancement unit 137.

The edge enhancement unit 137 extracts a prescribed area having a predetermined size from the converted luminance signal Y in accordance with Equation (1) at the Y/C separation unit 124 and adds the edge components from the filter processing unit 133 to the luminance signal Y to carry out edge enhancement. The edge-correction-coefficient calculation unit 135 reads out the function or table for edge correction from the edge-correction-coefficient calculation ROM 134.

Figure 4:
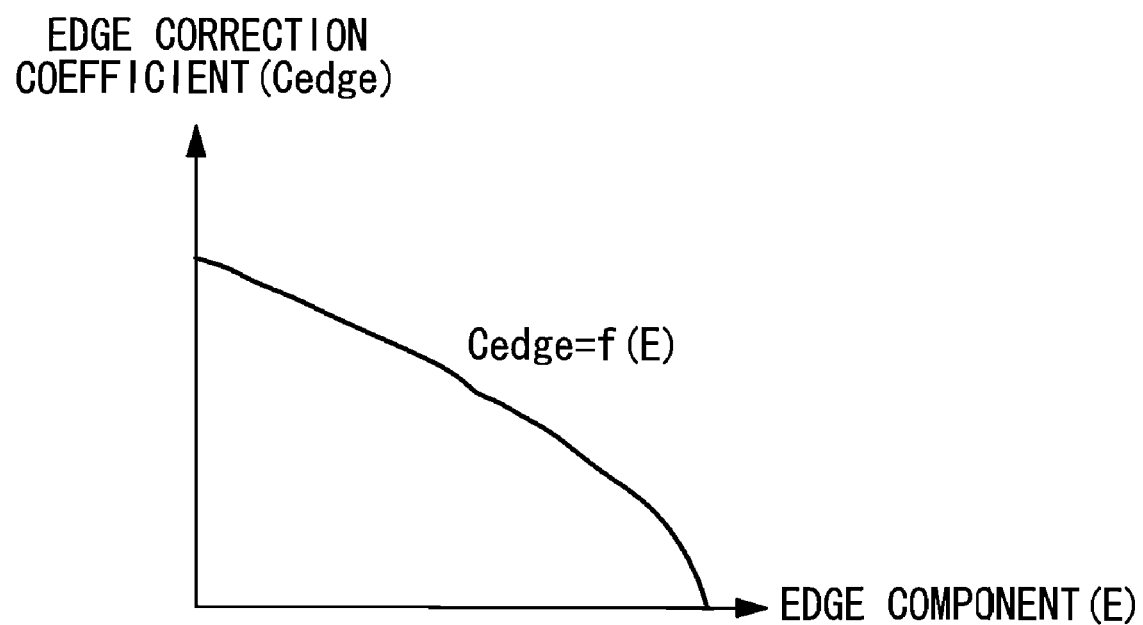
FIG. 4 illustrates the calculation of edge correction coefficients and is a graph showing an example relationship between edge components and edge correction coefficients.

A function or table that links an input edge component with an edge correction coefficient, such as that shown in FIG. 4, is stored in the edge-correction-coefficient calculation ROM 134.

Representing the conversion curve by f( ), the input edge component for the target pixel $P_{x,y}$ by $E_{x,y}$ and the edge correction coefficient for the target pixel $P_{x,y}$ by $C_{edge:x,y}$, the edge correction coefficient $C_{edge:x,y}$ is given by the following Equation (3).

$$C_{edge:x,y} = f(E_{x,y}) \tag{3}$$

The edge-correction-coefficient calculation unit 135 calculates the edge correction coefficients for the reduced-image signal on the basis of the function or the values in the table read out from the edge-correction-coefficient calculation ROM 134 and interpolates the edge correction coefficients for the reduced-image signal on the basis of the reduction ratio of the reduced-image signal so as to calculate the edge correction coefficients for the original image signal, and then transfers the calculated edge correction coefficients to the edge-correction-coefficient map buffer 136. In this way, the edge correction coefficients for the original image signal, i.e., the edge correction coefficient $C_{edge}$ for each pixel when the pixel is set as a target pixel, is recorded in the edge-correction-coefficient map buffer 136 and is used for noise reduction to be carried out later.

Examples of the above-described methods of interpolation are nearest-neighbor interpolation, bilinear interpolation, and bicubic interpolation.

Figure 5:
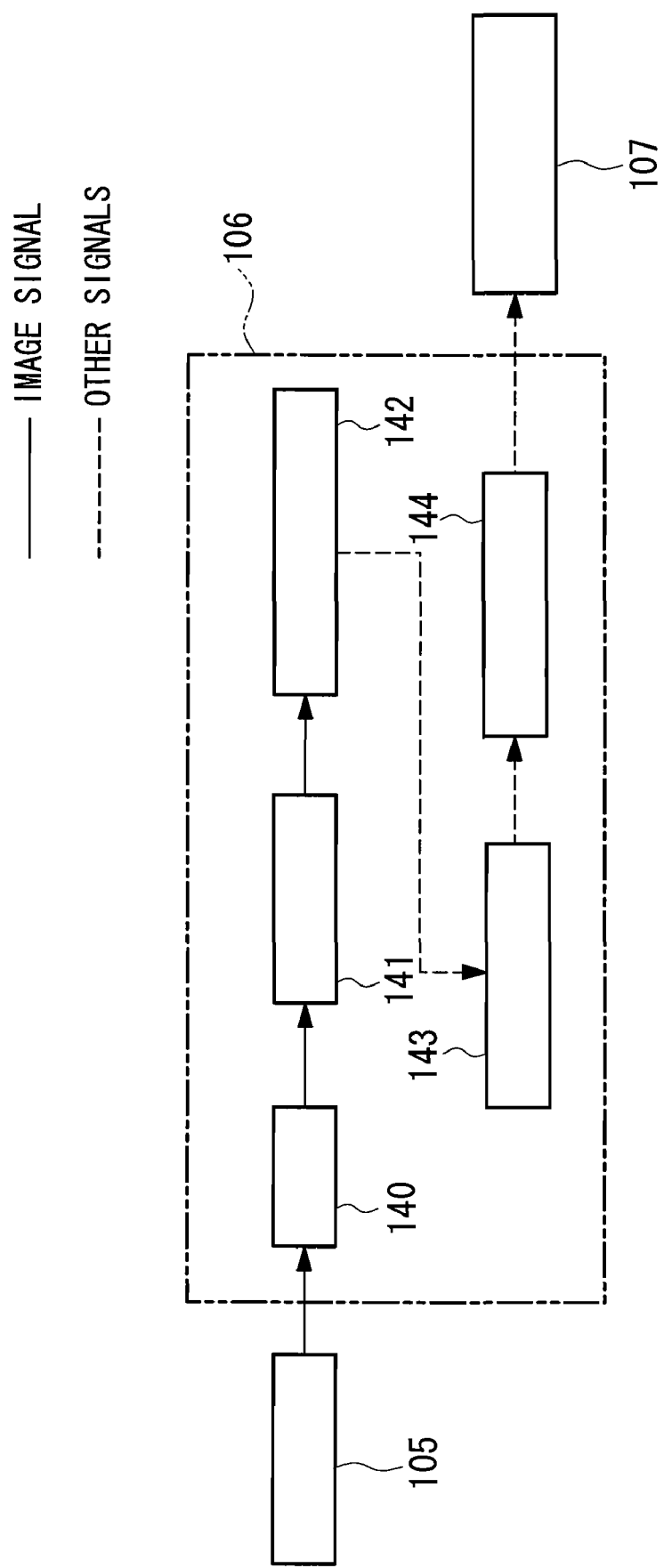
FIG. 5 is a block diagram of the overall structure of a correction-coefficient calculation unit shown in FIG. 1.

FIG. 5 is a block diagram of an example configuration of the correction-coefficient calculation unit 106, which is shown in FIG. 1. As shown in FIG. 5, the correction-coefficient calculation unit 106 includes a buffer 140, an extracting unit 141, a histogram calculation unit 142, an accumulating-and-normalizing unit 143, and a correction-coefficient calculation unit 144.

The signal processing unit 105 is connected to the buffer 140 of the correction-coefficient calculation unit 106. The buffer 140 is connected to the extracting unit 141. The extracting unit 141 is connected to the histogram calculation unit 142. The histogram calculation unit 142 is connected to the accumulating-and-normalizing unit 143. The accumulating-and-normalizing unit 143 is connected to the correction-coefficient calculation unit 144. The correction-coefficient calculation unit 144 is connected to the correction-coefficient map buffer 107.

In the correction-coefficient calculation unit 106 having such a configuration, the image signal transferred from the signal processing unit 105 is supplied to the extracting unit 141 via the buffer 140. The extracting unit 141 extracts a signal of a prescribed area from this image signal (luminance signal Y) and transfers the extracted signal to the histogram calculation unit 142. The histogram calculation unit 142 creates a histogram for each prescribed area and transfers the created histogram to the accumulating-and-normalizing unit 143.

The accumulating-and-normalizing unit 143 accumulates the histograms, normalizes the accumulated histograms to generate a grayscale conversion curve, and transfers the grayscale conversion curve to the correction-coefficient calculation unit 144. In this embodiment, since the grayscale range of an image signal is 12 bits, the grayscale conversion curve has a 12-bit input and a 12-bit output.

The correction-coefficient calculation unit 144 calculates an area correction coefficient that is generated by grayscale conversion of the signal level of the area on the basis of the grayscale conversion curve from the accumulating-and-normalizing unit.

Representing the grayscale conversion curve by t( ), the input signal level by $AV_c$, and the correction coefficient that is generated by grayscale conversion by g', the correction coefficient g' is given by the following Equation (4).

$$g'=t(AV_c)/AV_c \quad (4)$$

The correction coefficient g' is for a reduced-image signal. The correction-coefficient calculation unit 144 calculates an area correction coefficient g for a pixel of an original image signal by employing Equation (4) and interpolation according to the related art on the basis of coordinates of the spatial position of the pixel with respect to the reduction ratio of the reduced-image signal and the correction coefficient. The calculated area correction coefficient g is transferred to the correction-coefficient map buffer 107 and is used in the subsequent processing. Examples of methods of interpolation are nearest neighbor interpolation, bilinear interpolation, and bicubic interpolation.

Figure 6:
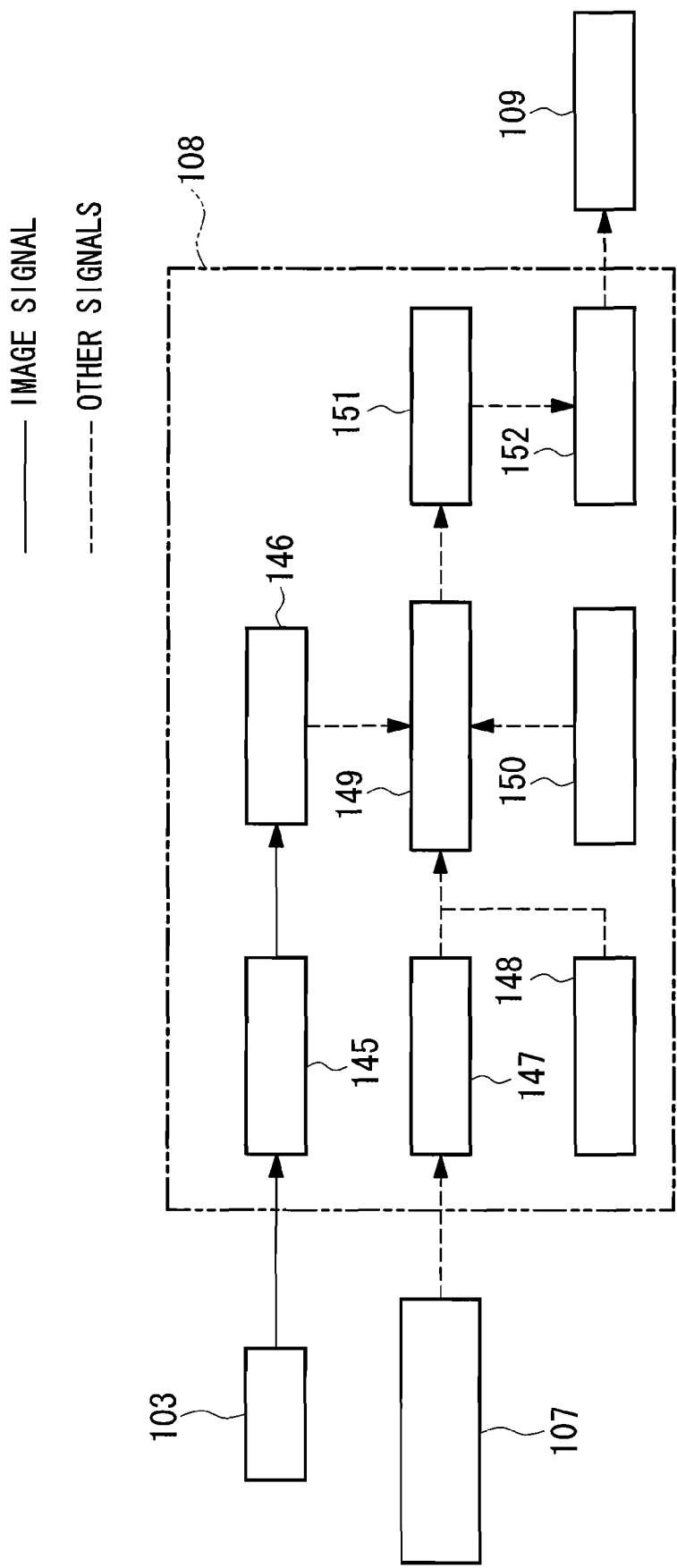
FIG. 6 is a block diagram of the overall structure of a noise estimating unit shown in FIG. 1.

FIG. 6 is a block diagram of an example configuration of the noise estimating unit 108. As shown in FIG. 6, the noise estimating unit 108 includes an extracting unit 145, an average-calculation unit 146, a gain calculation unit 147, a standard-value application unit 148, a parameter selecting unit 149, a parameter ROM 150, an interpolation unit 151, and a correction unit 152.

The buffer 103 is connected to the extracting unit 145. The extracting unit 145 is connected to the average-calculation unit 146. The average-calculation unit 146 is connected to the parameter selecting unit 149. The correction-coefficient map buffer 107 is connected to the gain calculation unit 147. The gain calculation unit 147, the standard-value application unit 148, and the parameter ROM 150 are connected to the parameter selecting unit 149. The parameter selecting unit 149 is connected to the interpolation unit 151. The interpolation unit 151 is connected to the correction unit 152. The correction unit 152 is connected to the noise reducing unit 109.

Figure 7:
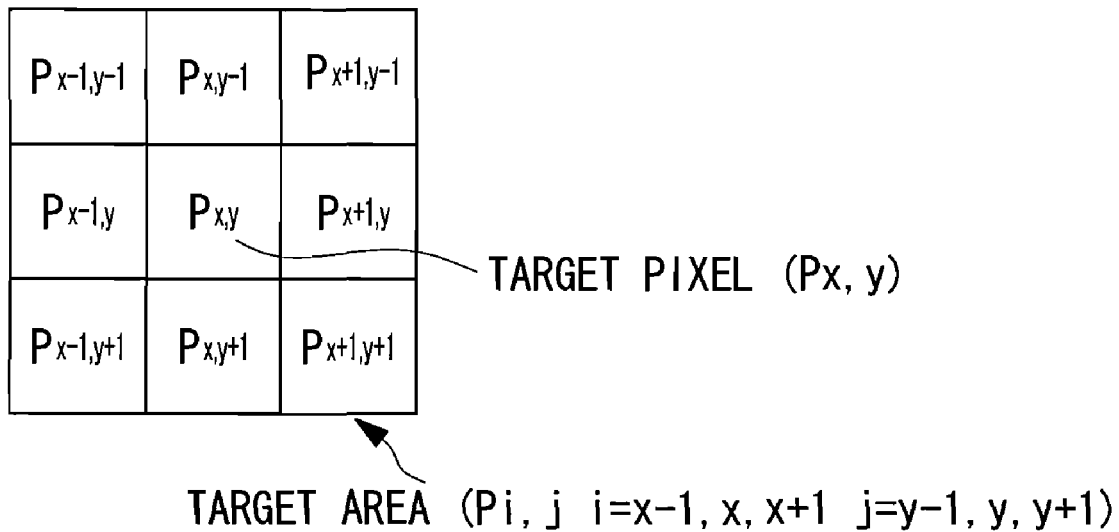
FIG. 7 illustrates a target pixel and target areas.
Figure 8:
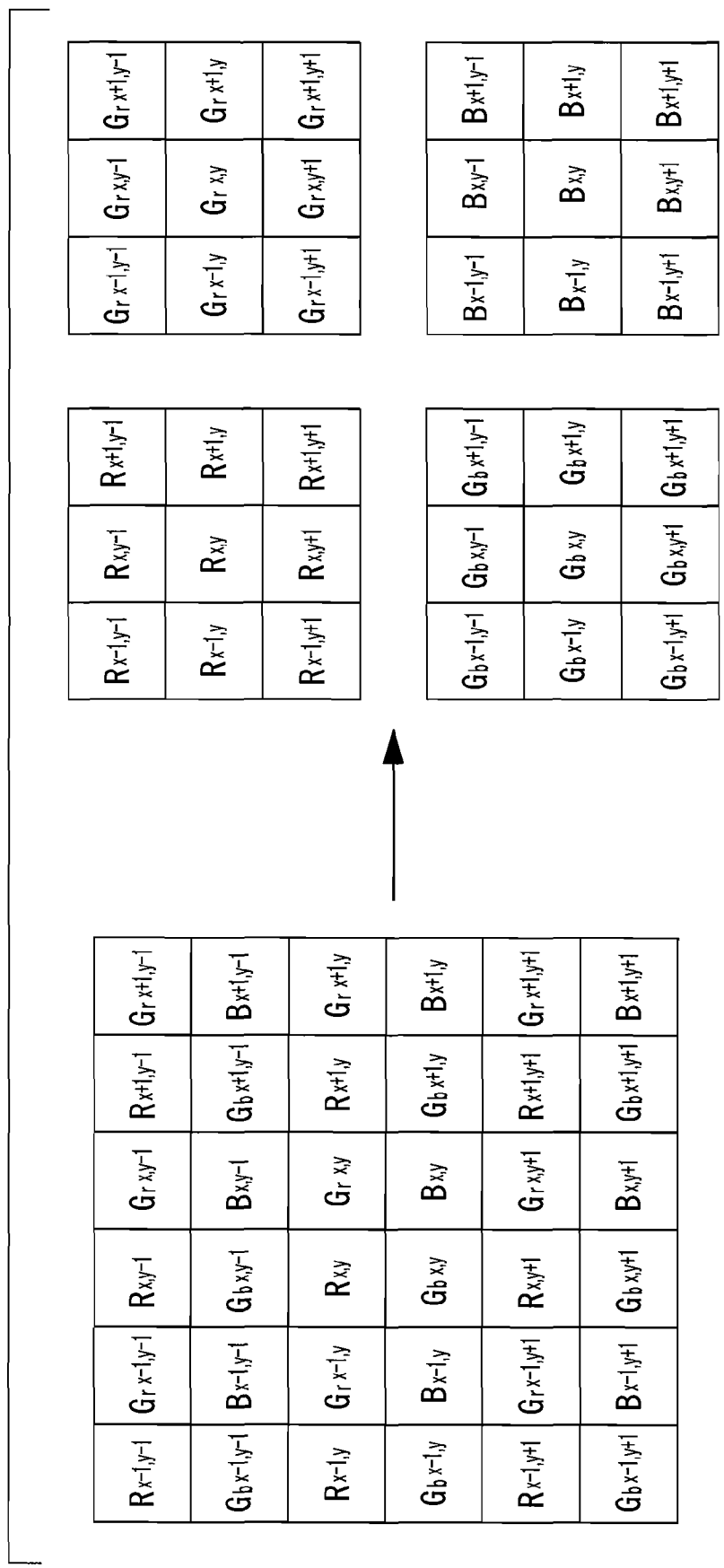
FIG. 8 illustrates a target pixel and target areas.

In the noise estimating unit 108 having such a configuration, the extracting unit 145 extracts a prescribed area ($P_{ij}$ (i=x−1, x, x+1, j=y−1, y, y+1)) centered on a target pixel $P_{x,y}$, which is shown in FIG. 7, from the buffer 103 and transfers this prescribed area to the average-calculation unit 146. As shown in FIG. 8, the extracting unit 145 forms prescribed areas for each color signal for single-chip color signals and then transfers the prescribed areas to the average-calculation unit 146. Subsequently, the amount of noise is estimated and noise reduction is performed for each color signal.

The average-calculation unit 146 calculates an average value $AV_{x,y}$ of the prescribed area ($P_{ij}$ (i=x−1, x, x+1, j=y−1, y, y+1)) using Equation (5) and transfers the average value $AV_{x,y}$ to the parameter selecting unit 149.

$$AV_{x,y}=\Sigma P_{ij}/9 \quad (5)$$

Figure 9:
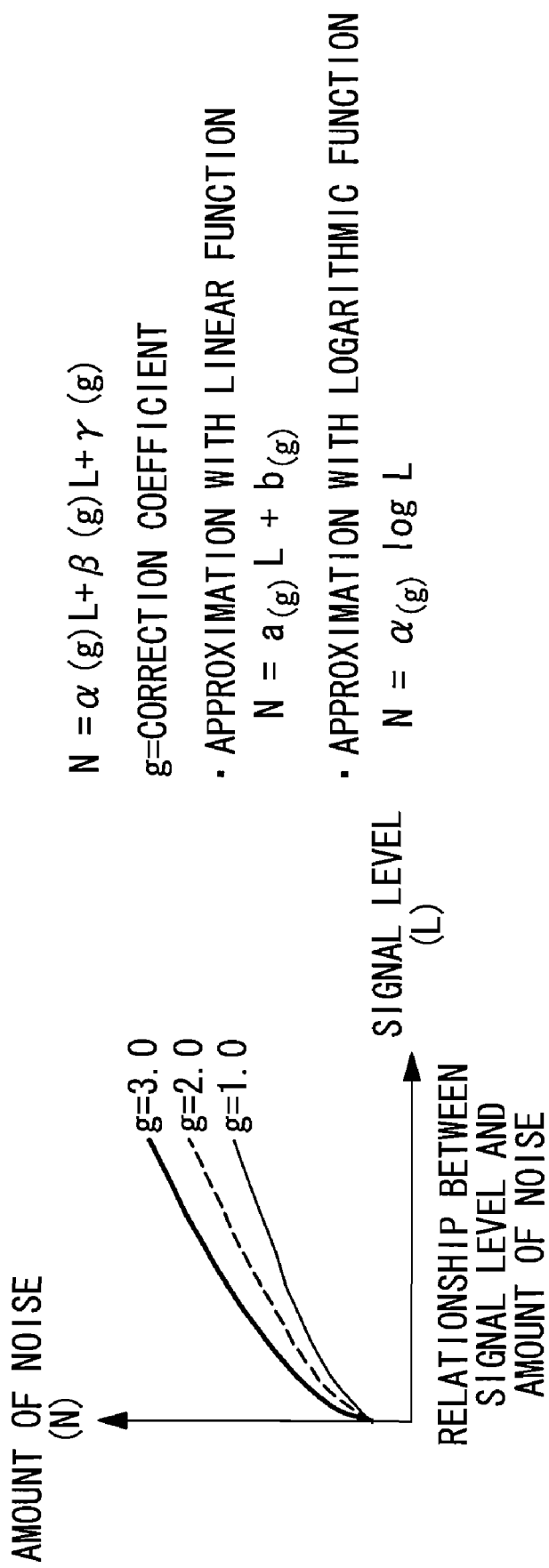
FIG. 9 illustrates the estimation of the amount of noise.
Figure 10:
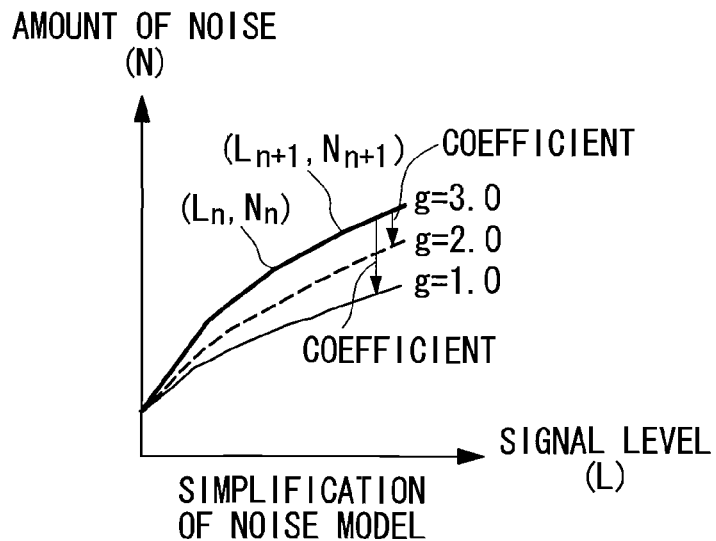
FIG. 10 illustrates the estimation of the amount of noise.
Figure 11:
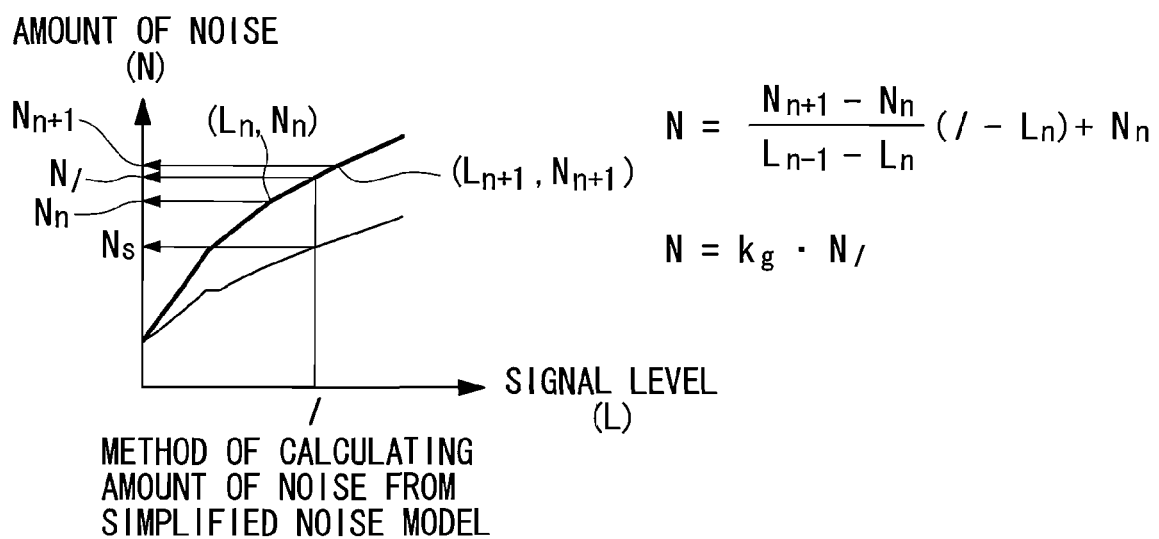
FIG. 11 illustrates the estimation of the amount of noise.

The gain calculation unit 147 reads out the area correction coefficient g corresponding to the target pixel from the correction-coefficient map buffer 107 and transfers the area correction-coefficient g to the parameter selecting unit 149. The parameter selecting unit 149 estimates the amount of noise on the basis of the average value $AV_{x,y}$ of the prescribed area from the average-calculation unit 146 and the area correction coefficient g from the gain calculation unit 147. FIGS. 9 to 11 illustrate the process of estimating the amount of noise.

An amount of noise N when the signal level is L is plotted in FIG. 9. The following Equation (6) is derived by modeling FIG. 9 as a quadratic function.

$$N=\alpha L^2+\beta L+\gamma \quad (6)$$

In Equation (6), α, β, and γ are constant terms.

The amount of noise N changes by, not only the change in the signal level (color signal), but also by a change in the image-acquisition device, the ISO sensitivity, or the area correction coefficient multiplied by a pixel value in grayscale conversion. α, β, and γ are values that are determined in accordance with the image-acquisition device, the ISO sensitivity, or the area correction coefficient. According to the present invention, "ISO sensitivity" does not refer to the sensitivity of film used for a silver halide camera. As in this embodiment, for a digital camera, "ISO sensitivity" refers to the level of amplification of an electrical signal obtained by an image-acquisition device, which is set to correspond to film sensitivity. As an example, the amount of noise N when the area correction coefficients are 1.0, 2.0, and 3.0 (in these cases the image-acquisition device and ISO sensitivity are constant) is plotted in FIG. 9. To reflect the image-acquisition device and the ISO sensitivity on α, β, and γ, the standard-value application unit 148 applies information about the image-acquisition device and the ISO sensitivity to the parameter selecting unit 149. Then, the parameter selecting unit 149 estimates the amount of noise by determining α, β, and γ corresponding to the area correction coefficient g, the image-acquisition device, and the ISO sensitivity. At this time, represented by Equation (7), α, β, and γ corresponding to the area correction coefficient g, the image-acquisition device, and the ISO sensitivity can be determined as a function formulated on the basis of actual measurement values.

$$N=\alpha_{(g)}L^2+\beta_{(g)}L+\gamma_{(g)} \quad (7)$$

In Equation (7), $\alpha_{(g)}$, $\beta_{(g)}$, and $\gamma_{(g)}$ are functions formulated from actual measurement values, with the area correction coefficient g as a variable. However, the distribution of the amounts of noise differs depending on the combination of the processing systems. Therefore, here, modeling is performed on the basis of a quadratic polynomial. However, it is also possible to perform modeling on the basis of a linear function, such as that represented by Equation (8), or a logarithm function, such as that represented Equation (9). Since Equations (8) and (9) can be easily converted into Equation (7), descriptions thereof are omitted.

$$N=\alpha_{(g)}L+\beta_{(g)} \quad (8)$$

$$N=\alpha_{(g)}\log L \quad (9)$$

It is a complicated process to record a plurality of functions according to Equation (7) and calculate the amount of noise each time. Therefore, it is preferable to simplify the model in such manner as shown in FIG. 10. In FIG. 10, a reference noise model is set on the basis of area correction coefficients in predetermined intervals. Here, a reference noise model is provided for a case in which the area correction coefficient g equals 1.0, 2.0, and 3.0.

In this embodiment, a model for determining the maximum amount of noise (the noise model for g=3, in FIG. 10) is set as a reference noise model, and the results of approximating the reference noise model with a predetermined number of line segments are recorded in advance. The inflection points of the broken lines are represented by coordinate data ($L_n$, $N_n$) of the signal level L and the amount of noise N. Here, n represents the number of inflection points. A coefficient kg for deriving another noise model (i.e., a noise model corresponding to a value of g other than g=3.0) from the reference noise model is also recorded in advance. Another noise model is derived from the reference noise model by multiplying the reference noise model by the coefficient kg.

FIG. 11 illustrates a method of calculating the amount of noise from the simplified noise model. Here, for example, the amount of noise N corresponding to a given signal level l and a correction coefficient g is to be determined (in this case, the image-acquisition device and the ISO sensitivity are constant). First, it is determined to which section of the reference noise model the signal level l belongs. Here, it is assumed that the signal level l belongs to a section between ($L_n$, $N_n$) and ($L_{n+1}$, $N_{n+1}$). Then, Equation (10) is used to determine a standard amount of noise $N_l$ in the reference noise model by linear interpolation. Moreover, a coefficient kg corresponding to a noise model for an area correction coefficient numerically closest to g is selected, and the amount of noise N is determined by multiplying the standard amount of noise $N_l$ by the coefficient kg, as shown in Equation (11).

$$N_l = \frac{N_{n+1} - N_n}{L_{n+1} - L_n}(l - L_n) + N_n \quad (10)$$

$$N = k_g \cdot N_l \quad (11)$$

The parameter selecting unit 149 sets signal level l according to the average value $AV_{x,y}$ of the prescribed area for the target pixel $P_{x,y}$ from the average-calculation unit 146 and sets the area correction coefficient g corresponding to the target pixel $P_{x,y}$ according to the area correction coefficient read out by the gain calculation unit 147.

Subsequently, the parameter selecting unit 149 retrieves the coordinate data ($L_n$, $N_n$) and ($L_{n+1}$, $N_{n+1}$) of the section to which the signal level belongs from the parameter ROM 150 and transfers the retrieved coordinate data to the interpolation unit 151. Moreover, the coefficient kg is retrieved from the parameter ROM 150 and is transferred to the correction unit 152.

The interpolation unit 151 calculates the standard amount of noise $N_l$ of the reference noise model from the signal level and the coordinate data ($L_n$, $N_n$) and ($L_{n+1}$, $N_{n+1}$) of the section from the parameter selecting unit 149 on the basis of Equation (10) and transfers the amount of noise $N_l$ to the correction unit 152.

The correction unit 152 calculates the amount of noise N from the coefficient kg from the parameter selecting unit 149 and the standard amount of noise $N_l$ from the interpolation unit 151 on the basis of Equation (11) so as to set the amount of noise $N_{x,y}$ of the target pixel $P_{x,y}$. The amount of noise $N_{x,y}$ and the average value $AV_{x,y}$ that are estimated by setting each pixel as a target pixel are transferred to the noise reducing unit 109.

Figure 12:
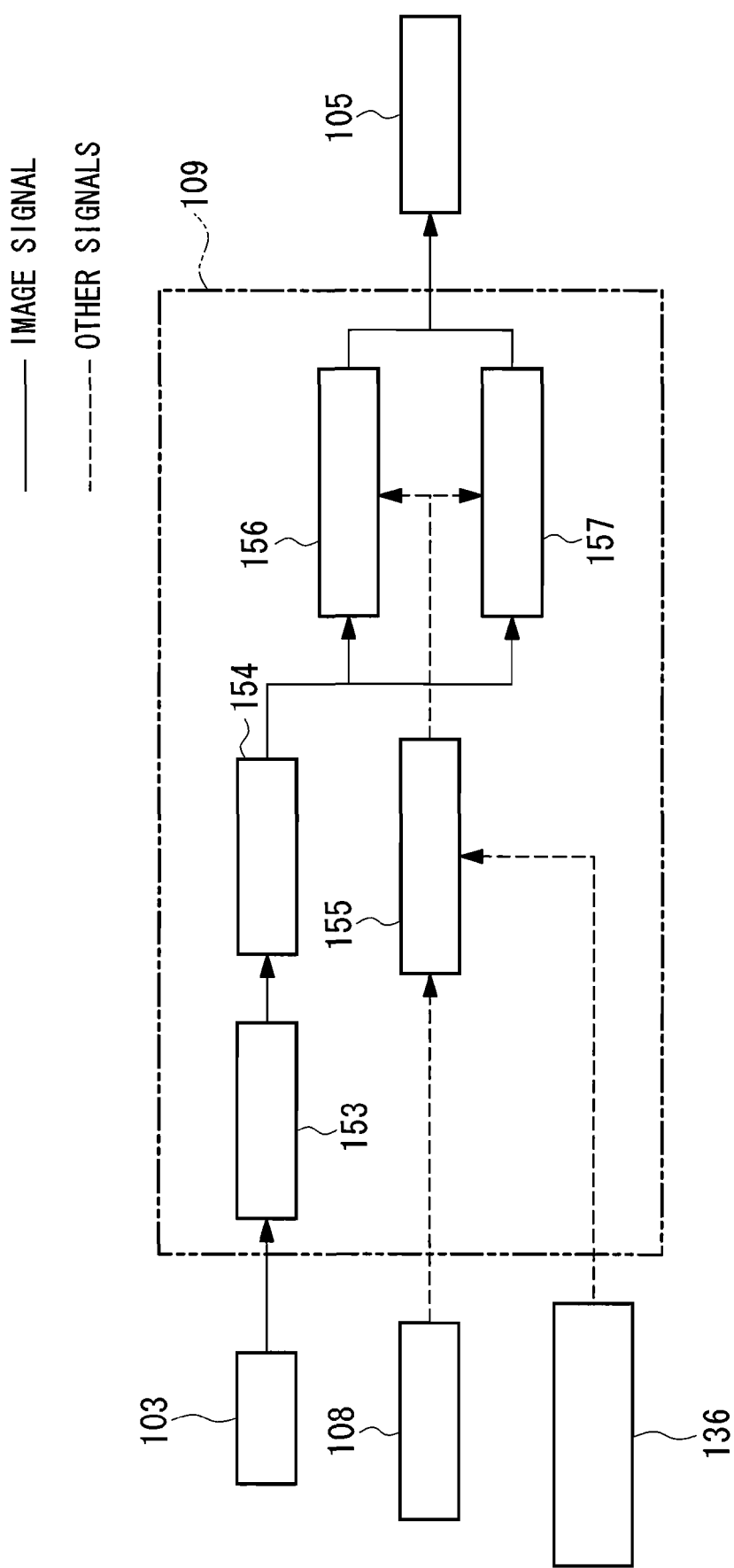
FIG. 12 is a block diagram of the overall structure of the noise reducing unit shown in FIG. 1.

FIG. 12 is a block diagram of an example configuration of the noise reducing unit 109. The noise reducing unit 109 includes an extracting unit 153, a switching unit 154, a range setting unit 155, a first smoothing unit 156, and a second smoothing unit 157.

The buffer 103 is connected to the extracting unit 153. The extracting unit 153 is connected to the switching unit 154. The noise estimating unit 108 and the edge-correction-coefficient map buffer 136 are connected to the range setting unit 155. The switching unit 154 and the range setting unit 155 are connected to the first smoothing unit 156 and the second smoothing unit 157. The first smoothing unit 156 and the second smoothing unit 157 are connected to the signal processing unit 105.

In the noise reducing unit 109 having such a configuration, the average value $AV_{x,y}$ and the amount of noise $N_{x,y}$ of a prescribed area are transferred from the noise estimating unit 108 to the range setting unit 155. The range setting unit 155 obtains the edge correction coefficient $C_{edge}$ calculated using Equation (3) from the edge-correction-coefficient map buffer 136, sets an upper limit Up and a lower limit Low as an allowable range of the amount of noise using Equation (12) on the basis of the edge correction coefficient $C_{edge}$ and the average value $AV_{x,y}$ and the amount of noise $N_{x,y}$ of a prescribed area from noise estimating unit 108, and transfers the upper limit Up and the lower limit Low of the allowable range to the switching unit 154.

$$Up = AV_{x,y} + (N_{x,y}/2) * C_{edge:x,y}$$

$$Low = AV_{x,y} - (N_{x,y}/2) * C_{edge:x,y} \quad (12)$$

Furthermore, the range setting unit 155 transfers the average value $AV_{x,y}$ and the amount of noise $N_{x,y}$ to the first smoothing unit 156 and the second smoothing unit 157. The switching unit 154 reads out the target pixel $P_{x,y}$ from the extracting unit 153 and determines whether or not it belongs to the allowable range. The target pixel $P_{x,y}$ is determined to either "be in the noise range", "exceed the noise range", or "below the noise range". When the target pixel $P_{x,y}$ is determined to "be in the noise range", the switching unit 154 transfers the pixel value $PV_{x,y}$ of the target pixel $P_{x,y}$ to the first smoothing unit 156 and, in the other cases, transfers the pixel value $PV_{x,y}$ of the target pixel $P_{x,y}$ to the second smoothing unit 157.

The first smoothing unit 156 uses Equation (13) to substitute the pixel value $PV_{x,y}$ of the target pixel $P_{x,y}$ from the switching unit 154 with the average value $AV_{x,y}$ from the range setting unit 155.

$$PV_{x,y} = AV_{x,y} \quad (13)$$

A target pixel $P'_{x,y}$ whose noise is reduced according to Equation (13) and the amount of noise $N_{x,y}$ are transferred to the signal processing unit 105. The second smoothing unit 157 uses the average value $AV_{x,y}$ and the amount of noise $N_{x,y}$ from the range setting unit 155 to correct the target pixel $P_{x,y}$ from the switching unit 154. When the target pixel $P_{x,y}$ is determined to "exceed the noise range", correction is made according to Equation (14).

$$PV_{x,y} = AV_{x,y} - N_{x,y}/2 \quad (14)$$

When the target pixel $P_{x,y}$ is determined to "be below the noise range", correction is made according to Equation (15).

$$PV_{x,y} = AV_{x,y} + N_{x,y}/2 \quad (15)$$

The pixel value $PV_{x,y}$ of the target pixel $P_{x,y}$ whose noise is reduced according to Equation (14) or (15) and the amount of noise $N_{x,y}$ are transferred to the signal processing unit 105; signal processing described with reference to FIG. 2 is carried out; and the processed image signal is supplied to the output unit 111 via the compressing unit 110 and is recorded on a recording medium.

As described above, in the image-acquisition apparatus according to this embodiment, predetermined image signal processing (first signal conversion) is performed on an image signal from the image-acquisition device in the signal processing unit 105, and area correction coefficients used for grayscale conversion of the areas, i.e., correction coefficients associated with space-variant grayscale conversion, are calculated on the basis of an image-processed image signal in the correction-coefficient calculation unit 106. Then, at a noise-reduction processing unit, noise reduction using the area correction coefficients is performed on the original image signal, and the noise-reduced image signal is transferred to the signal processing unit 105 again. In this way, further grayscale conversion is performed using the area correction coefficients for the areas.

In this way, since correction coefficients associated with space-variant grayscale conversion for an image signal on which predetermined signal processing has been performed are calculated, and noise reduction and grayscale conversion using the correction coefficients are performed on the image signal (original image signal) from the image-acquisition device, it is possible to reduce the sense of unnaturalness caused by a difference in the impression of noise in different enhanced areas when space-variant grayscale conversion is carried out. Moreover, since noise reduction is performed on an image signal from the image-acquisition device, highly accurate noise reduction is possible.

In this embodiment, the CCD 101 is assumed to be a single-chip CCD having a Bayer primary-color filter disposed on the front surface. However, the CCD 101 is not limited thereto. For example, this embodiment may employ a color-difference line-sequential complementary filter or a double- or triple-chip CCD.

In this embodiment, processing is carried out by hardware. However, the processing is not limited thereto. For example, it is also possible to use a configuration in which the unprocessed signal from the CCD 101 is used as Raw data, and image-acquisition information, such as ISO sensitivity, from an external I/F is extracted as header information and processed in separate software. Software signal processing will be described below with reference to FIGS. 13 and 14.

Figure 13:
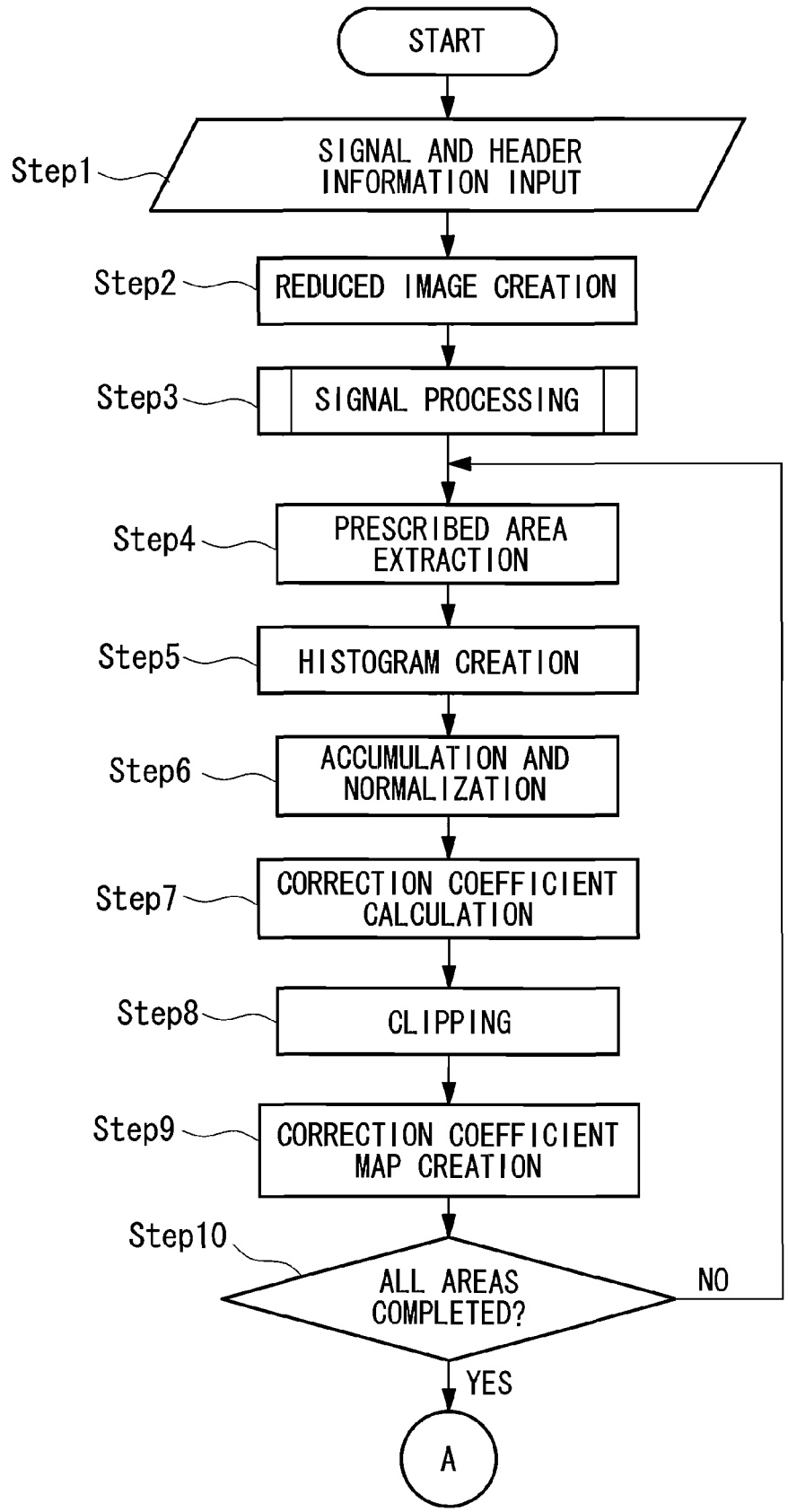
FIG. 13 is a flow chart illustrating the steps of signal processing executed by the image-acquisition apparatus according to the first embodiment of the present invention.
Figure 14:
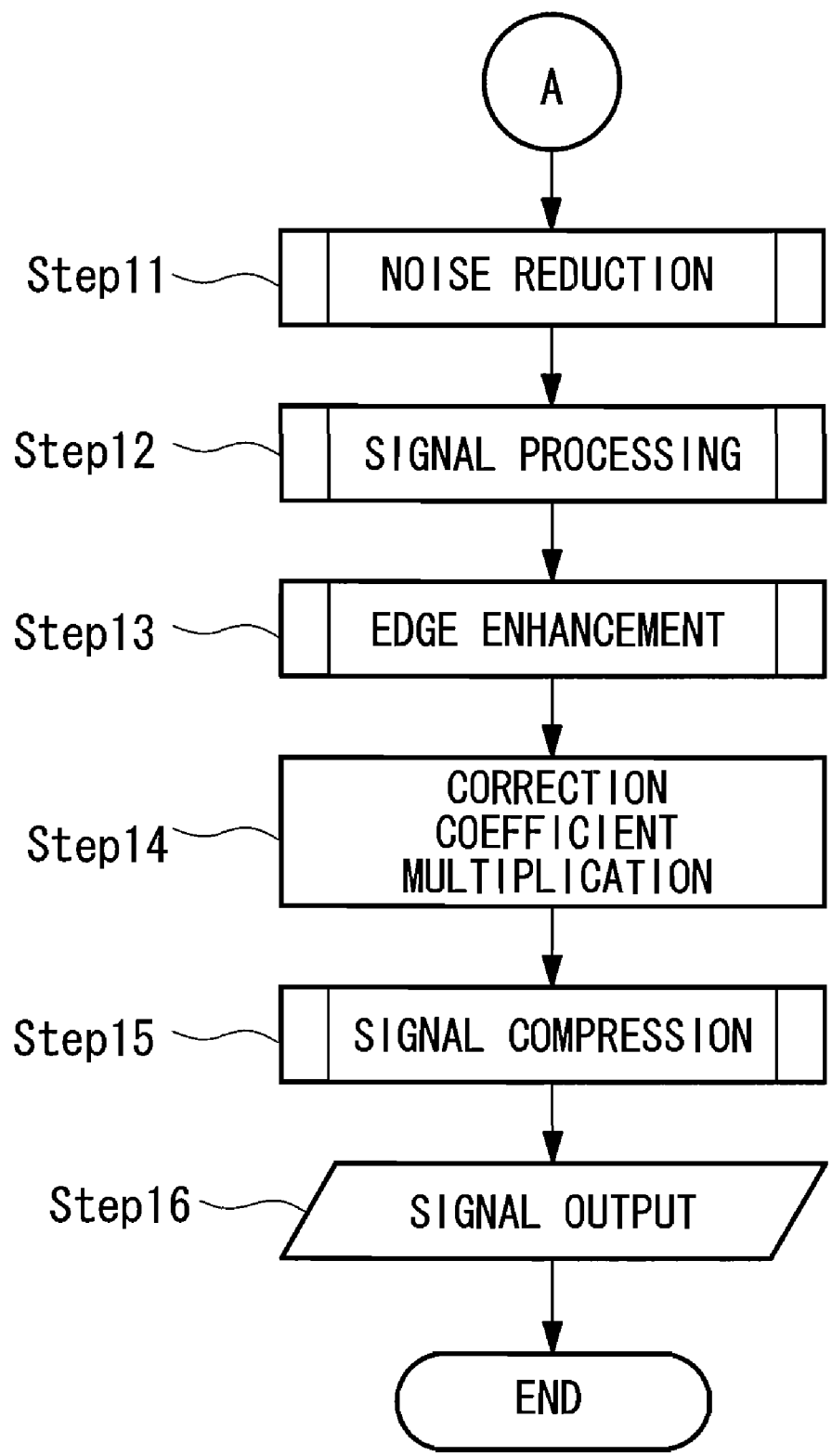
FIG. 14 is a flow chart illustrating the steps of signal processing executed by the image-acquisition apparatus according to the first embodiment of the present invention.

FIGS. 13 and 14 are flow charts illustrating the process of software signal processing carried out in the image-acquisition apparatus according to the first embodiment of the present invention.

In Step 1 of FIG. 13, an image signal and header information including image-acquisition information, such as ISO sensitivity, are read out. In Step 2, a reduced image for correction coefficient calculation is created. In Step 3, signal processing, such as WB adjustment, color interpolation, chroma enhancement, grayscale conversion, and edge enhancement, and edge correction coefficient calculation associated with edge enhancement are carried out. In Step 4, prescribed areas of 16 by 16 pixel units are extracted, and in Step 5, histograms are created. In Step 6, the histograms created in Step 5 are accumulated and normalized. In Step 7, a grayscale conversion curve is set on the basis of the accumulated histograms, and correction coefficients for pixels are calculated on the basis of the conversion curve. In Step 8, clipping is performed on the calculated correction coefficients, and in Step 9, a correction coefficient map is created by calculating and recording area correction coefficients for pixels corresponding to the original signal on the basis of the correction coefficients for a reduced image.

In Step 10, it is determined whether extraction of all areas has completed. If extraction is completed, the process proceeds to Step 11 in FIG. 14, whereas, if extraction is not completed, the process proceeds to Step 4. In Step 11 in FIG. 14, noise reduction is performed on the basis of area correction coefficients, edge correction coefficients, and ISO sensitivity. In Step 12, WB adjustment, color interpolation, chroma enhancement, and grayscale conversion are performed. In Step 13, edge enhancement is performed. In Step 14, the image signal is multiplied by the area correction coefficients. In Step 15, signal compression is performed by a signal compression technique according to the related art. In Step 16, the processed signal is output, and the process ends.

Figure 15:
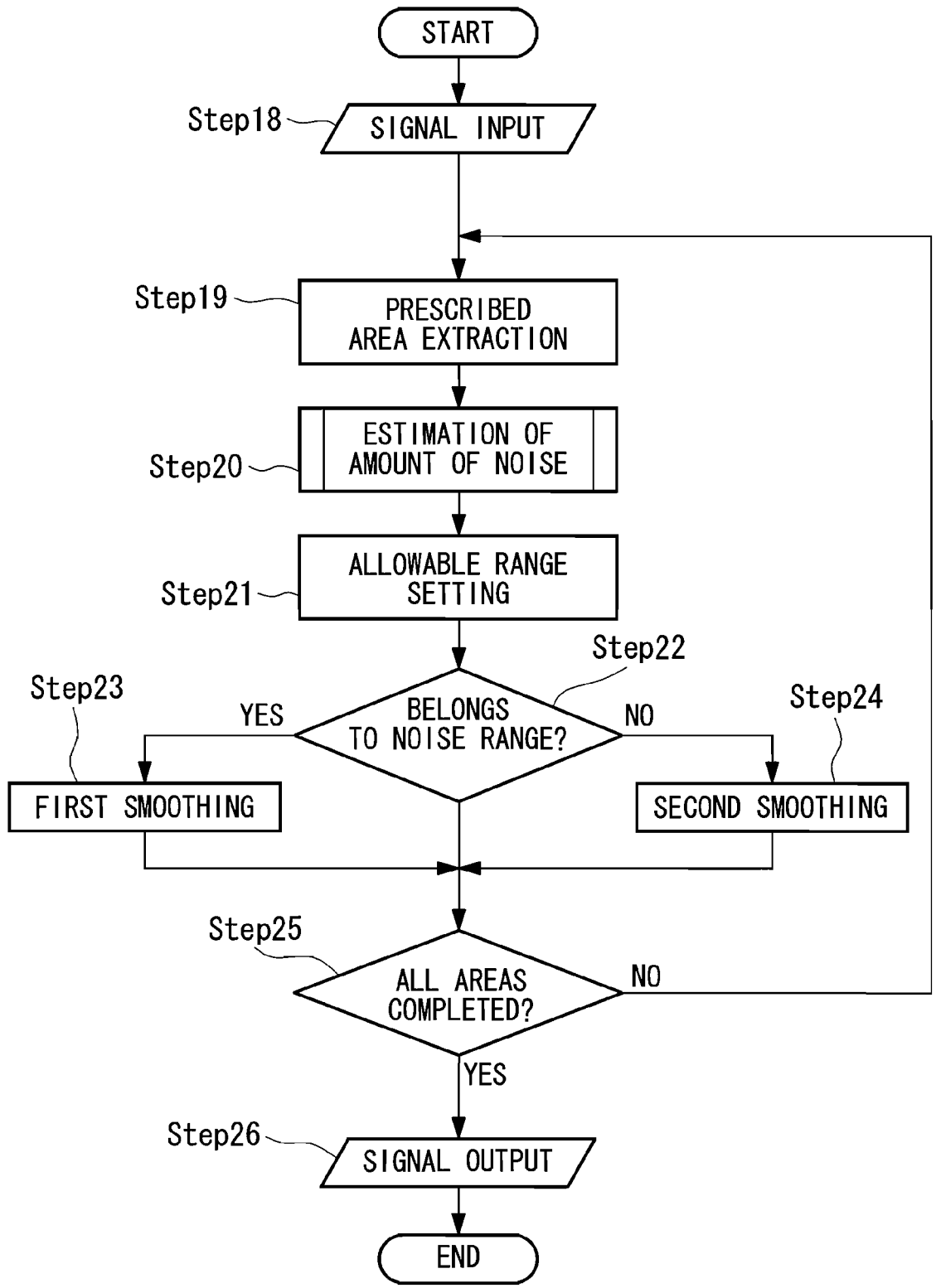
FIG. 15 is a flow chart illustrating the steps of a process of estimating the amount of noise during noise reduction in Step 11 shown in FIG. 14.

FIG. 15 is a flow chart illustrating the process of estimating the amount of noise during noise reduction in Step 11.

In Step 18, an image signal is input from the buffer. In Step 19, a target pixel and a prescribed area having a size of 3 by 3 pixels, as shown in FIG. 7, are extracted. In Step 20, as described below, the amount of noise in the target pixel is calculated. In Step 21, the allowable range represented by Equation (12) is set for the target pixel. In Step 22, it is determined whether the amount of noise is within the allowable range. If the amount of noise is within the allowable range, the process proceeds to Step 23, whereas if the amount of noise is not within the allowable range, the process branches to Step 24. In Step 23, the process represented by Equation (13) is carried out. In Step 24, the processes represented by Equations (14) and (15) are carried out. In Step 25, it is determined whether extraction of all areas is completed. If extraction is not completed, the process returns to Step 19, whereas if extraction is completed, the process branches to Step 26. In Step 26, a noise-reduced signal is output to the signal processing unit.

Figure 16:
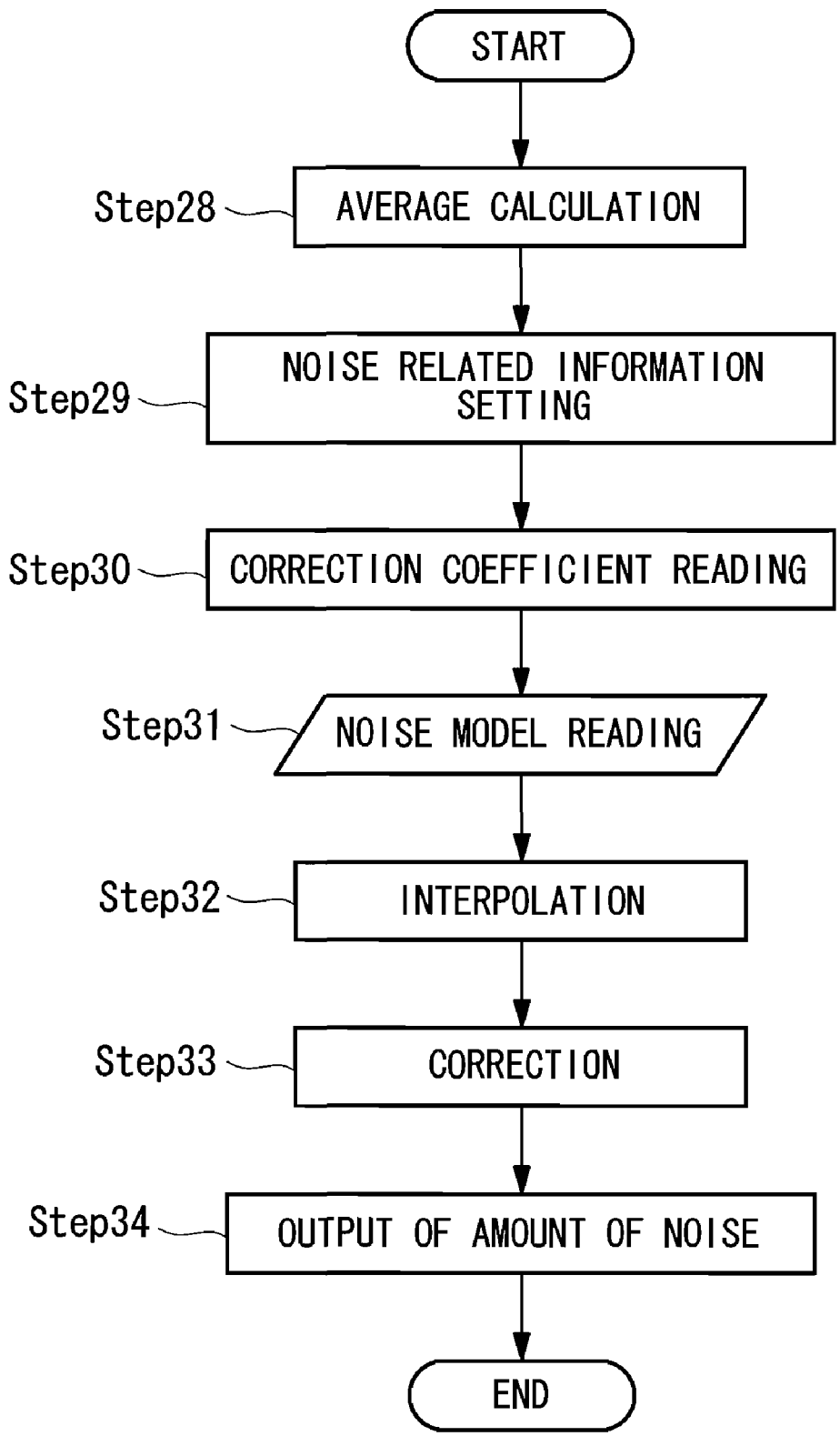
FIG. 16 is a flow chart illustrating the steps of a process of estimating the amount of noise during noise reduction in Step 20 shown in FIG. 15.

FIG. 16 is a flow chart illustrating the process of estimating the amount of noise in Step 20.

In Step 28, the average value of the prescribed areas is calculated using Equation (5). In Step 29, information, such as ISO sensitivity, is set on the basis of the read out header information. If the necessary parameter is not included in the header information, a predetermined standard value is assigned. In Step 30, area correction coefficients are obtained from the correction coefficient buffer. In Step 31, coordinate data and area correction coefficients of the reference noise model are read out. In Step 32, the standard amount of noise is determined by interpolation represented by Equation (10). In Step 33, the amount of noise is determined by correction represented by Equation (11). In Step 34, the calculated amount of noise is output, and the process ends. In the above-described Steps 31 to 34, the amount of noise may be calculated using Equations (6) to (9).

Figure 17:
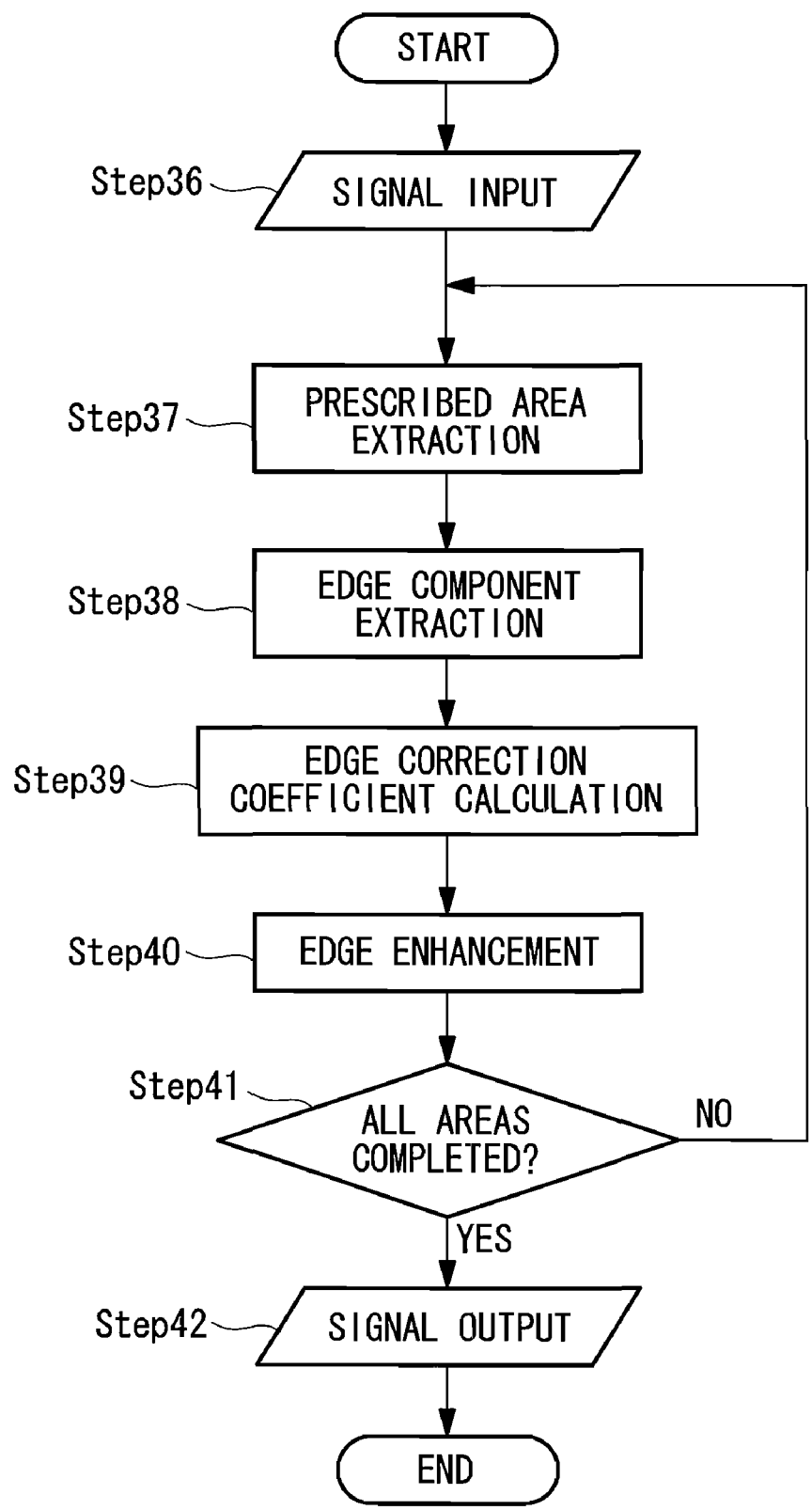
FIG. 17 is a flow chart illustrating the steps of a process associated with edge enhancement in Steps 3 and 13 shown in FIGS. 13 and 14.

FIG. 17 is a flow chart illustrating the process of edge enhancement in Steps 3 and 13.

In Step 36, an image signal is input. In Step 37, prescribed areas are extracted from the image signal. In Step 38, edge components are extracted by filtering. In Step 39, edge correction coefficients are calculated on the basis of the edge components. In Step 40, edge enhancement is performed on the basis of the edge components. In Step 41, it is determined whether extraction from all areas is completed. If extraction is not completed, the process returns to Step 37, whereas if extraction is completed, the process proceeds to Step 42. In Step 42, an edge-enhanced image signal is output.

Second Embodiment

Next, an image-acquisition apparatus according to a second embodiment of the present invention will be described with reference to the drawings.

Figure 18:
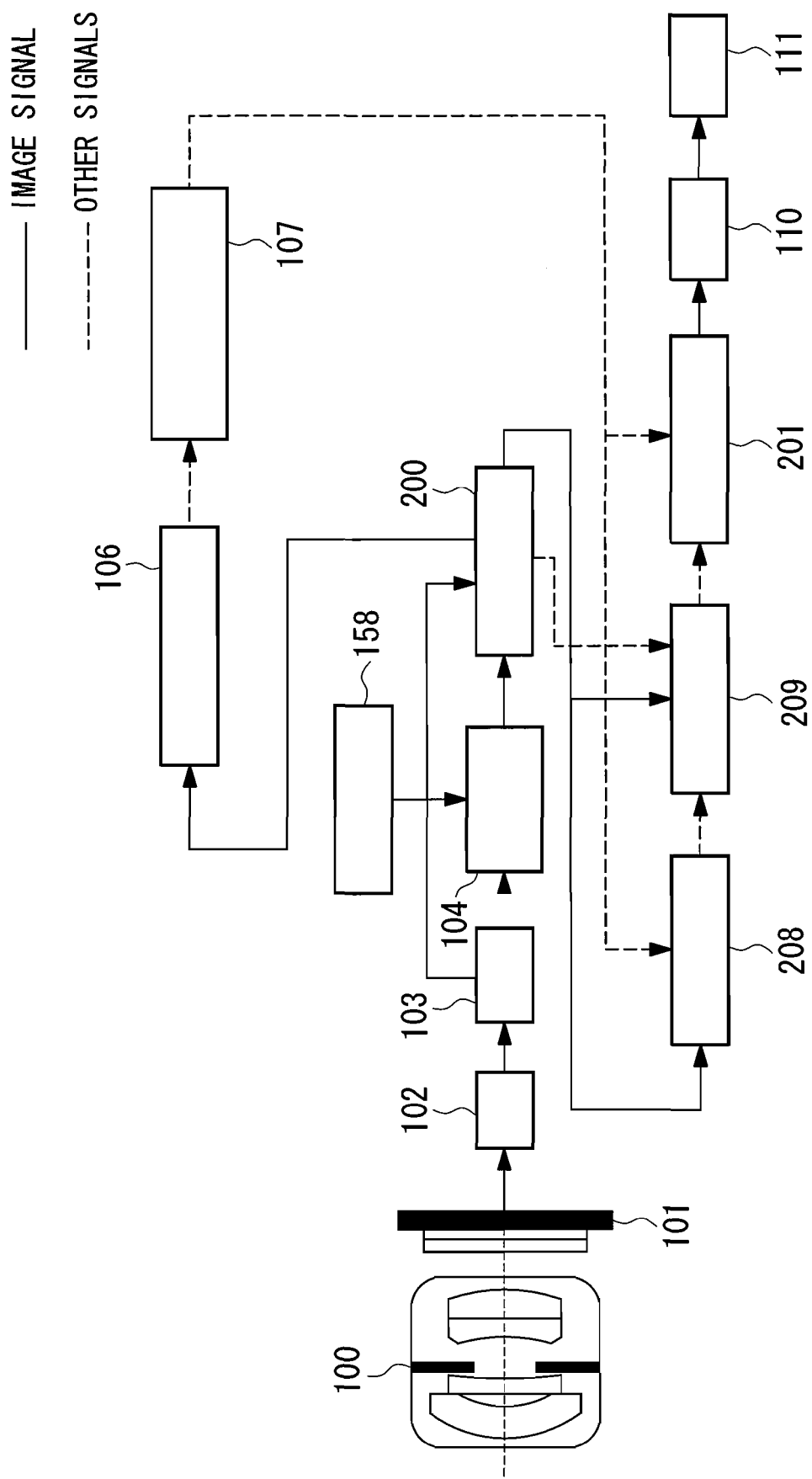
FIG. 18 is a block diagram of the overall structure of an image-acquisition apparatus according to a second embodiment of the present invention.

FIG. 18 is a block diagram of the overall structure of the image-acquisition apparatus according to the second embodiment of the present invention.

The second embodiment has substantially the same structure as the above-described first embodiment. However, the second embodiment differs from the first embodiment in that a signal processing unit 200 is included instead of the signal processing unit 105, a noise estimating unit 208 is included instead of the noise estimating unit 108, a noise reducing unit 209 is included instead of the noise reducing unit 109, and a correction-coefficient multiplication unit 201 is further included.

Features of the image-processing apparatus according to this embodiment that are the same as those according to the first embodiment will not be described, and mainly differences will be described below. Components that are the same as those according to the first embodiment are represented by the same names and reference numerals.

In FIG. 18, the reduction-ratio setting unit 158 is connected to the reduced-image creating unit 104. The signal processing unit 200 is connected to the correction-coefficient calculation unit 106, the noise estimating unit 208, and the noise reducing unit 209. The correction-coefficient calculation unit 106 is connected to the correction-coefficient map buffer 107. The correction-coefficient map buffer 107 is connected to the noise estimating unit 208 and the correction-coefficient multiplication unit 201. The noise estimating unit 208 is connected to the noise reducing unit 209. The noise reducing unit 209 is connected to the correction-coefficient multiplication unit 201. The correction-coefficient multiplication unit 201 is connected to the compressing unit 110. The compressing unit 110 is connected to the output unit 111.

Next, the operation of the image-acquisition apparatus according to this embodiment will be briefly described.

When the user pushes a shutter button (not shown) after image-acquisition conditions, such as ISO sensitivity, are set via an external I/F (not shown), a subject image formed by the lens system 100 is converted from an optical subject into an electric signal by the CCD 101 and is output as an analog signal. The CCD 101 according to this embodiment is assumed to be a single-chip CCD having a Bayer primary-color filter disposed on the front surface. The analog signal is converted into a digital signal at the A/D converter 102 and is transferred to the buffer 103. In this embodiment, the A/D converter 102 is assumed to convert an analog signal into a digital signal based on a 12-bit grayscale.

An image signal in the buffer 103 is first transferred to the reduced-image creating unit 104. With the aim of increasing the speed of correction coefficient calculation, the reduced-image creating unit 104 creates a reduced-image signal from the image signal on the basis of a reduction ratio that has been set for correction coefficient calculation in the reduction-ratio setting unit 158. As a method of reducing an image, for example, a down-sampling method according to the related art may be employed. Emphasis may be placed on the accuracy of the correction coefficient calculation by setting the reduction ratio high or the same as that of the image signal. A reduced-image signal produced in this way is transferred to the signal processing unit 200.

The signal processing unit 200 performs WB adjustment, interpolation, chroma enhancement, grayscale conversion, and edge enhancement on the reduced-image signal from the reduced-image creating unit 104 and transfers the signal to the correction-coefficient calculation unit 106.

The correction-coefficient calculation unit 106 extracts rectangular areas of a predetermined size centered on a target pixel, which, for example, in this embodiment, are each a prescribed area of 16 by 16 pixel units. The correction-coefficient calculation unit 106 sets a grayscale conversion curve on the basis of a histogram of the extracted prescribed areas and determines correction coefficients associated with the target pixels by carrying out grayscale conversion based on the conversion curve. Furthermore, the correction-coefficient calculation unit 106 calculates correction coefficients (area correction coefficients) for pixels of the original image signal corresponding to pixels of the reduced image on the basis of the reduction ratio of the reduced image and records the correction coefficients in the correction-coefficient map buffer 107. In this way, area correction coefficients corresponding to the pixels of the original image signal are recorded in the correction-coefficient map buffer 107. The area correction coefficients are used for noise reduction and signal processing (correction coefficient multiplication) described below.

Next, the signal processing unit 200 directly reads out an original image signal from the buffer 103, performs WB adjustment, interpolation, chroma enhancement, grayscale conversion, edge enhancement, and so on the original image signal, and then the processed original image signal is transferred to the noise estimating unit 208 and the noise reducing unit 209. Similar to the signal processing unit 105 according to the above-described first embodiment, the signal processing unit 200 internally includes the edge enhancement processing unit 125 (see FIG. 2). The signal processing unit 200 calculates and stores edge correction coefficients for the image signal calculated by the edge enhancement processing unit 125. The edge correction coefficients are used for noise reduction at the noise estimating unit 208 described below.

The noise estimating unit 208 extracts, from the processed original image signal input from the signal processing unit 200, a rectangular area of a predetermined size centered on a target pixel, which is, for example, a prescribed area of 3 by 3 pixel units in this embodiment. Subsequently, the noise estimating unit 208 estimates the amounts of noise in the target pixels on the basis of the extracted prescribed areas, the area correction coefficients obtained from the correction-coefficient map buffer 107, and ISO sensitivity set by an external I/F during image acquisition and transfers the estimated amounts of noise to the noise reducing unit 209.

The noise reducing unit 209 extracts target pixels from the image signal input from the signal processing unit 200, performs noise reduction on the basis of the amounts of noise estimated by the noise estimating unit 208 and edge correction coefficients calculated during edge enhancement, and transfers the noise-reduced image signal to the correction-coefficient multiplication unit 201.

The correction-coefficient multiplication unit 201 performs correction by multiplying the image signal from the noise reducing unit 209 by area correction coefficients obtained from the correction-coefficient map buffer 107. If a specific level is exceeded, the level is corrected by clipping so that the level is within a specific range. Then, when all of the pixels are corrected, the correction-coefficient multiplication unit 201 transfers this image signal to the compressing unit 110 as a final image signal. The compressing unit 110 converts the processed image signal into an RGB signal on the basis of the above-described Equation (2), then performs compression according to the related art, and transfers the compressed image signal to the output unit 111. The output unit 111 records the signal on a memory card.

Figure 19:
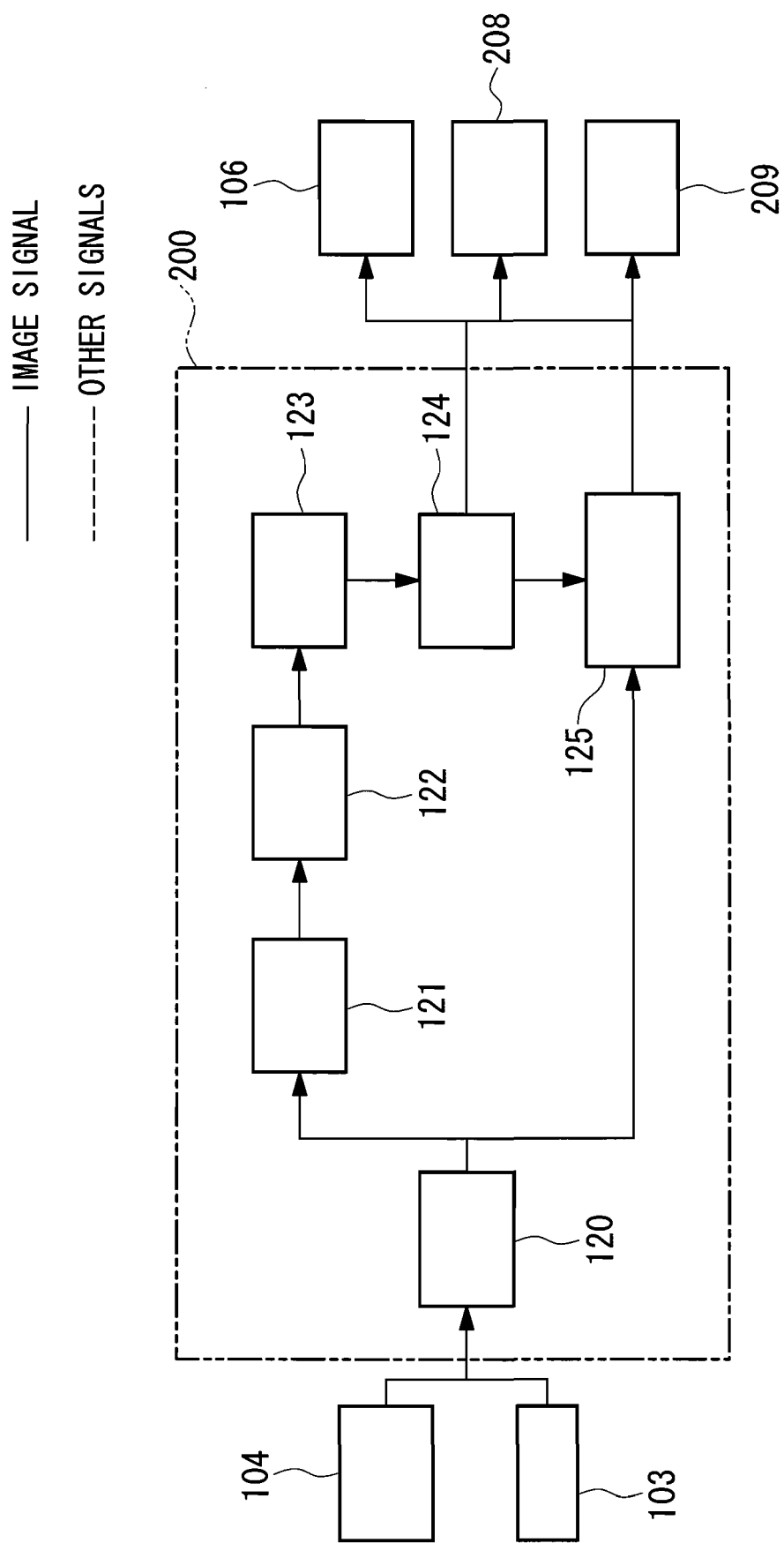
FIG. 19 is a block diagram of the overall structure of the signal processing unit shown in FIG. 18.

FIG. 19 is a block diagram of an example configuration of the signal processing unit 200. As shown in the drawing, the signal processing unit 200 includes a WB unit 120, an interpolation unit 121, a chroma enhancement unit 122, a grayscale conversion unit 123, a Y/C separation unit 124, and an edge enhancement processing unit 125.

The reduced-image creating unit 104 and the buffer 103 are connected to the WB unit 120. The WB unit 120 is connected to the interpolation unit 121 and the edge enhancement processing unit 125. The interpolation unit 121 is connected to the chroma enhancement unit 122. The chroma enhancement unit 122 is connected to the grayscale conversion unit 123. The grayscale conversion unit 123 is connected to the Y/C separation unit 124. The Y/C separation unit 124 is connected to the edge enhancement processing unit 125. The edge enhancement processing unit 125 and the Y/C separation unit 124 are connected to the correction-coefficient calculation unit 106, the noise estimating unit 208, and the noise reducing unit 209.

The WB unit 120 carries out WB adjustment by multiplying each color signal by a predetermined WB coefficient on the basis of image-acquisition information. The WB-adjusted image signal is transferred to the interpolation unit 121 and the edge enhancement processing unit 125. The interpolation unit 121 carries out interpolation on the WB-adjusted image signal. The interpolated image signal is transferred to the chroma enhancement unit 122. The chroma enhancement unit 122 carries out chroma enhancement by carrying out matrix multiplication on each color signal from the interpolation unit 121. The chroma-enhanced signal is transferred to the grayscale conversion unit 123. The grayscale conversion unit 123 carries out grayscale conversion on the basis of a conversion curve set in advance according to each color signal level. If the level exceeds the grayscale range, clipping is carried out so that the level does not exceed a predetermined range.

The grayscale-converted signal is transferred to the Y/C separation unit 124. The Y/C separation unit 124 separates each color signal into a luminance signal Y and a color-difference signal C on the basis of Equations (1). The luminance signal Y is transferred to the edge enhancement processing unit 125. The edge enhancement processing unit 125 extracts edge components by performing filtering on the color signal from the WB unit 120 and performs edge enhancement by adding the extracted edge components to the interpolated luminance signal Y. When the image signal transferred from the buffer 103 to the signal processing unit 200 is the original image signal, the edge enhancement processing unit 125 calculates edge correction coefficients from the edge components and uses these edge correction coefficients in noise reduction to be performed later.

The edge-enhanced luminance signal Y is transferred to the correction-coefficient calculation unit 106 together with the color-difference signal C separated at the Y/C separation unit 124 when the signal is a reduced-image signal and is transferred to the noise estimating unit 208 and the noise reducing unit 209 when the signal is an original image signal.

Figure 20:
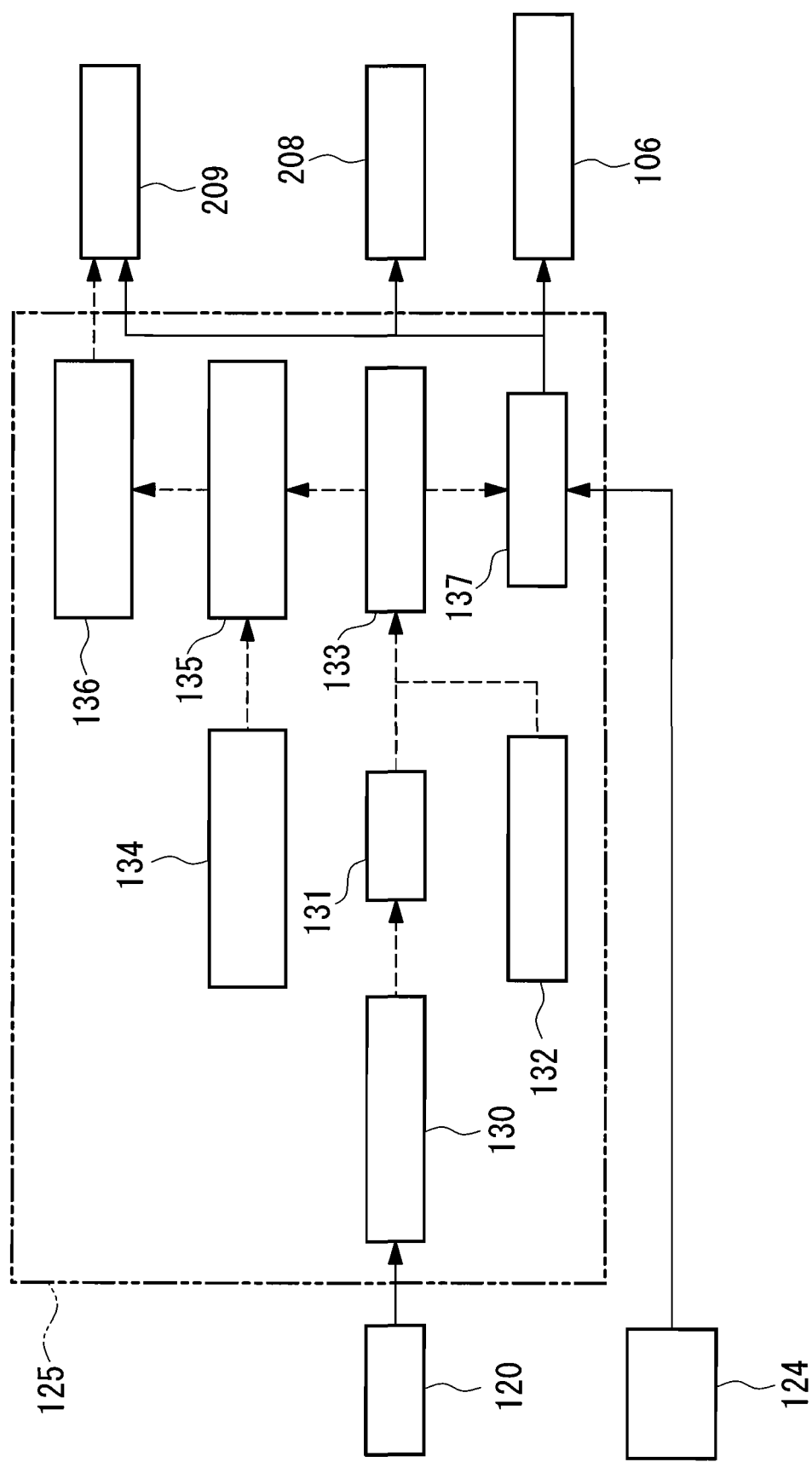
FIG. 20 is a block diagram of the overall structure of the edge enhancement unit shown in FIG. 19.

FIG. 20 is a block diagram of an example configuration of the edge enhancement processing unit 125. As shown in the drawing, the edge enhancement processing unit 125 according to this embodiment has a configuration that is substantially the same as that of the edge enhancement unit according to the first embodiment. However, the edge enhancement unit 137 is connected to different units. In other words, in the above-described first embodiment, the edge enhancement unit 137 is connected only to the correction-coefficient multiplication unit 126 (see FIG. 3), but in this embodiment, the edge enhancement unit 137 is connected to the correction-coefficient calculation unit 106, the noise estimating unit 208, and the noise reducing unit 209. Descriptions of the operations of these units are omitted since the operations are the same as those according to the first embodiment.

Figure 21:
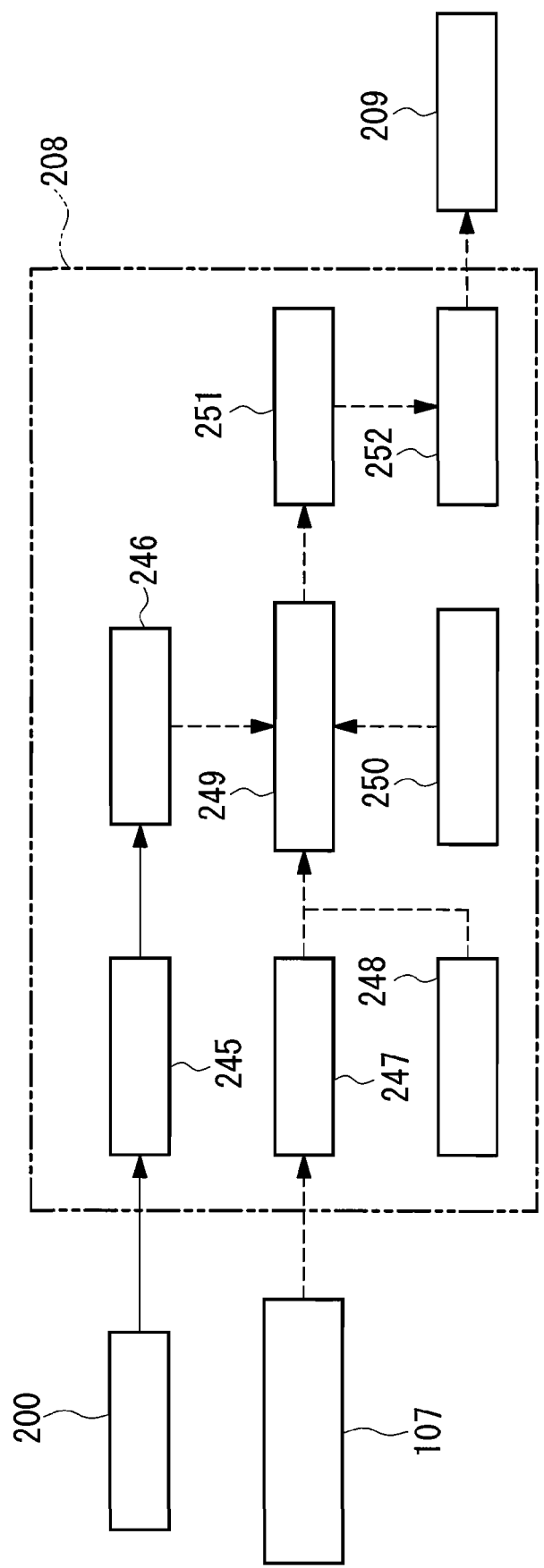
FIG. 21 is a block diagram of the overall structure of the noise estimating unit shown in FIG. 18.

FIG. 21 is a block diagram of an example configuration of the noise estimating unit 208. As shown in the drawing, the noise estimating unit 208 includes an extracting unit 245, an average-calculation unit 246, a gain calculation unit 247, a standard-value application unit 248, a parameter selecting unit 249, a parameter ROM 250, an interpolation unit 251, and a correction unit 252.

The signal processing unit 200 is connected to the extracting unit 245. The extracting unit 245 is connected to the average-calculation unit 246. The average-calculation unit 246 is connected to the parameter selecting unit 249. The correction-coefficient map buffer 107 is connected to the gain calculation unit 247. The gain calculation unit 247, the standard-value application unit 248, and the parameter ROM 250 are connected to the parameter selecting unit 249. The parameter selecting unit 249 is connected to the interpolation unit 251. The interpolation unit 251 is connected to the correction unit 252. The correction unit 252 is connected to the noise reducing unit 209. The noise estimating unit 208 according to this embodiment estimates the amount of noise in the luminance signal Y and the color-difference signal C by using the same method used for estimating the amount of noise of the color signals in the first embodiment. This is described in detail below.

The extracting unit 245 extracts signals corresponding to prescribed areas from the image signal input from the signal processing unit 200 and transfers the extracted signals to the average-calculation unit 246. The average-calculation unit 246 calculates the average value of the prescribed areas, which is used to perform noise reduction, from the signals corresponding to prescribed areas input from the extracting unit 245 and transfers the average value to the parameter selecting unit 249. The gain calculation unit 247 reads out area correction coefficients for target pixels from the correction-coefficient map buffer 107 and transfers the area correction coefficients to the parameter selecting unit 249. The parameter selecting unit 249 estimates the amount of noise on the basis of the average value of the prescribed areas from the average-calculation unit 246 and the area correction coefficients from the gain calculation unit 247. The processes of formulation of a model of the amount of noise, simplification of the model, and the calculation of the amount of noise for the luminance signal Y and the color-difference signal C are the same as those according to the above-described first embodiment. Therefore, descriptions thereof are omitted here. The estimated amount of noise and the average value are transferred to the noise reducing unit 209.

Figure 22:
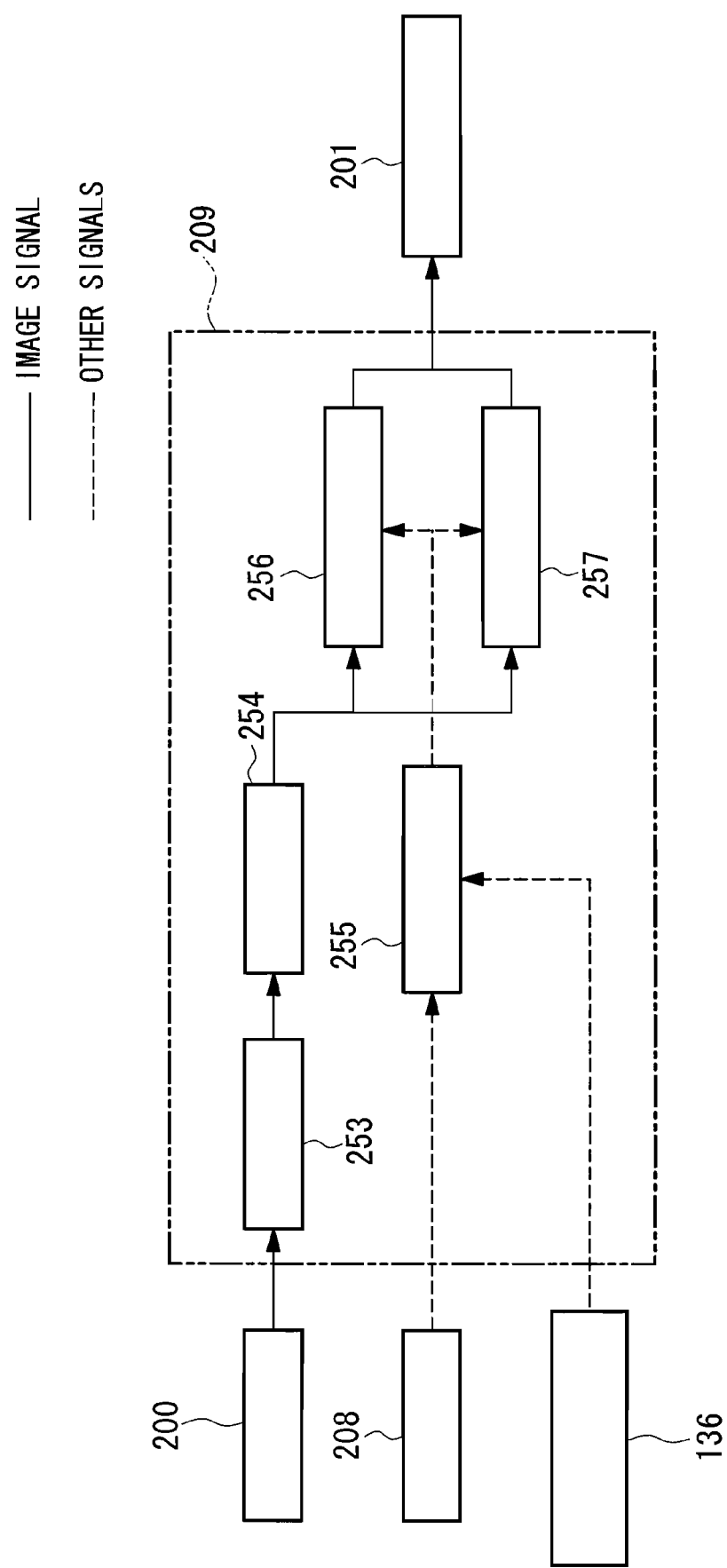
FIG. 22 is a block diagram of the overall structure of the noise reducing unit shown in FIG. 18.

FIG. 22 is a block diagram of an example configuration of the noise reducing unit 209. As shown in the drawing, the noise reducing unit 209 includes an extracting unit 253, a switching unit 254, a range setting unit 255, a first smoothing unit 256, and a second smoothing unit 257.

The signal processing unit 200 is connected to the extracting unit 253. The extracting unit 253 is connected to the switching unit 254. The noise estimating unit 208 and the edge-correction-coefficient map buffer 136 are connected to the range setting unit 255. The switching unit 254 and the range setting unit 255 are connected to the first smoothing unit 256 and the second smoothing unit 257. The first smoothing unit 256 and the second smoothing unit 257 are connected to the correction-coefficient multiplication unit 201.

The noise reducing unit 209 according to this embodiment performs noise reduction on the luminance signal Y and the color-difference signal C by employing the same method used in the first embodiment to perform noise reduction on the color signals. Since the methods used for setting an allowable range of the amount of noise in the luminance signal Y and the color-difference signal C and reducing noise are the same as those in the first embodiment, descriptions thereof are omitted here. A noise-reduced image signal is transferred to the correction-coefficient multiplication unit 201.

As described above, in the image-acquisition apparatus according to this embodiment, predetermined image processing, such as reduction and WB adjustment, is performed on the image signal from the image-acquisition device (i.e., original image signal) in the signal processing unit 200, and area correction coefficients used for grayscale conversion in the areas, i.e., correction coefficients associated with space-variant grayscale conversion, are calculated on the basis of the image-processed image signal in the correction-coefficient calculation unit 106. Next, in the noise reducing unit 209, noise reduction using the area correction coefficients is performed on the original image signal processed at the signal processing unit 200, and then grayscale conversion of the areas using the area correction coefficients is performed on the noise-reduced image signal in the correction-coefficient multiplication unit 201.

In this way, since area correction coefficients, which are correction coefficients associated with space-variant grayscale conversion, for an image signal on which predetermined signal processing has been performed are calculated, and noise reduction and grayscale conversion using the area correction coefficients are performed on the image signal on which predetermined signal processing has been carried out, it is possible to reduce the sense of unnaturalness caused by a difference in the impression of noise in different enhanced areas when space-variant grayscale conversion is carried out. Moreover, there are advantages in that, since processing is carried out in sequence, compatibility with conventional signal processing systems is high, and the image-acquisition apparatus can be used in various apparatuses.

In this embodiment, processing is carried out by hardware. However, the processing is not limited thereto. For example, it is also possible to use a configuration in which the unprocessed signal from the CCD 101 is used as Raw data, and image-acquisition information, such as ISO sensitivity, from an external I/F is extracted as header information and processed in separate software.

Figure 23:
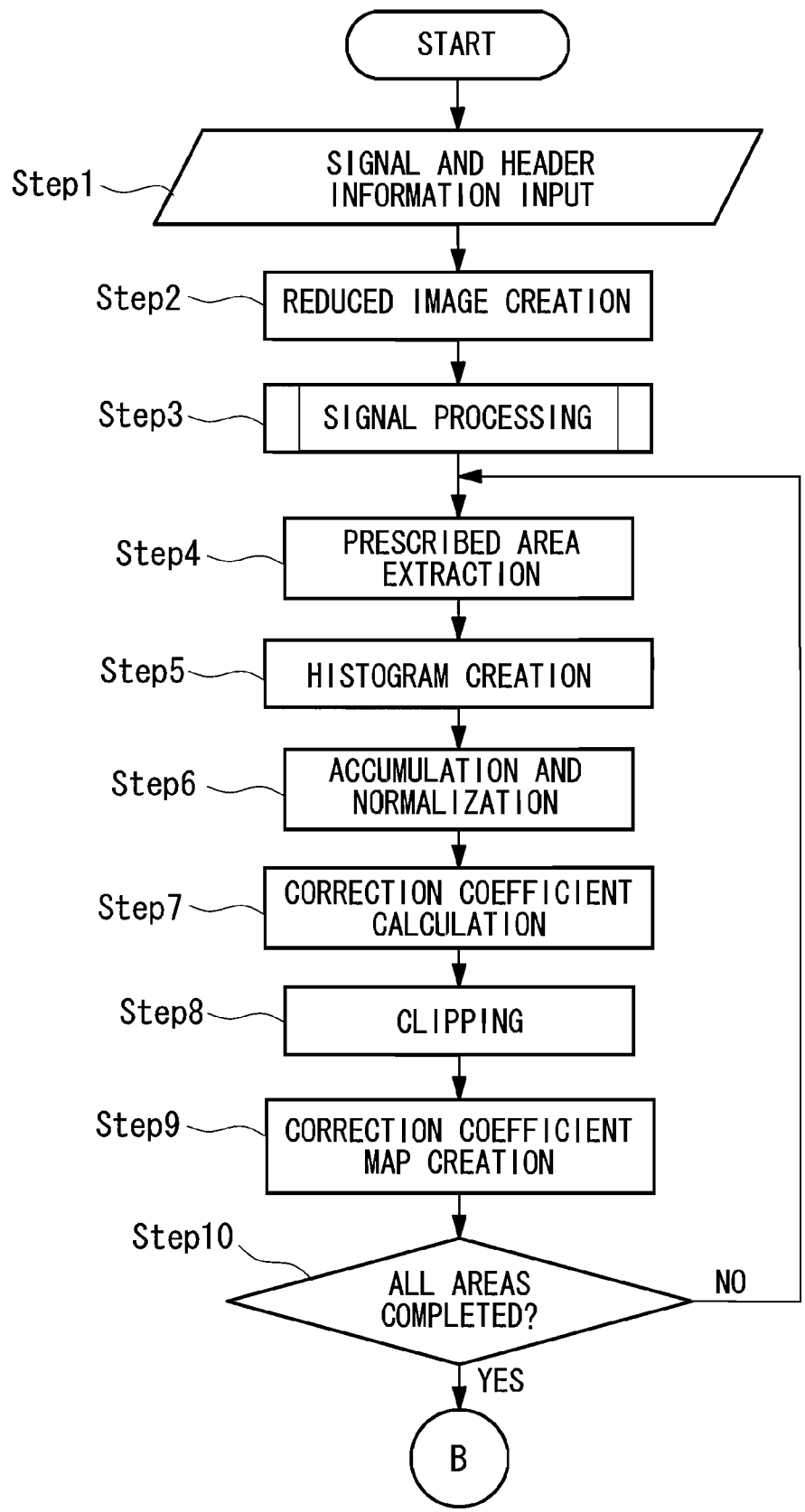
FIG. 23 is a flow chart illustrating the steps of signal processing executed by the image-acquisition apparatus according to a second embodiment of the present invention.

FIG. 23 is a flow chart illustrating the process of software signal processing. Steps that are the same as those in the flow according to the first embodiment illustrated in FIGS. 13 and 14 are represented by the same step number.

In Step 1 in FIG. 1, an image signal and header information including image-acquisition information, such as ISO sensitivity, are read out. In Step 2, a reduced image for correction coefficient calculation is created. In Step 3, signal processing, such as WB adjustment, color interpolation, chroma enhancement, grayscale conversion, and edge enhancement, is performed. In Step 4, prescribed areas of 16 by 16 pixel units are extracted, and in Step 5, histograms are created. In Step 6, the histograms created in Step 5 are accumulated, and normalization is carried out. In Step 7, a grayscale conversion curve is set on the basis of the accumulated histograms and correction coefficients for pixels are calculated on the basis of the conversion curve. In Step 8, clipping is performed on the calculated correction coefficients, and in Step 9, area correction coefficients for pixels corresponding to the original signal are calculated on the basis of the correction coefficients for a reduced image and are recorded in the correction-coefficient map buffer.

In Step 10, it is determined whether extraction of all areas has been completed. If extraction is completed, the process proceeds to Step 50 in FIG. 24, whereas, if extraction is not completed, the process proceeds to Step 4. In Step 50 in FIG. 24, WB adjustment, color interpolation, chroma enhancement, and grayscale conversion are performed. In Step 51, calculation of edge correction coefficients and edge enhancement are carried out. In Step 52, noise reduction is performed on the basis of area correction coefficients, edge correction coefficients, and ISO sensitivity. In Step 53, the image signal is multiplied by the area correction coefficients. In Step 15, signal compression is performed by a signal compression technique according to the related art. In Step 16, the processed image signal is output, and the process ends. The processes of noise reduction and estimation of the amount of noise carried out in Step 52 and edge enhancement carried out in Step 51 are the same as those according to the first embodiment.

Third Embodiment

Next, an image-acquisition apparatus according to a third embodiment of the present invention will be described with reference to the drawings.

Figure 25:
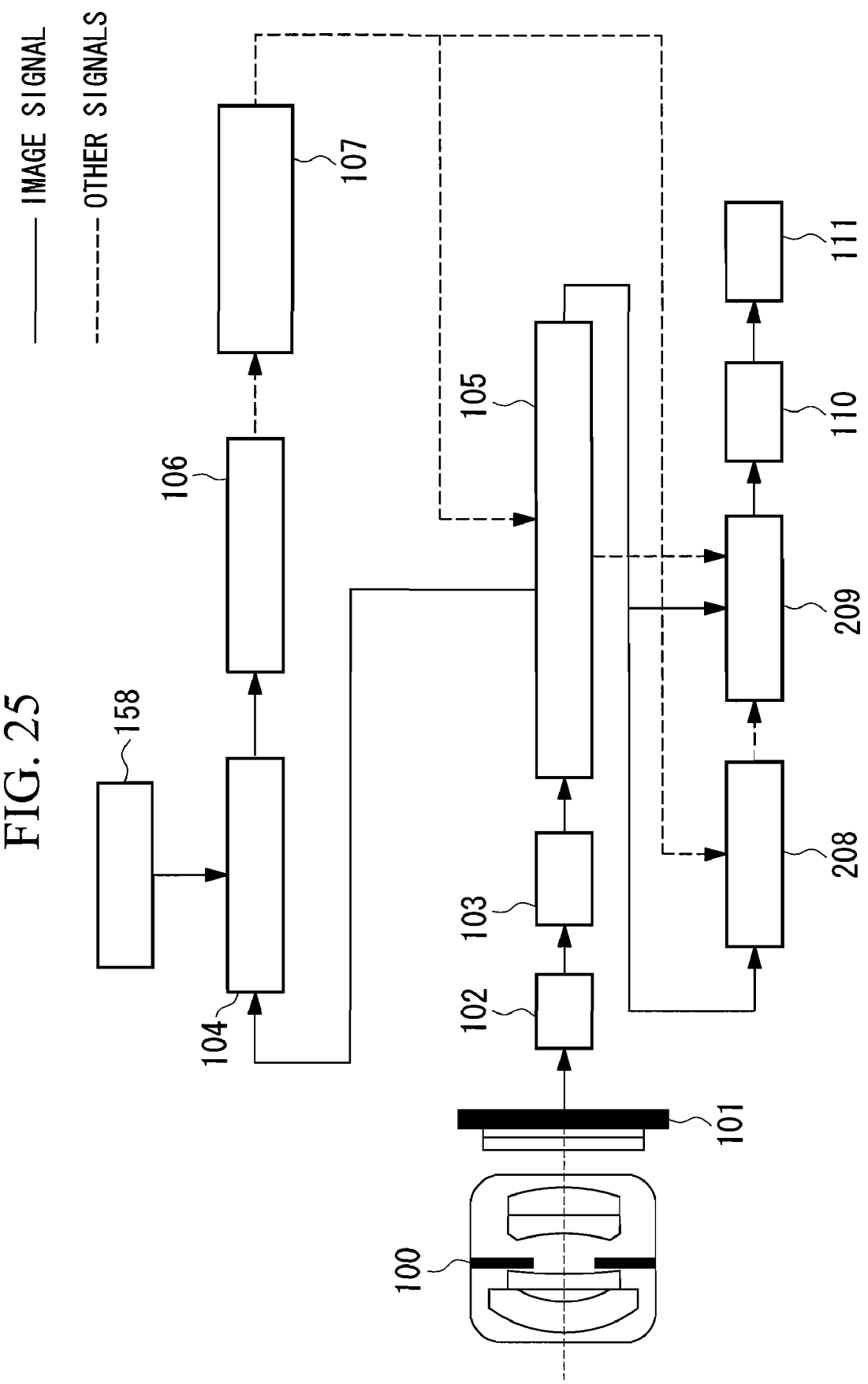
FIG. 25 is a block diagram of the overall structure of an image-acquisition apparatus according to a third embodiment of the present invention.

FIG. 25 is a block diagram of the overall structure of the image-acquisition apparatus according to the third embodiment of the present invention.

Features of the image-acquisition apparatus according to this embodiment that are the same as those according to the first embodiment will not be described, and mainly differences will be described below. Components that are the same as those according to the first embodiment are represented by the same names and reference numerals.

In FIG. 25, the signal processing unit 105 is connected to the reduced-image creating unit 104, the noise estimating unit 208, and the noise reducing unit 209. The reduction-ratio setting unit 158 is connected to the reduced-image creating unit 104. The reduced-image creating unit 104 is connected to the correction-coefficient calculation unit 106. The correction-coefficient calculation unit 106 is connected to the correction-coefficient map buffer 107. The correction-coefficient map buffer 107 is connected to the signal processing unit 105 and the noise estimating unit 208. The noise estimating unit 208 is connected to the noise reducing unit 209. The noise reducing unit 209 is connected to the compressing unit 110. The compressing unit 110 is connected to the output unit 111.

In the image-acquisition apparatus having the above-described configuration, when the user pushes a shutter button (not shown) after image-acquisition conditions, such as ISO sensitivity, are set via an external I/F (not shown), a subject image formed by the lens system 100 is converted from an optical subject into an electric signal by the CCD 101 and is output as an analog signal. The CCD 101 according to this embodiment is assumed to be a single-chip CCD having a Bayer primary-color filter disposed on the front surface. The analog signal is converted into a digital signal at the A/D converter 102 and is transferred to the buffer 103. In this embodiment, the A/D converter 102 is assumed to convert an analog signal into a digital signal according to a 12-bit grayscale. An image signal in the buffer is first transferred to the signal processing unit 105.

The signal processing unit 105 reads out the image signal from the buffer 103, generates an image signal by carrying out WB adjustment, interpolation, chroma enhancement, grayscale conversion, and edge enhancement, and transfers this image signal to the reduced-image creating unit 104. If correction coefficients have not yet been calculated for an unprocessed image signal, processing is not carried out on the edge-enhanced image signal in the correction-coefficient multiplication unit 126, and instead the image signal is transferred to the reduced-image creating unit 104. The signal processing unit 105 calculates edge correction coefficients from edge components extracted during edge enhancement. The edge correction coefficients are used in noise reduction performed in the noise reducing unit 209 later.

With the aim of increasing the speed of correction coefficient calculation, the reduced-image creating unit 104 creates a reduced-image signal from the image signal on the basis of a reduction ratio that has been set for correction coefficient calculation in the reduction-ratio setting unit 158. As a method of reducing an image, for example, a down-sampling method according to the related art may be employed. Emphasis may be placed on the accuracy of the correction coefficient calculation by setting the reduction ratio high or the same as the image signal. The reduced-image signal is transferred to the correction-coefficient calculation unit 106.

The correction-coefficient calculation unit 106 extracts rectangular areas of a predetermined size centered on a target pixel, which, for example, in this embodiment, are each a prescribed area of 16 by 16 pixel units. The correction-coefficient calculation unit 106 sets a grayscale conversion curve on the basis of a histogram of the extracted prescribed areas and determines correction coefficients associated with the target pixels by carrying out grayscale conversion based on the conversion curve. Subsequently, the correction-coefficient calculation unit 106 calculates correction coefficients for pixels of the original image signal (area correction coefficients) corresponding to pixels of the reduced image on the basis of the reduction ratio obtained from the reduced-image creating unit 104 and transferred to the correction-coefficient map buffer 107. In this way, area correction coefficients corresponding to the pixels of the original image signal are recorded in the correction-coefficient map buffer 107. The area correction coefficients are used for signal processing (correction coefficient multiplication) and noise reduction described below.

Subsequently, the signal processing unit 105 obtains the area correction coefficients from the correction-coefficient map buffer 107 and multiplies the edge-enhanced image signal by the obtained area correction coefficients so as to perform space-variant grayscale conversion on the processed image signal. At this time, if a specific level is exceeded, the level is corrected by clipping so that the level is within a specific range. Then, when all of the pixels are corrected, the signal processing unit 105 transfers the processed image signal to the noise estimating unit 208 and the noise reducing unit 209.

The noise estimating unit 208 extracts, from the processed image signal input from the signal processing unit 105, rectangular areas of a predetermined size centered on a target pixel, which, for example, in this embodiment, are each a prescribed area of 5 by 5 pixel units. Subsequently, the noise estimating unit 208 estimates the amounts of noise in the target pixels of the extracted prescribed areas on the basis of the area correction coefficients obtained from the correction-coefficient map buffer 107 and ISO sensitivity set by an external I/F during image acquisition and transfers the estimated amounts of noise to the noise reducing unit 209.

The noise reducing unit 209 extracts target pixels from the image signal input from the signal processing unit 105 and performs noise reduction on the extracted target pixels on the basis of the amount of noise from the noise estimating unit 208 and the edge correction coefficients calculated during edge enhancement. The noise-reduced image signal is transferred to the compressing unit 110.

The compressing unit 110 converts the processed image signal into an RGB signal on the basis of Equations (2), then carries out compression according to the related art, and transfers the compressed RGB signal to the output unit 111. The output unit 111 records the signal on a memory card.

Figure 26:
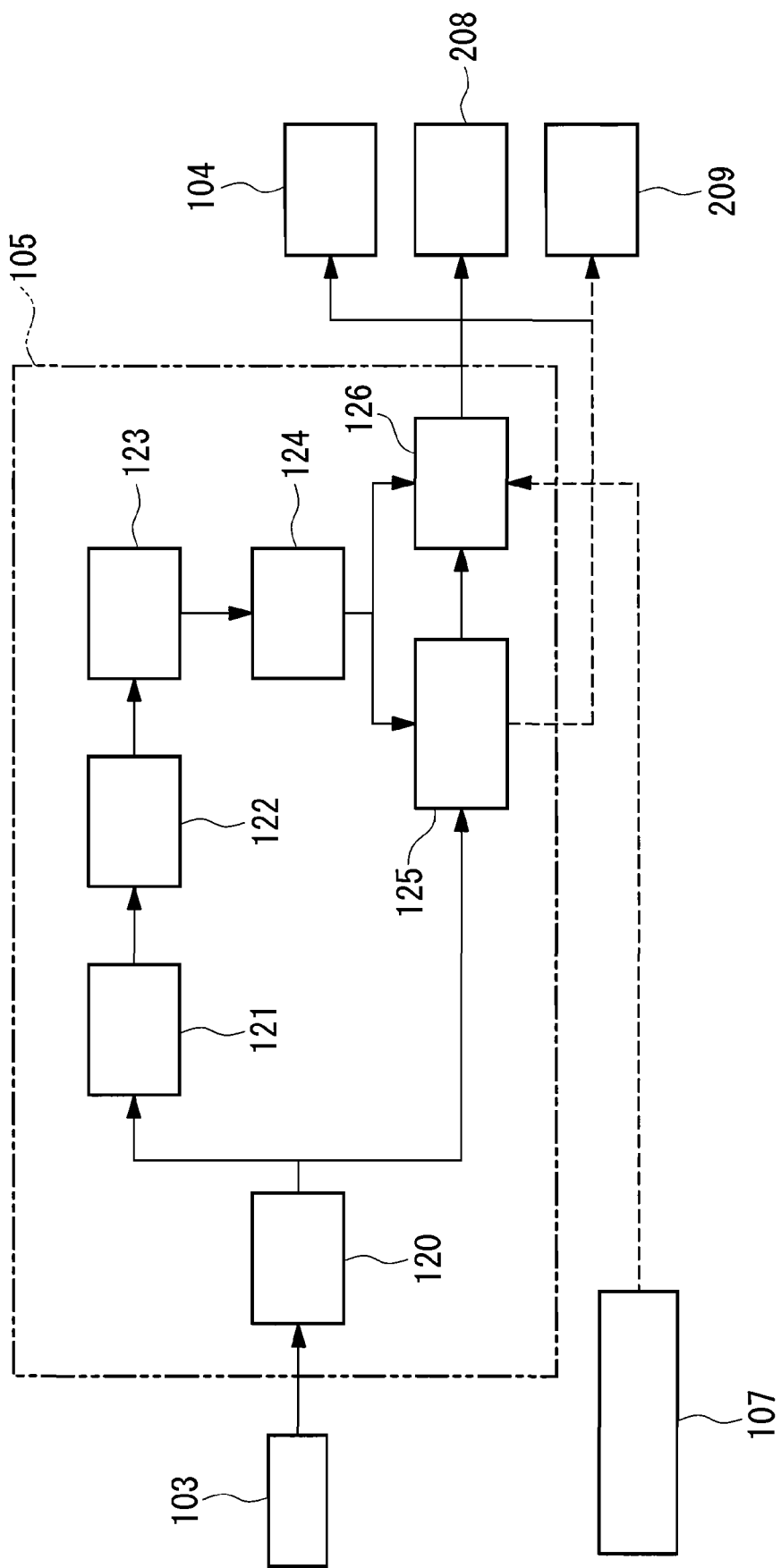
FIG. 26 is a block diagram of the overall structure of the signal processing unit shown in FIG. 25.

FIG. 26 is a block diagram of an example configuration of the signal processing unit 105. As shown in the drawing, the signal processing unit 105 according to this embodiment has basically the same configuration as that of the signal processing unit according to the first embodiment. However, the signal processing unit 105 according to this embodiment differs from the signal processing unit according to the first embodiment in that only the buffer 103 is connected to the WB unit 120 and that the correction-coefficient multiplication unit 126 is connected to the reduced-image creating unit 104, the noise estimating unit 208, and the noise reducing unit 209. Since the operations of the units are the same, descriptions thereof are omitted here.

Figure 27:
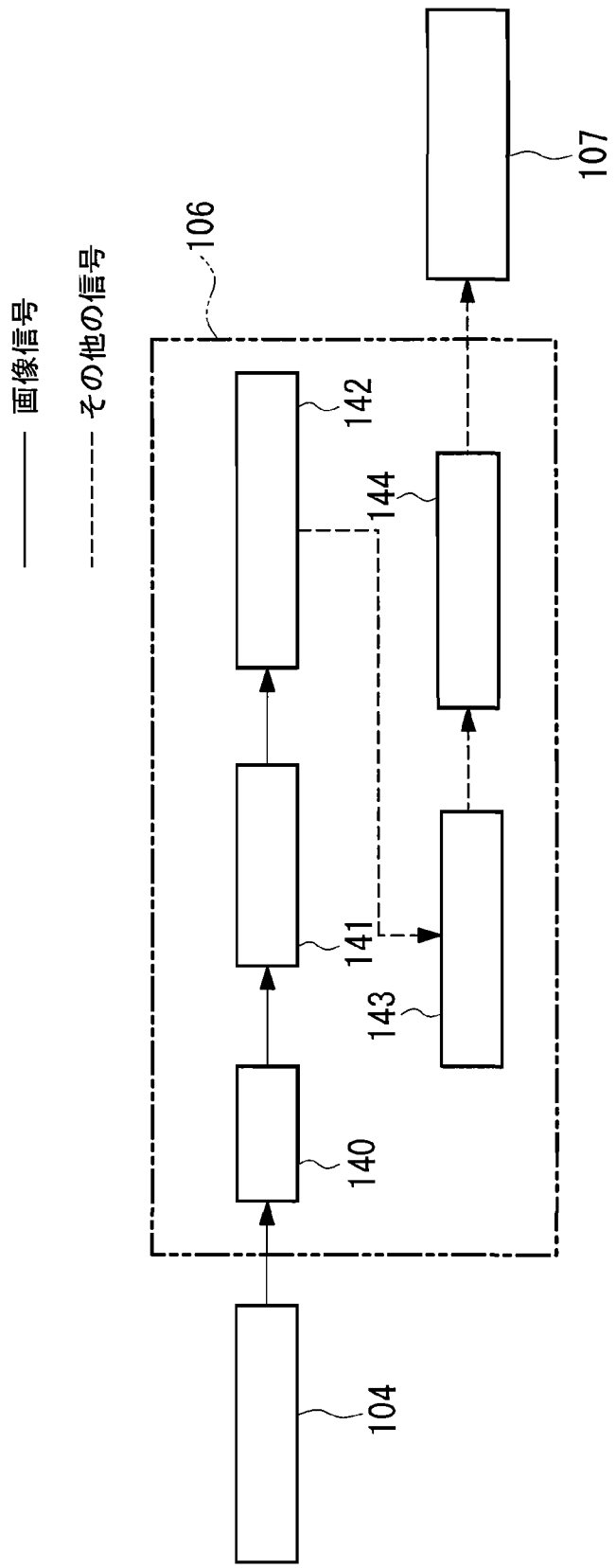
FIG. 27 is a block diagram of the overall structure of the correction-coefficient calculation unit shown in FIG. 25.

FIG. 27 is a block diagram of an example configuration of the correction-coefficient calculation unit 106. As shown in the drawing, the correction-coefficient calculation unit 106 according to this embodiment has basically the same configuration as that of the correction-coefficient calculation unit 106 according to the first embodiment. However, the correction-coefficient calculation unit 106 according to this embodiment differs from that of the first embodiment in that the reduced-image creating unit 104 is connected to the buffer 140. Since the operations of the units are the same, descriptions thereof are omitted here.

Figure 28:
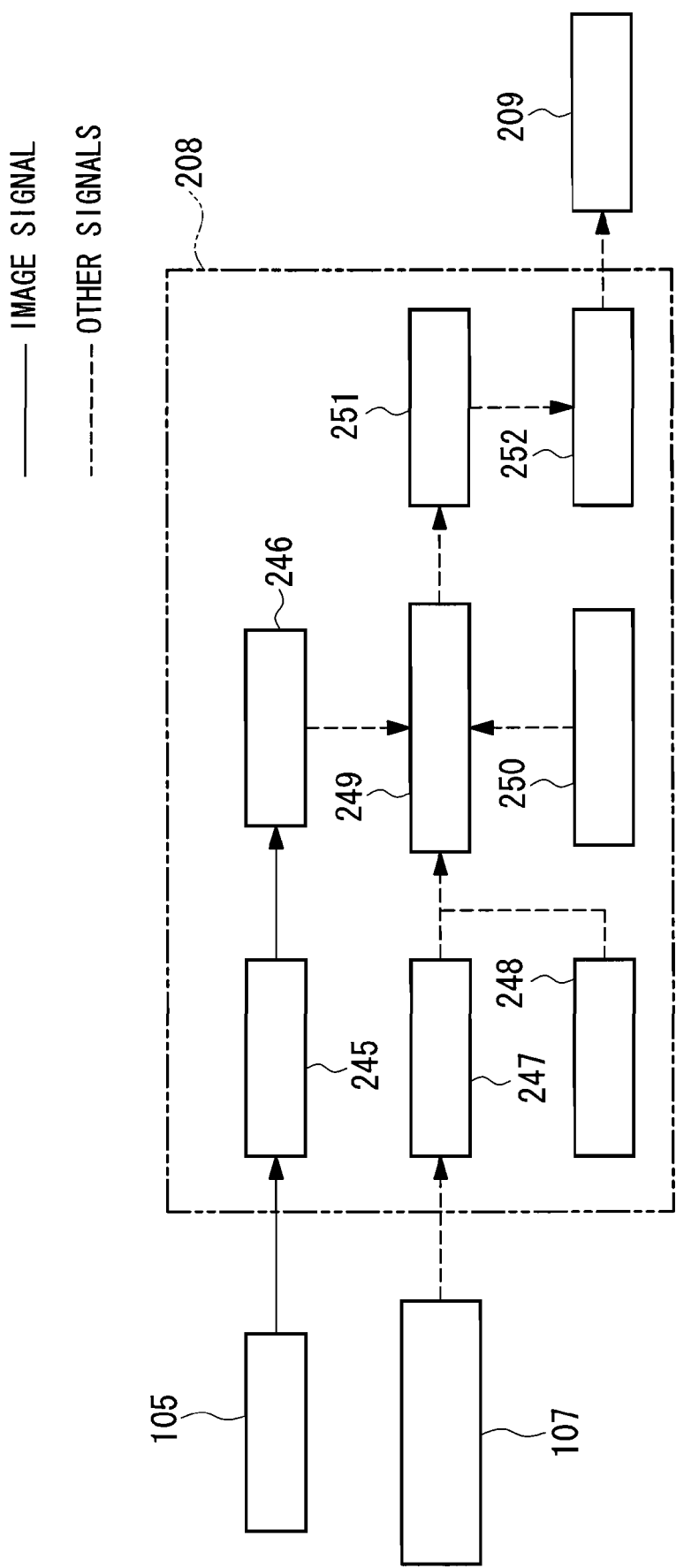
FIG. 28 is a block diagram of the overall structure of the noise estimating unit shown in FIG. 25.

FIG. 28 is a block diagram of an example configuration of the noise estimating unit 208. As shown in the drawing, the noise estimating unit 208 according to this embodiment has substantially the same configuration as that of the noise estimating unit 208 according to the second embodiment. However, the noise estimating unit 208 according to this embodiment differs from that according to the second embodiment in that the signal processing unit 105 is connected to the extracting unit 145. Since the operations of the units are the same, descriptions thereof are omitted here.

Figure 29:
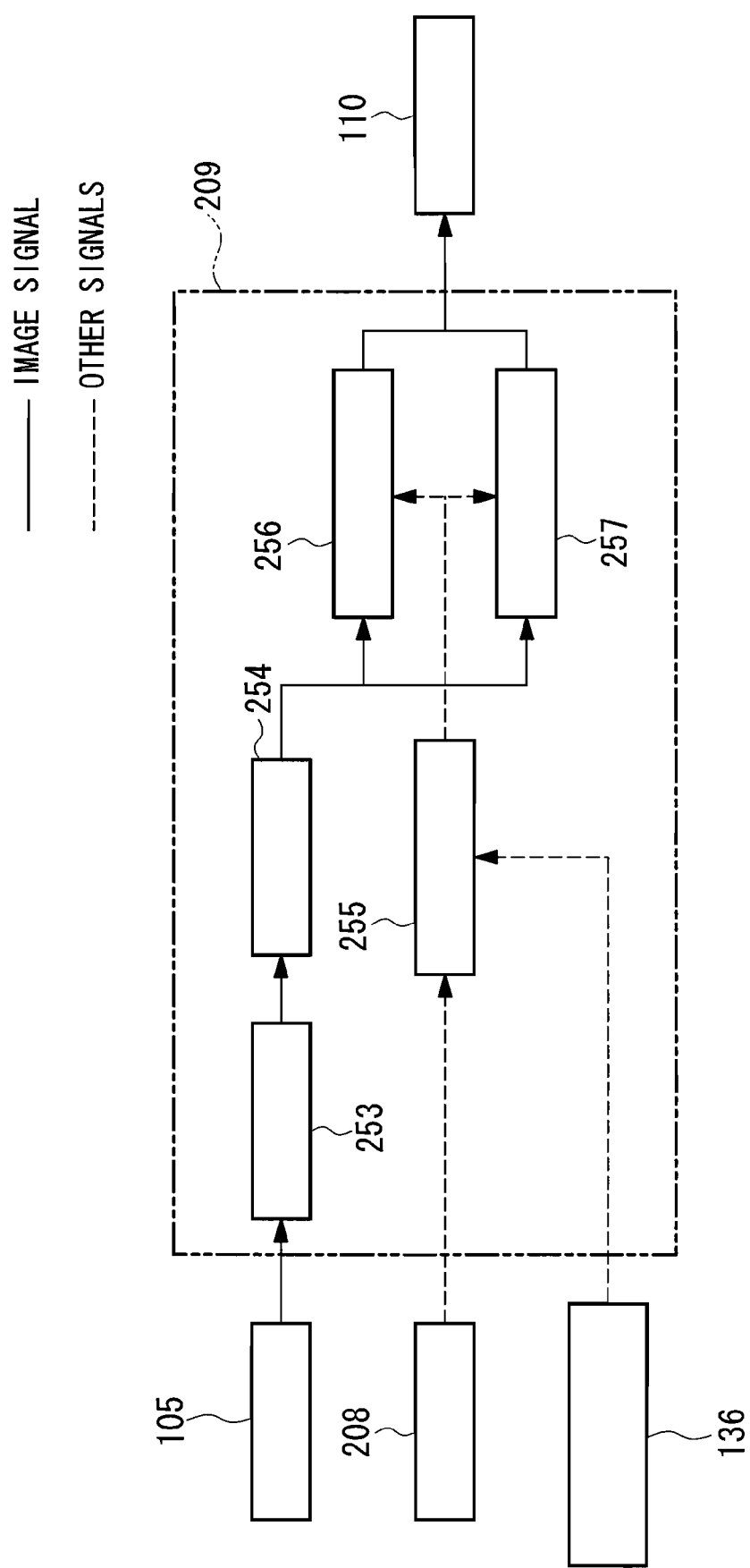
FIG. 29 is a block diagram of the overall structure of the noise reducing unit shown in FIG. 25.

FIG. 29 is a block diagram of an example configuration of the noise reducing unit 209. As shown in the drawing, the noise reducing unit 209 according to this embodiment has basically the same configuration as that according to the second embodiment. However, the noise reducing unit 209 according to this embodiment differs from that according to the second embodiment in that the signal processing unit 105 is connected to the extracting unit 253, and the first smoothing unit 256 and the second smoothing unit 257 are connected to the compressing unit 110. Since the operations of the units are the same, descriptions thereof are omitted here.

As described above, the image-acquisition apparatus according to this embodiment differs from the image-acquisition apparatus according to the above-described first or second embodiment in that the reduced-image creating unit 104 is disposed below the correction-coefficient calculation unit 106. In this way, in the signal processing unit 105, various types of processing, such as WB adjustment and edge enhancement, are performed on only the original image signal, whereas, in the correction-coefficient calculation unit 106, correction coefficients associated with space-variant grayscale conversion based on the reduced image signal and the area correction coefficients of the original image signal corresponding to the correction coefficients are calculated. In other words, by providing the reduced-image creating unit 104, the correction-coefficient calculation unit 106, the correction-coefficient map buffer 107, the noise estimating unit 208, and the noise reducing unit 209 as separate blocks independent from the other components, there is an advantage in that the image-acquisition apparatus can be used in various known apparatus. Similar to the image-acquisition apparatus according to the above-described first or second embodiment, the image-acquisition apparatus according to this embodiment has an advantage in that it is possible to reduce the sense of unnaturalness caused by a difference in the impression of noise in different enhanced areas when space-variant grayscale conversion is carried out.

In this embodiment, processing is carried out by hardware. However, the processing is not limited thereto. For example, it is also possible to use a configuration in which the unprocessed signal from the CCD 101 is used as Raw data, and image-acquisition information, such as ISO sensitivity, from an external I/F is extracted as header information and processed in separate software.

Figure 30:
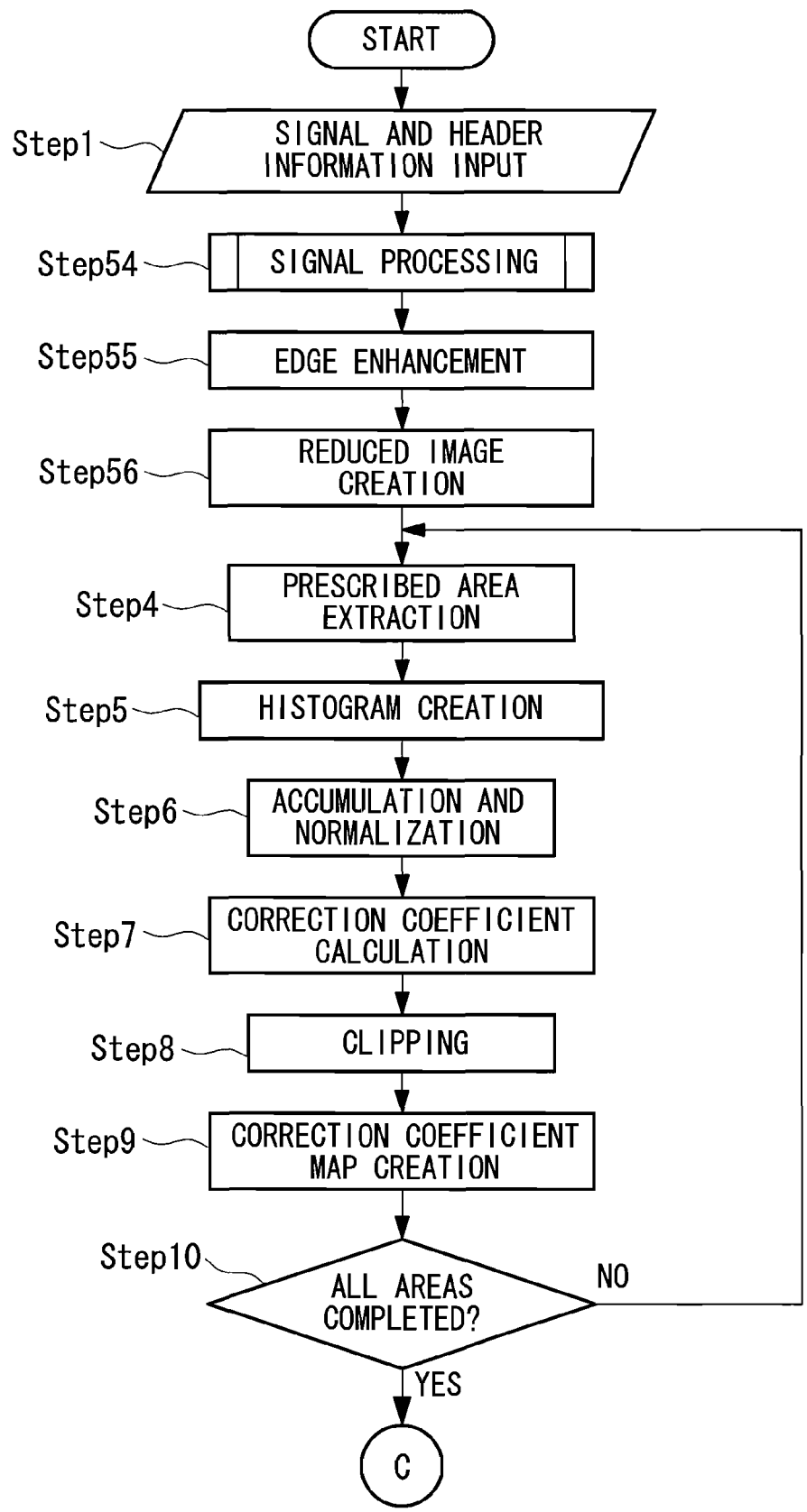
FIG. 30 is a flow chart illustrating the steps of signal processing executed by the image-acquisition apparatus according to the third embodiment of the present invention.
Figure 31:
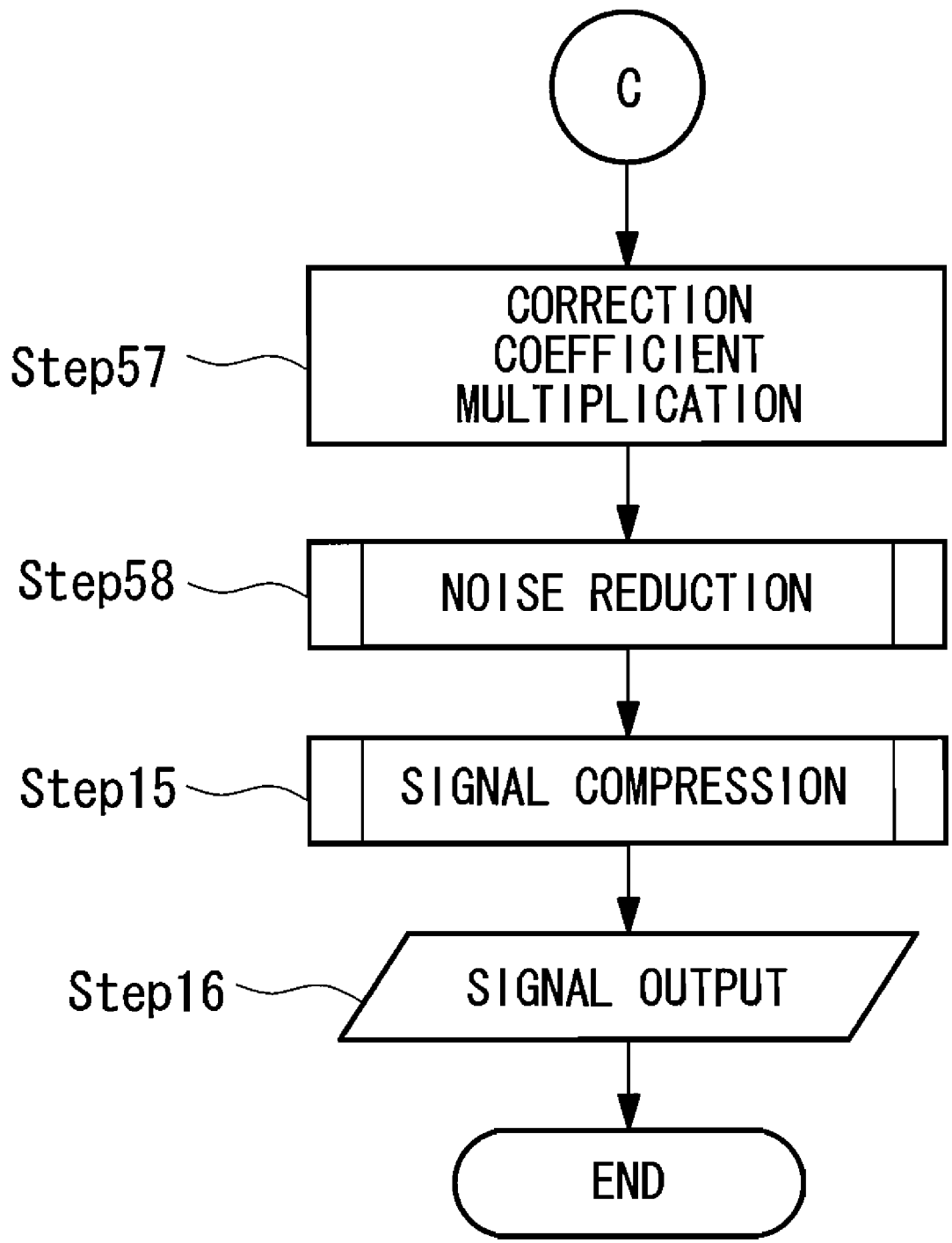
FIG. 31 is a flow chart illustrating the steps of signal processing executed by the image-acquisition apparatus according to the third embodiment of the present invention.

FIGS. 30 and 31 are flow charts illustrating the process of software signal processing. Steps that are the same as those in the flow according to the first embodiment illustrated in FIGS. 13 and 14 are represented by the same step numbers.

In Step 1 in FIG. 30, an image signal and header information including image-acquisition information, such as ISO sensitivity, are read out. In Step 54, WB adjustment, color interpolation, chroma enhancement, and grayscale conversion are carried out. In Step 55, edge correction coefficients are calculated and edge enhancement is performed. In Step 56, a reduced image for correction coefficient calculation is created. In Step 4, prescribed areas of 16 by 16 pixel units are extracted, and in Step 5, histograms are created. In Step 6, histograms created in Step 5 are accumulated, and normalization is carried out. In Step 7, a grayscale conversion curve is set on the basis of the accumulated histograms, and correction coefficients for pixels are calculated on the basis of the conversion curve.

In Step 8, clipping is performed on the calculated correction coefficients, and in Step 9, area correction coefficients for pixels corresponding to the original signal are calculated and recorded on the basis of the correction coefficients for the reduced image. In Step 10, it is determined whether extraction of all areas has been completed. If extraction is completed, the process proceeds to Step 57 in FIG. 31, whereas, if extraction is not completed, the process proceeds to Step 4. In Step 57 in FIG. 31, the image signal is multiplied by the area correction coefficients. In Step 58, noise reduction is performed on the basis of the area correction coefficients, the edge correction coefficients, and the ISO sensitivity. In Step 15, compression is performed by a signal compression technique according to the related art. In Step 16, the processed signal is output, and the process ends.

The processes of noise reduction and estimation of the amount of noise carried out in Step 58 and edge enhancement carried out in Step 55 are the same as those according to the first embodiment.

Fourth Embodiment

Next, an image-acquisition apparatus according to a fourth embodiment of the present invention will be described with reference to the drawings.

Figure 32:
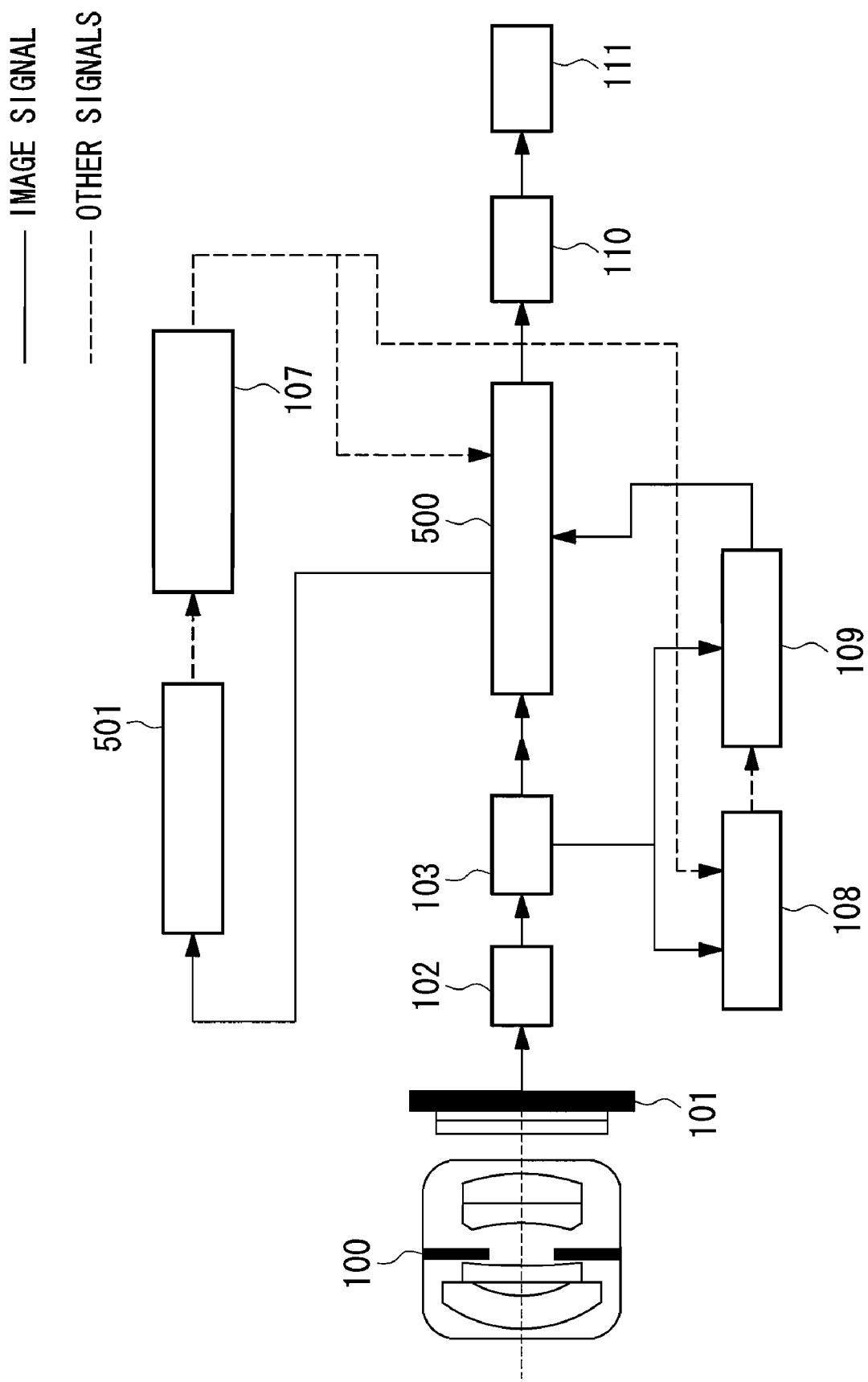
FIG. 32 is a block diagram of the overall structure of an image-acquisition apparatus according to a fourth embodiment of the present invention.

FIG. 32 is a block diagram of the overall structure of the image-acquisition apparatus according to the fourth embodiment of the present invention.

The fourth embodiment has substantially the same structure as the above-described first embodiment. However, the fourth embodiment differs from the first embodiment in that a signal processing unit 500 is included instead of the signal processing unit 105, a correction-coefficient calculation unit 501 is included instead of the correction-coefficient calculation unit 106, and the reduction-ratio setting unit 158 and the reduced-image creating unit 104 are not included.

Features of the image-acquisition apparatus according to this embodiment that are the same as those according to the first embodiment will not be described, and mainly differences will be described below. Components that are the same as those according to the first embodiment are represented by the same names and reference numerals.

In FIG. 32, a signal acquired through the lens system 100 and the CCD 101 is converted into a digital signal at the A/D converter 102. The signal from the A/D converter 102 is transferred to the signal processing unit 500, the noise estimating unit 108, and the noise reducing unit 109 via the buffer 103.

The signal processing unit 500 is connected to the correction-coefficient calculation unit 501 and the compressing unit 110. The correction-coefficient calculation unit 501 is connected to the correction-coefficient map buffer 107.

The correction-coefficient map buffer 107 is connected to the signal processing unit 500 and the noise estimating unit 108. The noise estimating unit 108 is connected to the noise reducing unit 109. The noise reducing unit 109 is connected to the signal processing unit 500. The compressing unit 110 is connected to the output unit 111.

Next, the operation of the image-acquisition apparatus according to this embodiment will be briefly described.

When the user pushes a shutter button (not shown) after image-acquisition conditions, such as ISO sensitivity, are set via an external I/F (not shown), a subject image formed by the lens system 100 is converted from an optical subject into an electric signal by the CCD 101 and is output as an analog signal. The analog signal is converted into a digital signal at the A/D converter 102 and is transferred to the buffer 103. The image signal in the buffer 103 is transferred to the signal processing unit 500. WB adjustment is performed on the image signal input to the signal processing unit 500, and then interpolation is performed to generate a triple-larger image signal. Then, after chroma enhancement is performed, the image signal is transferred to the correction-coefficient calculation unit 501. In the correction-coefficient calculation unit 501, a grayscale conversion curve is set on the basis of the target pixels in the transferred image signal or a feature quantity in prescribed areas, and grayscale conversion is performed on the basis of the grayscale conversion curve. Through grayscale conversion, correction coefficients associated with the target pixels are determined, recorded in the correction-coefficient map buffer 107, and used later in noise reduction and signal processing (for example, correction coefficient multiplication).

In this embodiment, the signal levels of the target pixels are used as a feature quantity. However, the feature quantity is not limited thereto.

The noise estimating unit 108 extracts, from the image signal input from the buffer 103, rectangular areas of a predetermined size centered on the target pixels, which are each, for example, a prescribed area of 6 by 6 pixel units in this embodiment. Subsequently, the noise estimating unit 108 estimates the amount of noise in the target pixel on the basis of the extracted prescribed areas, the area correction coefficients obtained from the correction-coefficient map buffer 107, and the ISO sensitivity set by the external I/F during image acquisition and transfers the estimated amount of noise to the noise reducing unit 109.

The noise reducing unit 109 extracts the target pixels from the image signal input from the buffer 103, performs noise reduction on the basis of the amount of noise in the target pixels estimated by the noise estimating unit 108, and transfers the noise-reduced image signal and the estimated amount of noise to the signal processing unit 500.

Upon receiving the image signal from the noise reducing unit 109, the signal processing unit 500 performs WB adjustment, interpolation, chroma enhancement, Y/C separation, and edge enhancement on the image signal. Then, the signal processing unit 500 corrects the processed image signal using the correction coefficients obtained from the correction-coefficient map buffer 107. If the level of the corrected image exceeds a specific level, the signal processing unit 500 corrects the level of the image signal by clipping so that the level is within a specific range. Then, when all of the pixels are corrected, the signal processing unit 500 transfers the image signal as a final image signal to the compressing unit 110. The compressing unit 110 compresses the processed image signal using a compression method according to the related art, and transfers the compressed image signal to the output unit 111. The output unit 111 records and stores the signal on a memory card.

Figure 33:
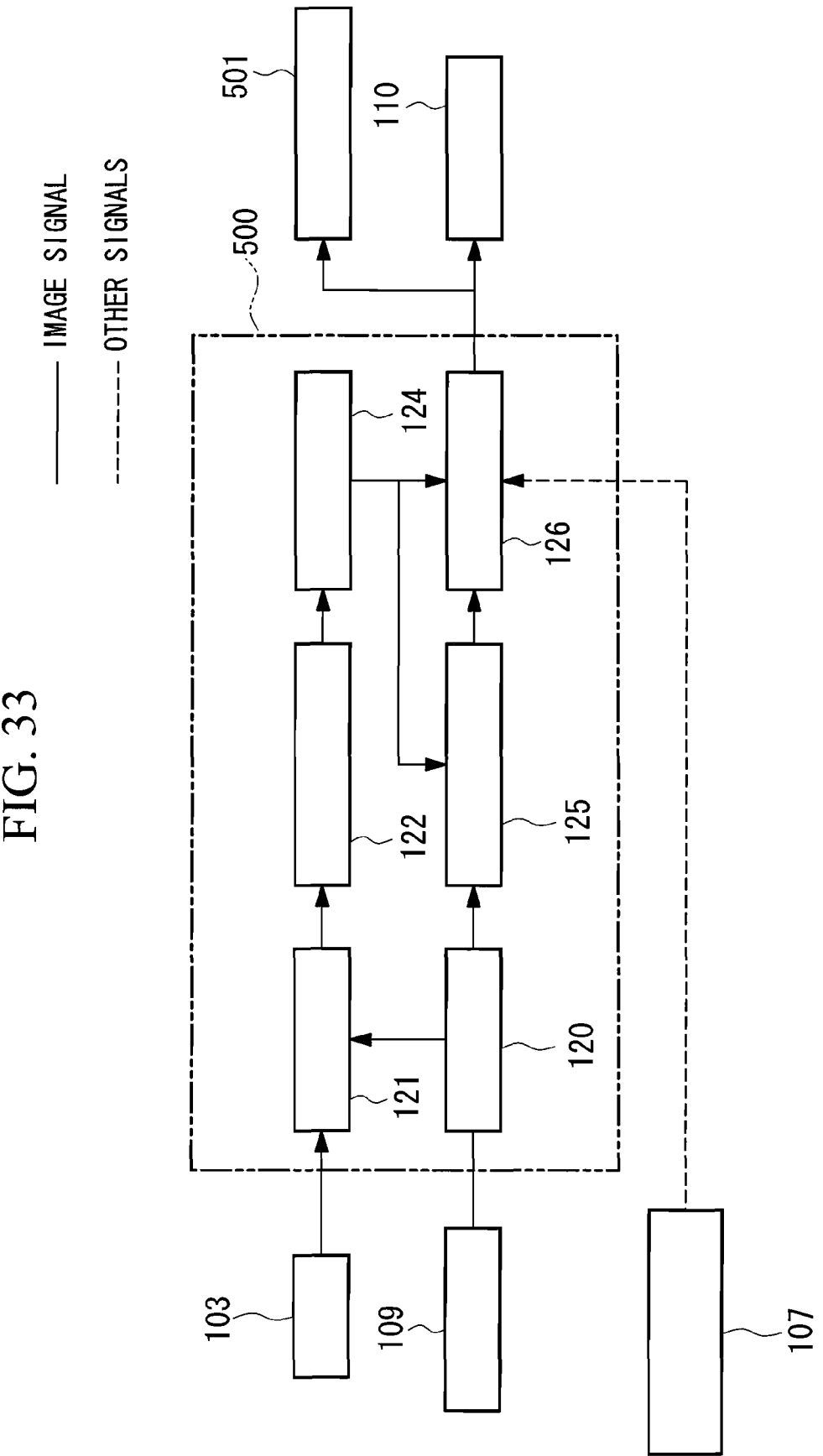
FIG. 33 is a block diagram of the overall structure of the signal processing unit shown FIG. 32.

FIG. 33 is a block diagram of an example configuration of the signal processing unit 500. As shown in the drawing, the signal processing unit 500 includes a WB unit 120, an interpolation unit 121, a chroma enhancement unit 122, a Y/C separation unit 124, an edge enhancement processing unit 125, and a correction-coefficient multiplication unit 126.

The image signal transferred from the buffer 103 or the noise reducing unit 109 is input to the WB unit 120. The WB unit 120 is connected to the interpolation unit 121 and the edge enhancement processing unit 125. The interpolation unit 121 is connected to the chroma enhancement unit 122. The chroma enhancement unit 122 is connected to the Y/C separation unit 124. The Y/C separation unit 124 is connected to the edge enhancement processing unit 125 and the correction-coefficient multiplication unit 126. The edge enhancement processing unit 125 is connected to the correction-coefficient multiplication unit 126. The correction-coefficient map buffer 107 is connected to the correction-coefficient multiplication unit 126. The correction-coefficient multiplication unit 126 is connected to the correction-coefficient calculation unit 501, and the compressing unit 110.

The WB unit 120 performs WB adjustment on the basis of image-acquisition information by multiplying each color signal by a predetermined WB coefficient. The WB-adjusted image signal is transferred to the interpolation unit 121 and the edge enhancement processing unit 125. The interpolation unit 121 performs interpolation on the WB-adjusted image signal. The interpolated image signal is transferred to the chroma enhancement unit 122. The chroma enhancement unit 122 performs chroma enhancement on each color signal from the interpolation unit 121 by performing matrix multiplication. The chroma-enhanced image signal is transferred to the Y/C separation unit 124. The Y/C separation unit 124 separates each color signal into a luminance signal Y and a color-difference signal C on the basis of the above-described Equation (1) and transfers the luminance signal Y to the edge enhancement processing unit 125 and the color-difference signal C to the correction-coefficient multiplication unit 126.

The edge enhancement processing unit 125 performs filtering on the color signals from the WB unit 120, extracts edge components, and performs edge enhancement by adding the extracted edge components to the interpolated luminance signal Y. The edge-enhanced luminance signal Y is transferred to the correction-coefficient multiplication unit 126.

When the image signal input to the signal processing unit 500 is a signal from the noise reducing unit 109, the correction-coefficient multiplication unit 126 obtains, from the correction-coefficient map buffer 107, the correction coefficients corresponding to the pixels in the luminance signal Y from the edge enhancement processing unit 125 and to the color-difference signal C from the Y/C separation unit 124, multiplies the luminance signal Y and the color-difference signal C by the correction coefficients, and transfers the processed signal to the compressing unit 110.

When the image signal input from the signal processing unit 500 is a signal from the buffer 103, the correction-coefficient multiplication unit 126 directly outputs the luminance signal Y and the color-difference signal C to the correction-coefficient calculation unit 501 without multiplying them by the correction coefficients.

Figure 34:
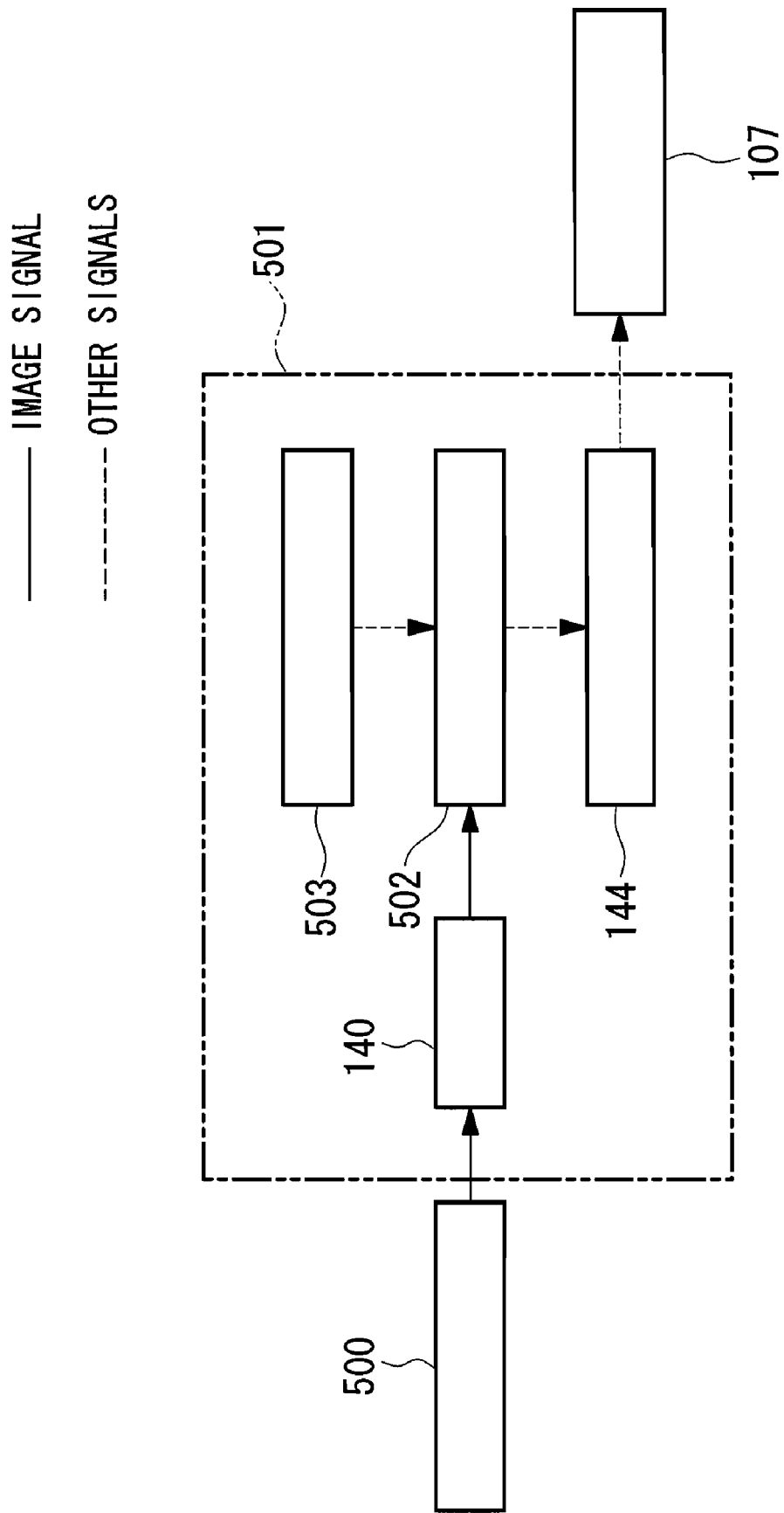
FIG. 34 is a block diagram of the overall structure of the correction-coefficient calculation unit shown in FIG. 32.

FIG. 34 is a block diagram of an example configuration of the correction-coefficient calculation unit 501. As shown in the drawing, the correction-coefficient calculation unit 501 according to this embodiment includes a buffer 140, a grayscale-conversion-curve setting unit 502, a grayscale-conversion-curve recording unit 503, and a correction-coefficient calculation unit 144.

The signal processing unit 500 is connected to the buffer 140. The buffer 140 and the grayscale-conversion-curve recording unit 503 are connected to the grayscale-conversion-curve setting unit 502. The grayscale-conversion-curve setting unit 502 is connected to the correction-coefficient calculation unit 144. The correction-coefficient calculation unit 144 is connected to the correction-coefficient map buffer 107.

The signal processing unit 500 transfers the image signal to the grayscale-conversion-curve setting unit 502 via the buffer 140. The grayscale-conversion-curve setting unit 502 selects the optimal curve from grayscale conversion curves recorded in the grayscale-conversion-curve recording unit 503 in advance on the basis of the signal level of each pixel in the image signal. In this embodiment, since the grayscale range of an image signal is 12 bits, the grayscale conversion curve has a 12-bit input and a 12-bit output. The signal level of the grayscale conversion curve is transferred to the correction-coefficient calculation unit 144.

Here, it is also possible to set the signal level of each pixel to an average signal level of the pixels in a prescribed area that is centered on a target pixel and has a predetermined size. It is also possible to calculate another feature quantity (histogram or the like) as a feature quantity associated with the grayscale conversion curve, and to associate this feature quantity with the grayscale conversion curve instead of the signal level.

The correction-coefficient calculation unit 144 calculates a grayscale conversion curve and correction coefficients for grayscale conversion on the basis of the signal level.

The correction coefficient g that is generated by grayscale conversion is represented by the above-described Equation (4), where t( ) represents the grayscale conversion curve and $AV_c$ represents the input signal level. The correction coefficient is transferred to the correction-coefficient map buffer 107 and is used for processing carried out later.

In the above-described embodiment, processing is carried out by hardware. However, the processing is not limited thereto. For example, it is also possible to use a configuration in which the unprocessed signal from the CCD 101 (see FIG. 32) is used as Raw data, and image-acquisition information, such as ISO sensitivity, from an external I/F is extracted as header information and processed in separate software.

Figure 35:
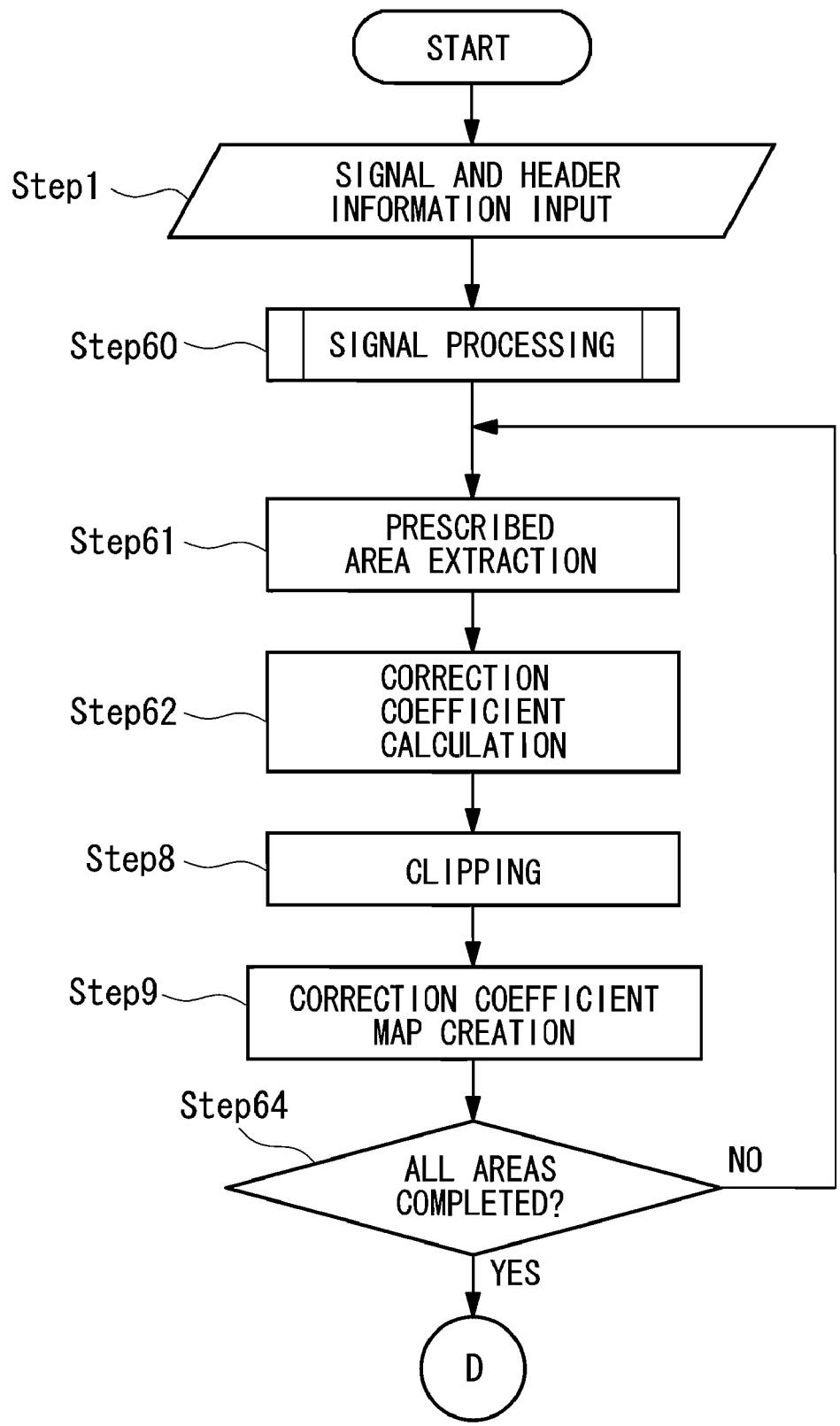
FIG. 35 is a flow chart illustrating the steps of signal processing executed by the image-acquisition apparatus according to the fourth embodiment of the present invention.
Figure 36:
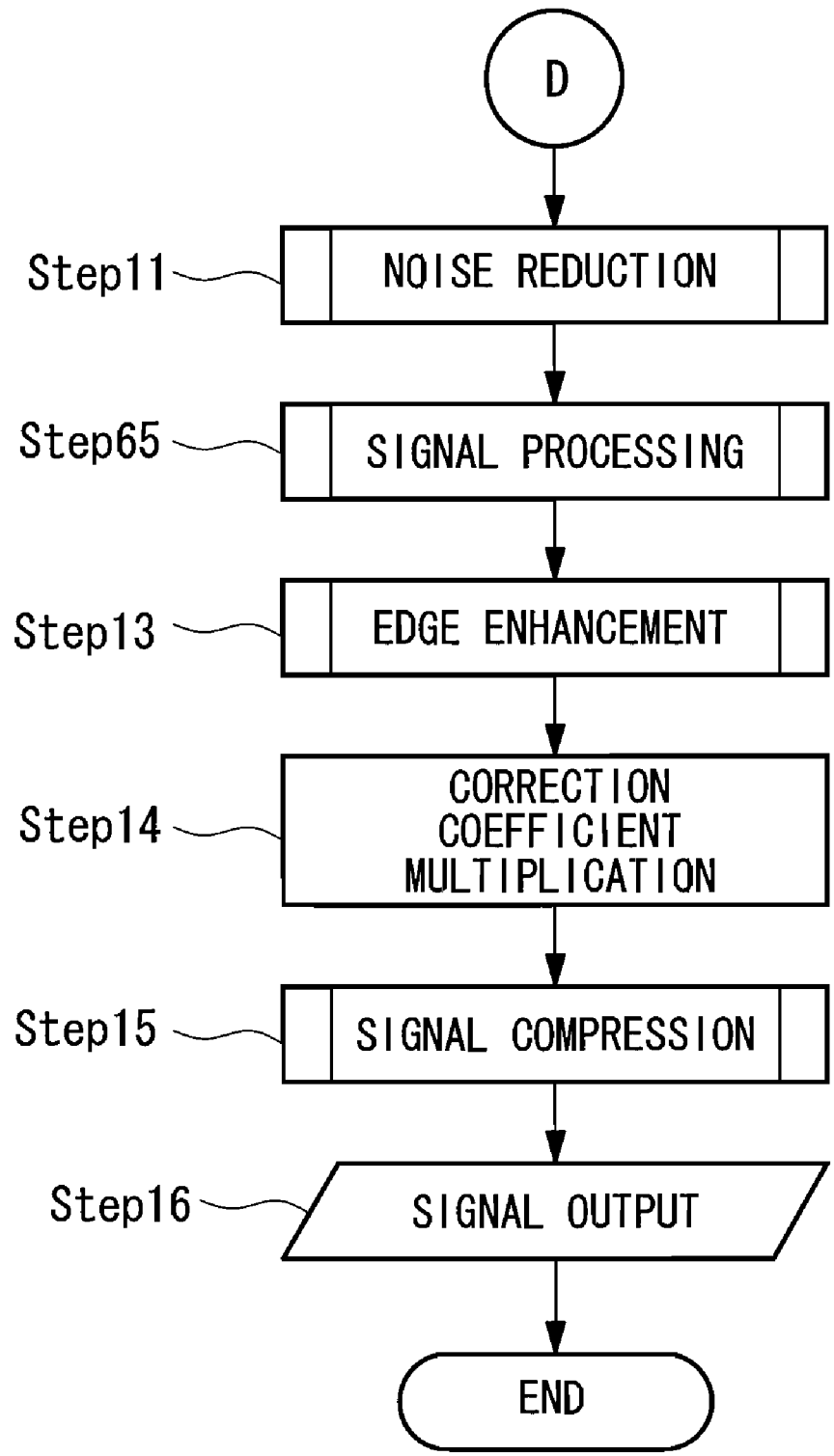
FIG. 36 is a flow chart illustrating the steps of signal processing executed by the image-acquisition apparatus according to the fourth embodiment of the present invention.

FIGS. 35 and 36 are flow charts illustrating the process of software signal processing. Steps that are the same as those in the flow according to the first embodiment illustrated in FIGS. 13 and 14 are represented by the same step number.

In Step 1 of FIG. 35, an image signal and header information including image-acquisition information, such as ISO sensitivity, are read out. In Step 60, signal processing, such as WB adjustment, color interpolation, and chroma enhancement, is carried out. In Step 61, target pixels or prescribed areas are extracted. In Step 62, a grayscale conversion curve is set on the basis of the pixel values of the target values or the average pixel values in the prescribed areas, and the correction coefficients for the pixels are calculated on the basis of the conversion curve. In Step 8, clipping is performed on the calculated correction coefficients. In Step 9, the correction coefficients are recorded. In Step 64, it is determined whether extraction of all of the pixels or all of the areas is completed. If extraction is completed, the process proceeds to Step 11 in FIG. 36, whereas, if extraction is not completed, the process returns to Step 61.

In Step 11 in FIG. 36, noise reduction is performed on the basis of the correction coefficients and the ISO sensitivity. In Step 65, WB adjustment, color interpolation, and chroma enhancement are performed. In Step 13, edge enhancement is performed. In Step 14, the image signal is multiplied by the correction coefficients. In Step 15, signal compression is performed by a signal compression technology according to the related art. In Step 16, the processed signal is output, and the process ends.

Fifth Embodiment

Next, an image-acquisition apparatus according to a fifth embodiment of the present invention will be described with reference to the drawings.

Figure 37:
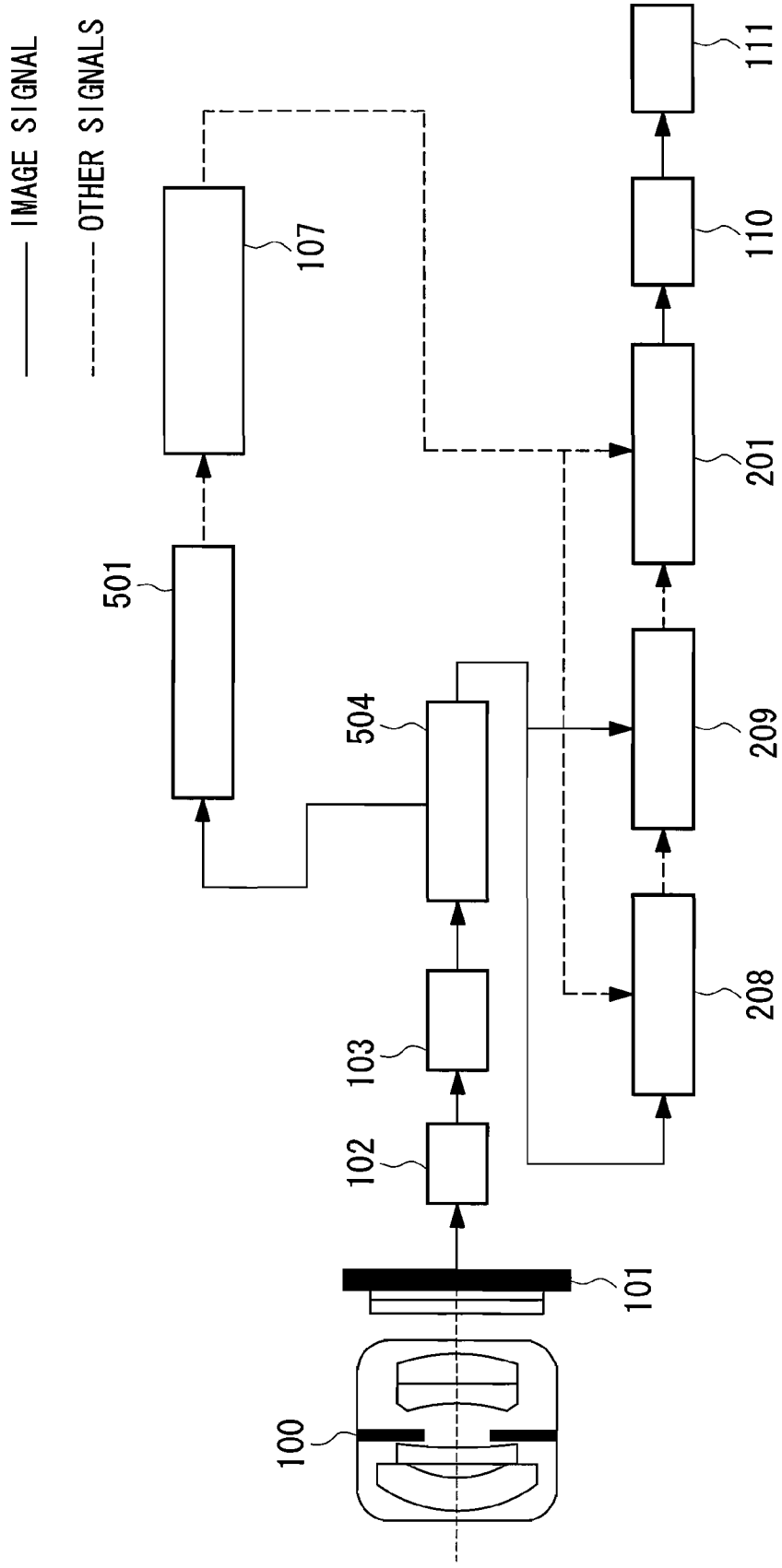
FIG. 37 is a block diagram of the overall structure of an image-acquisition apparatus according to a fifth embodiment of the present invention.

FIG. 37 a block diagram of the overall structure of the image-acquisition apparatus according to the fifth embodiment of the present invention.

The fifth embodiment has substantially the same structure as the above-described second embodiment. However, the fifth embodiment differs from the second embodiment in that a signal processing unit 504 is included instead of the signal processing unit 200, a correction-coefficient calculation unit 501 is included instead of the correction-coefficient calculation unit 106, and the reduction-ratio setting unit 158 and the reduced-image creating unit 104 are not included.

Features of the image-acquisition apparatus according to this embodiment that are the same as those according to the second embodiment will not be described, and mainly differences will be described below. Components that are the same as those according to the second embodiment are represented by the same names and reference numerals.

In FIG. 37, a signal acquired through the lens system 100 and the CCD 101 is converted into a digital signal in the A/D converter 102. The signal from the A/D converter 102 is transferred to the signal processing unit 504 via the buffer 103.

The signal processing unit 504 is connected to the correction-coefficient calculation unit 501, the noise estimating unit 208, and the noise reducing unit 209. The correction-coefficient calculation unit 501 is connected to the correction-coefficient map buffer 107.

Next, the operation of the image-acquisition apparatus according to this embodiment will be briefly described.

When the user pushes a shutter button (not shown) after image-acquisition conditions, such as ISO sensitivity, are set via an external I/F (not shown), a subject image formed by the lens system 100 is converted from an optical subject into an electric signal by the CCD 101 and is output as an analog signal. The analog signal is converted into a digital signal at the A/D converter 102 and is transferred to the buffer 103. The image signal in the buffer 103 is transferred to the signal processing unit 504.

The signal processing unit 504 performs WB adjustment, interpolation, chroma enhancement, and edge enhancement on the input image signal and transfers the processed image signal to the correction-coefficient calculation unit 501. The signal processing unit 504 calculates edge correction coefficients for the image signal during edge enhancement. The edge correction coefficients are used for noise reduction performed later.

The correction-coefficient calculation unit 501 calculates correction coefficients and records these in the correction-coefficient map buffer 107. The correction-coefficient calculation unit 501 has the same function as the correction-coefficient calculation unit 501 according to the above-described fourth embodiment. Therefore, a detailed description of correction coefficient calculation will be omitted here. The correction coefficients are used for noise reduction and other signal processing (for example, correction coefficient multiplication) to be carried out later.

The noise estimating unit 208 extracts, from the processed image signal transferred from the signal processing unit 504, a rectangular area of a predetermined size centered on a target pixel, which is, for example, a prescribed area of 3 by 3 pixel units in this embodiment. The noise estimating unit 208 estimates the amounts of noise in the target pixels on the basis of the extracted prescribed areas, the area correction coefficients obtained from the correction-coefficient map buffer 107, and ISO sensitivity set by an external I/F during image acquisition and transfers the estimated amounts of noise to the noise reducing unit 209.

The noise reducing unit 209 performs noise reduction on the target pixels extracted from the image signal transferred from the signal processing unit 504 on the basis of the amount of noise from the noise estimating unit 208 and the edge correction coefficients calculated during the edge reduction process. The noise-reduced image signal is transferred to the correction-coefficient multiplication unit 201.

The correction-coefficient multiplication unit 201 obtains the correction coefficients from the correction-coefficient map buffer 107 and uses these correction coefficients to correct the image signal from the noise reducing unit 209. Upon completing the correction of all pixels, the correction-coefficient multiplication unit 201 transfers the processed image signal to the compressing unit 110 as a final image signal.

Figure 38:
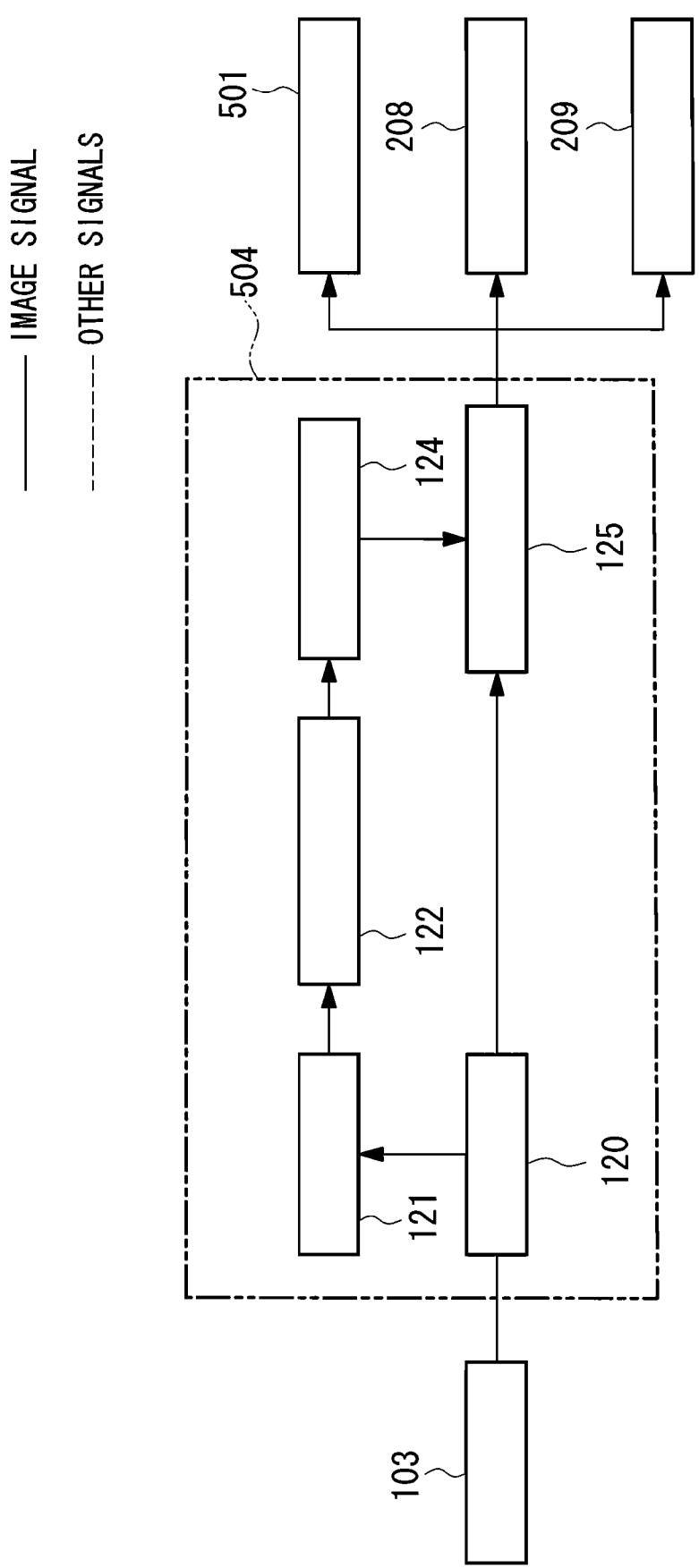
FIG. 38 is a block diagram of the overall structure of the signal processing unit shown FIG. 37.

FIG. 38 is a block diagram of an example configuration of the signal processing unit 504. As shown in the drawing, the signal processing unit 504 includes a WB unit 120, an interpolation unit 121, a chroma enhancement unit 122, a Y/C separation unit 124, and an edge enhancement processing unit 125.

The buffer 103 is connected to the WB unit 120. The WB unit 120 is connected to the interpolation unit 121 and the edge enhancement processing unit 125. The interpolation unit 121 is connected to the chroma enhancement unit 122. The chroma enhancement unit 122 is connected to the Y/C separation unit 124. The Y/C separation unit 124 is connected to the edge enhancement processing unit 125. The edge enhancement processing unit 125 is connected to the correction-coefficient calculation unit 501, the noise estimating unit 208, and the noise reducing unit 209.

The WB unit 120 carries out WB adjustment by multiplying each color signal by a predetermined WB coefficient on the basis of image-acquisition information. The WB-adjusted image signal is transferred to the interpolation unit 121 and the edge enhancement processing unit 125. The interpolation unit 121 carries out interpolation on the WB-adjusted image signal. The interpolated image signal is transferred to the chroma enhancement unit 122. The chroma enhancement unit 122 carries out chroma enhancement by performing matrix multiplication on each color signal from the interpolation unit 121. The chroma-enhanced signal is transferred to the Y/C separation unit 124. The Y/C separation unit 124 separates each color signal into a luminance signal Y and a color-difference signal C on the basis of Equations (1). The separated luminance signal Y and the color-difference signal C are transferred to the edge enhancement processing unit 125.

The edge enhancement processing unit 125 carries out edge enhancement by filtering the color signal from the WB unit 120, extracting the edge component, and adding the edge component to the interpolated luminance signal Y. When the image signal transferred from the buffer 103 to the signal processing unit 504 is the original image signal, the edge enhancement processing unit 125 calculates the edge correction coefficients from the edge components and uses the edge correction coefficients in noise reduction to be performed later.

The edge-enhanced luminance signal Y is transferred, together with the color-difference signal C separated at the Y/C separation unit 124, to the correction-coefficient calculation unit 501, the noise estimating unit 208, and the noise reducing unit 209.

In the above-described embodiment, processing is carried out by hardware. However, the processing is not limited thereto. For example, it is also possible to use a configuration in which the unprocessed signal from the CCD 101 (see FIG. 37) is used as Raw data, and image-acquisition information, such as ISO sensitivity, from an external I/F is extracted as header information and processed in separate software.

Figure 24:
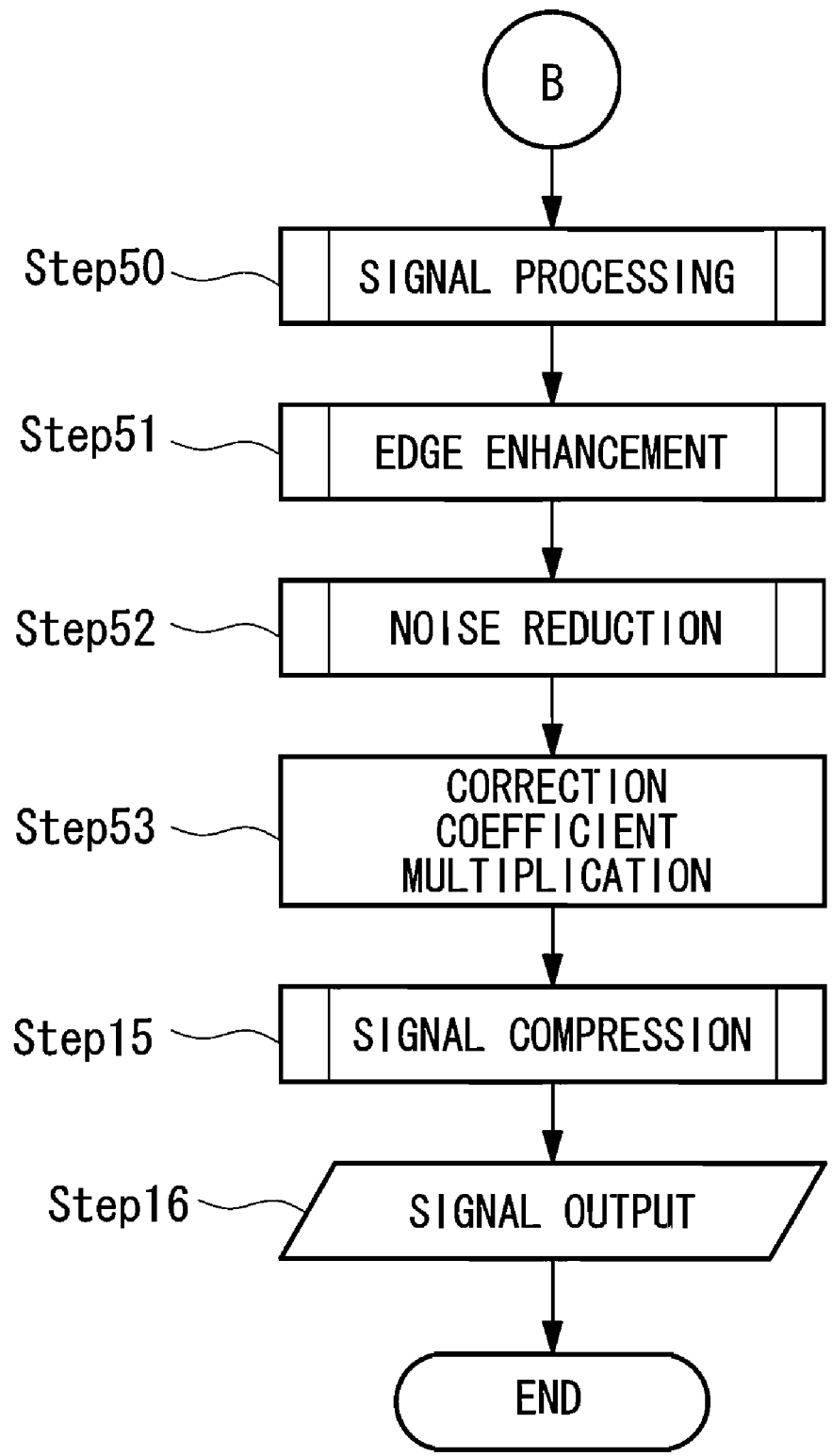
FIG. 24 is a flow chart illustrating the steps of signal processing executed by the image-acquisition apparatus according to the second embodiment of the present invention.
Figure 39:
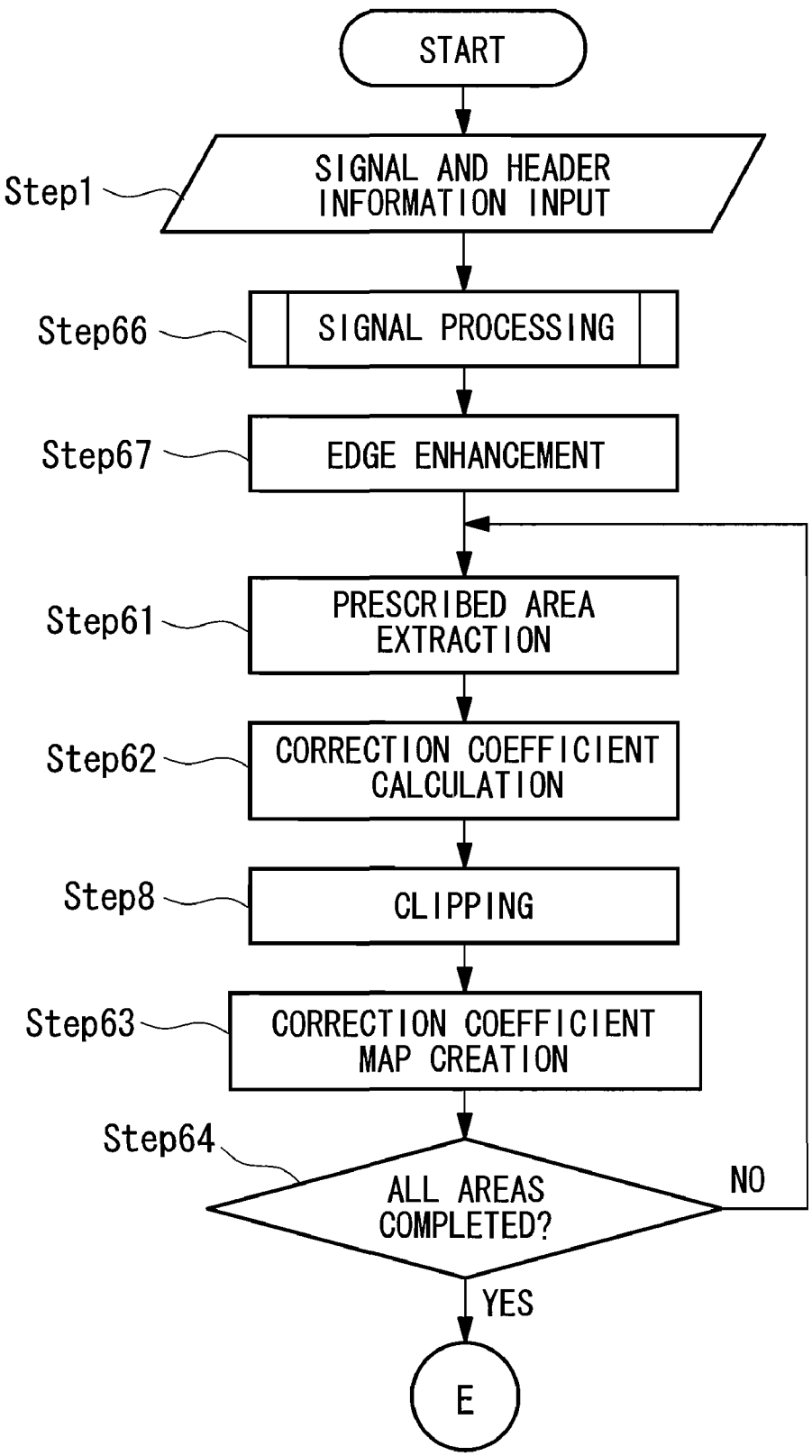
FIG. 39 is a flow chart illustrating the steps of signal processing executed by the image-acquisition apparatus according to the fifth embodiment of the present invention.
Figure 40:
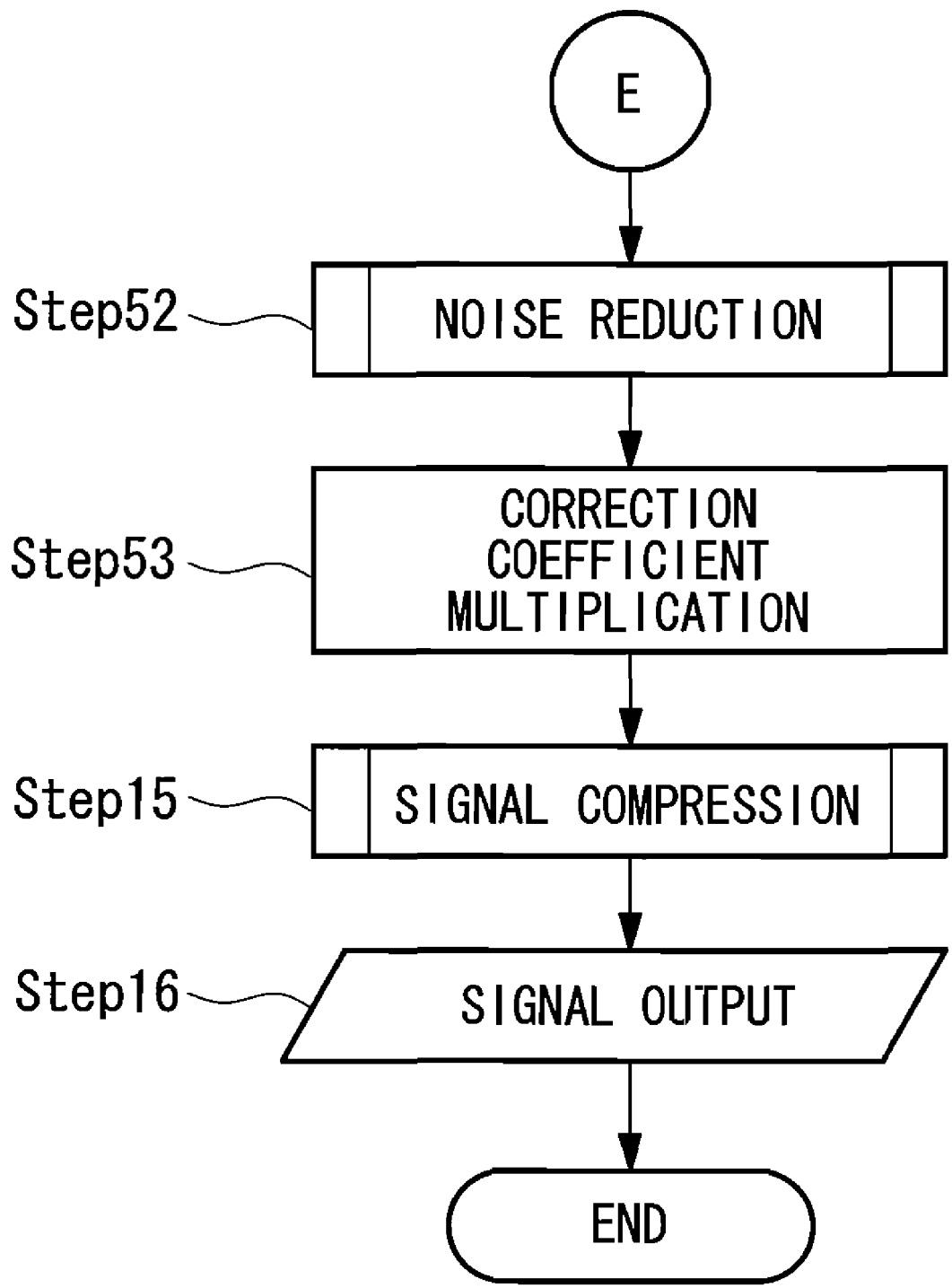
FIG. 40 is a flow chart illustrating the steps of signal processing executed by the image-acquisition apparatus according to the fifth embodiment of the present invention.

FIGS. 39 and 40 are flow charts illustrating the process of software signal processing. Steps that are the same as those in the flow according to the second embodiment illustrated in FIGS. 23 and 24 are represented by the same step number.

In Step 1 of FIG. 39, an image signal and header information including image-acquisition information, such as ISO sensitivity, are read out. In Step 66, signal processing, such as WB adjustment, color interpolation, and chroma enhancement, is performed. In Step 67, edge correction coefficient calculation and edge enhancement are performed. In Step 61, target pixels or prescribed areas are extracted. In Step 62, a grayscale conversion curve is set on the basis of the pixel values of the target pixels or the average pixel values in the prescribed areas, and then, correction coefficients for the pixels are calculated on the basis of the conversion curve. In Step 8, clipping is performed on the calculated correction coefficients. In Step 63, the correction coefficients are recorded. In Step 64, it is determined whether extraction of all of the pixels or all of the areas is completed. If it is determined that extraction is completed, the process proceeds to Step 52 in FIG. 40, whereas if it is determined that extraction is not completed, the process returns to Step 61.

In Step 52 in FIG. 40, noise reduction is performed on the basis of the correction coefficients, the edge correction coefficients, and the ISO sensitivity. In Step 53, the image signal is multiplied by the correction coefficients. In Step 15, signal compression is performed by a signal compression technology according to the related art. In Step 16, the processed signal is output, and the process ends.

The noise reduction in Step 52 and the edge enhancement in Step 67 are the same as those according to the second embodiment.

Sixth Embodiment

Next, an image-acquisition apparatus according to a sixth embodiment of the present invention will be described with reference to the drawings.

Figure 41:
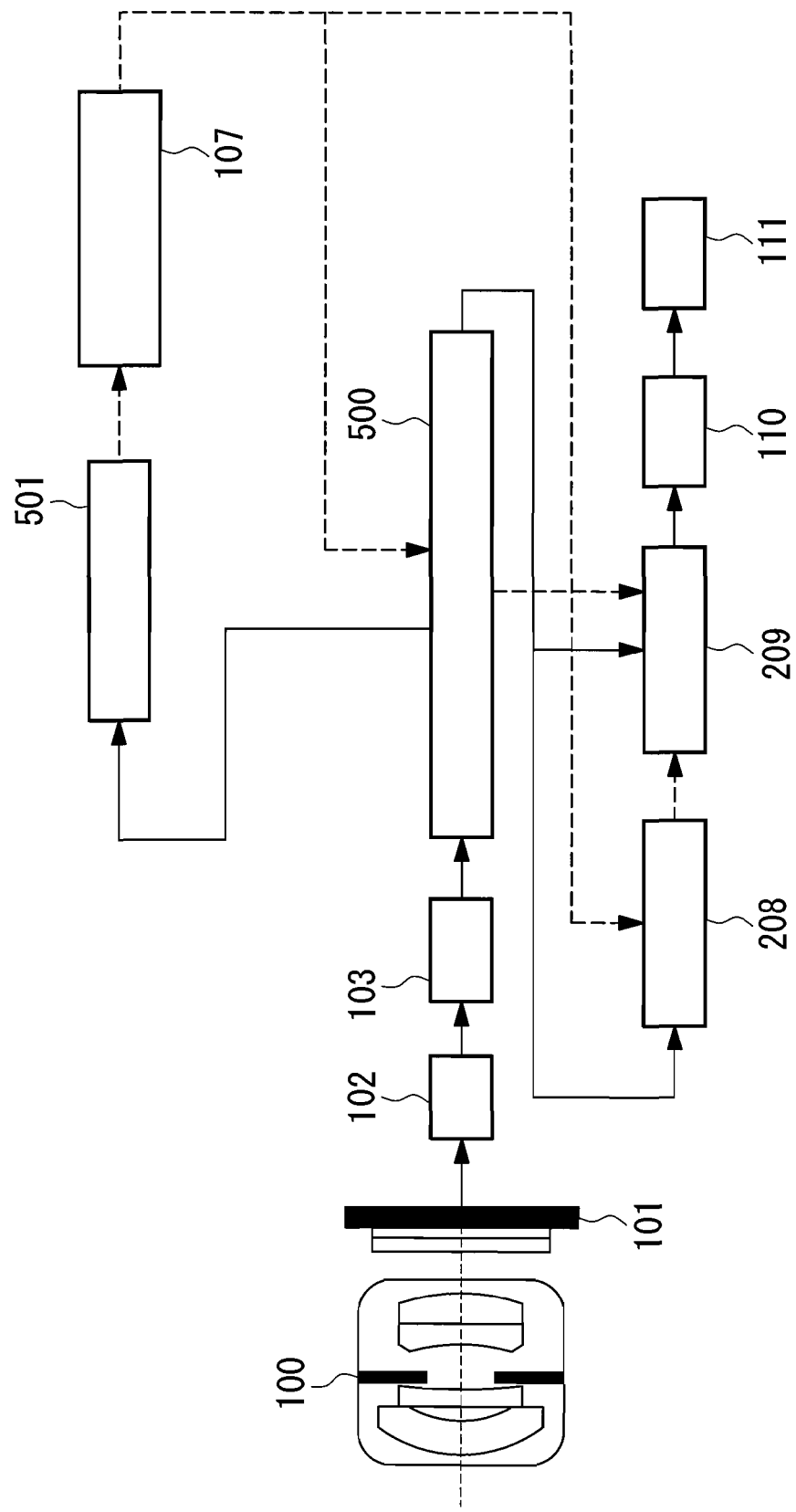
FIG. 41 is a block diagram of the overall structure of an image-acquisition apparatus according to a sixth embodiment of the present invention.

FIG. 41 is a block diagram of the overall structure of the image-acquisition apparatus according to the sixth embodiment of the present invention.

The sixth embodiment has substantially the same structure as the above-described third embodiment. However, the sixth embodiment differs from the third embodiment in that a signal processing unit 500 is included instead of the signal processing unit 105, a correction-coefficient calculation unit 501 is included instead of the correction-coefficient calculation unit 106, and the reduction-ratio setting unit 158 and the reduced-image creating unit 104 are not included.

Features of the image-acquisition apparatus according to this embodiment that are the same as those according to the third embodiment will not be described, and mainly differences will be described below. Components that are the same as those according to the third embodiment are represented by the same names and reference numerals.

In FIG. 41, a signal acquired through the lens system 100 and the CCD 101 is converted into a digital signal in the A/D converter 102. The signal from the A/D converter 102 is transferred to the signal processing unit 500 via the buffer 103. The signal processing unit 500 is connected to the noise estimating unit 208, the noise reducing unit 209, and the correction-coefficient calculation unit 501.

The correction-coefficient calculation unit 501 is connected to the correction-coefficient map buffer 107. The correction-coefficient map buffer 107 is connected to the signal processing unit 500 and the noise estimating unit 208.

The noise estimating unit 208 is connected to the noise reducing unit 209. The noise reducing unit 209 is connected to the compressing unit 110. The compressing unit 110 is connected to the output unit 111, such as a memory card.

Next, the operation of the image-acquisition apparatus according to this embodiment will be briefly described.

When the user pushes a shutter button (not shown) after image-acquisition conditions, such as ISO sensitivity, are set via an external I/F (not shown), a subject image formed by the lens system 100 is converted from an optical subject into an electric signal by the CCD 101 and is output as an analog signal. The analog signal is converted into a digital signal at the A/D converter 102 and is transferred to the buffer 103. The signal processing unit 500 reads out the image signal from the buffer 103, performs WB adjustment, interpolation, chroma enhancement, edge enhancement, and so on, and transfers the processed image signal to the correction-coefficient calculation unit 501. The signal processing unit 500 calculates edge correction coefficients for the image signal during edge enhancement. The edge correction coefficients are used in noise reduction to be performed later.

The correction-coefficient calculation unit 501 calculates correction coefficients for the transferred image signal and records the calculated correction coefficients in the correction-coefficient map buffer 107. The method of calculating the correction coefficients used by the correction-coefficient calculation unit 501 is the same as that used by the correction-coefficient calculation unit 501 according to the above-described fourth embodiment. The correction coefficients are used in signal processing (for example, correction coefficient multiplication) and noise reduction.

The signal processing unit 500 multiplies the edge-enhanced image signal by the correction coefficients obtained from the correction-coefficient map buffer 107 and to correct all of the pixels. The corrected signal is transferred to the noise estimating unit 208 and the noise reducing unit 209.

The noise estimating unit 208 extracts, from the processed image signal input from the signal processing unit 500, rectangular areas of a predetermined size centered on a target pixel, which, for example, in this embodiment, are each a prescribed area of 5 by 5 pixel units. The noise estimating unit 208 estimates the amounts of noise in the target pixels on the basis of the extracted prescribed areas, the correction coefficients obtained from the correction-coefficient map buffer 107, and ISO sensitivity set via an external I/F during image acquisition and transfers the estimated amounts of noise to the noise reducing unit 209.

The noise reducing unit 209 performs noise reduction on the target pixels extracted from the image signal from the signal processing unit 500 on the basis of the amount of noise from the noise estimating unit 208 and the edge correction coefficients calculated during edge enhancement. The noise-reduced image signal is transferred to the compressing unit 110, where it is compressed, and the compressed image signal is recorded on the output unit 111, such as a memory card.

In this embodiment, processing is carried out by hardware. However, the processing is not limited thereto. For example, it is also possible to use a configuration in which the unprocessed signal from the CCD 101 (see FIG. 41) is used as Raw data, and image-acquisition information, such as ISO sensitivity, from an external I/F is extracted as header information and processed in separate software.

Figure 42:
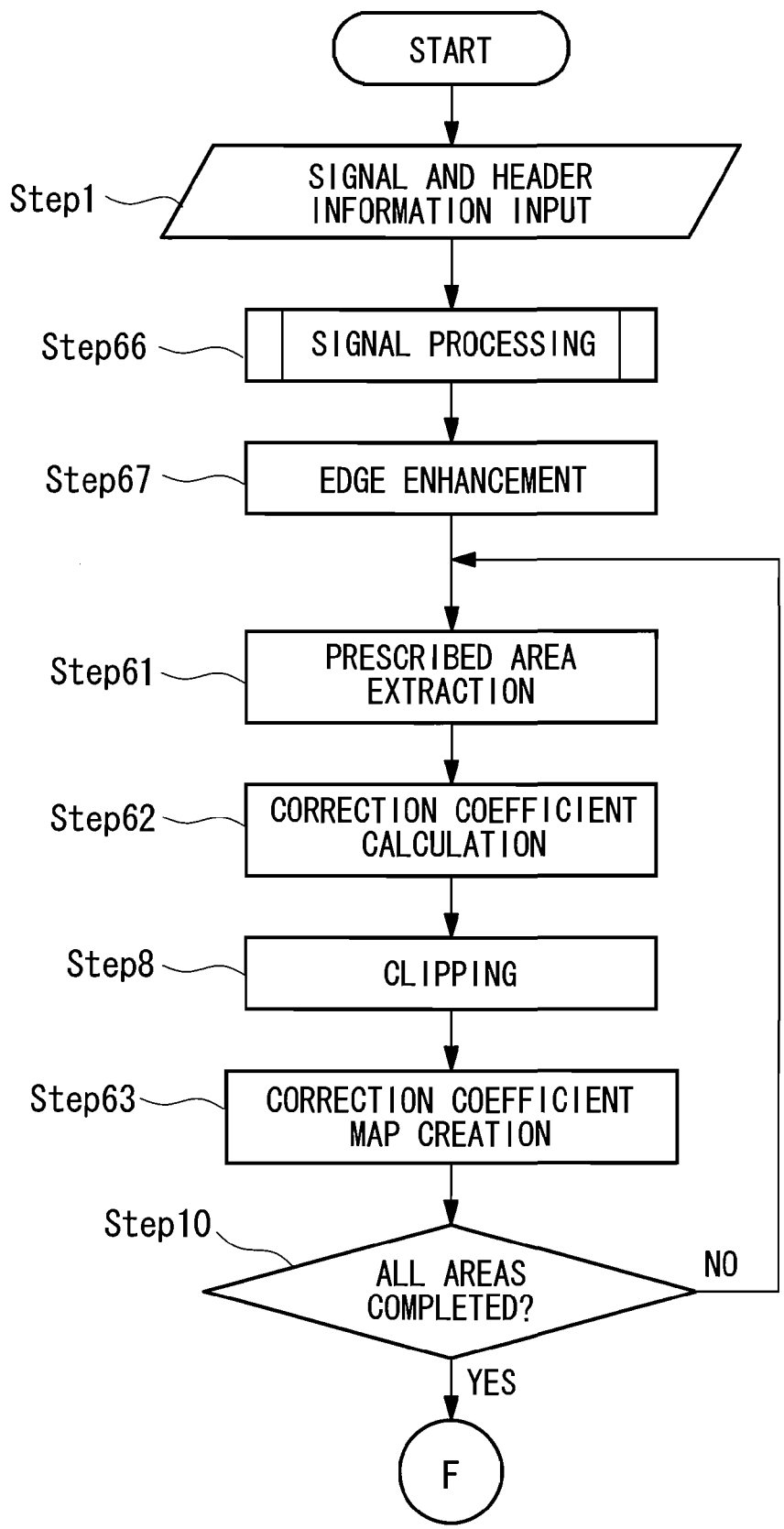
FIG. 42 is a flow chart illustrating the steps of signal processing executed by the image-acquisition, apparatus according to the sixth embodiment of the present invention.
Figure 43:
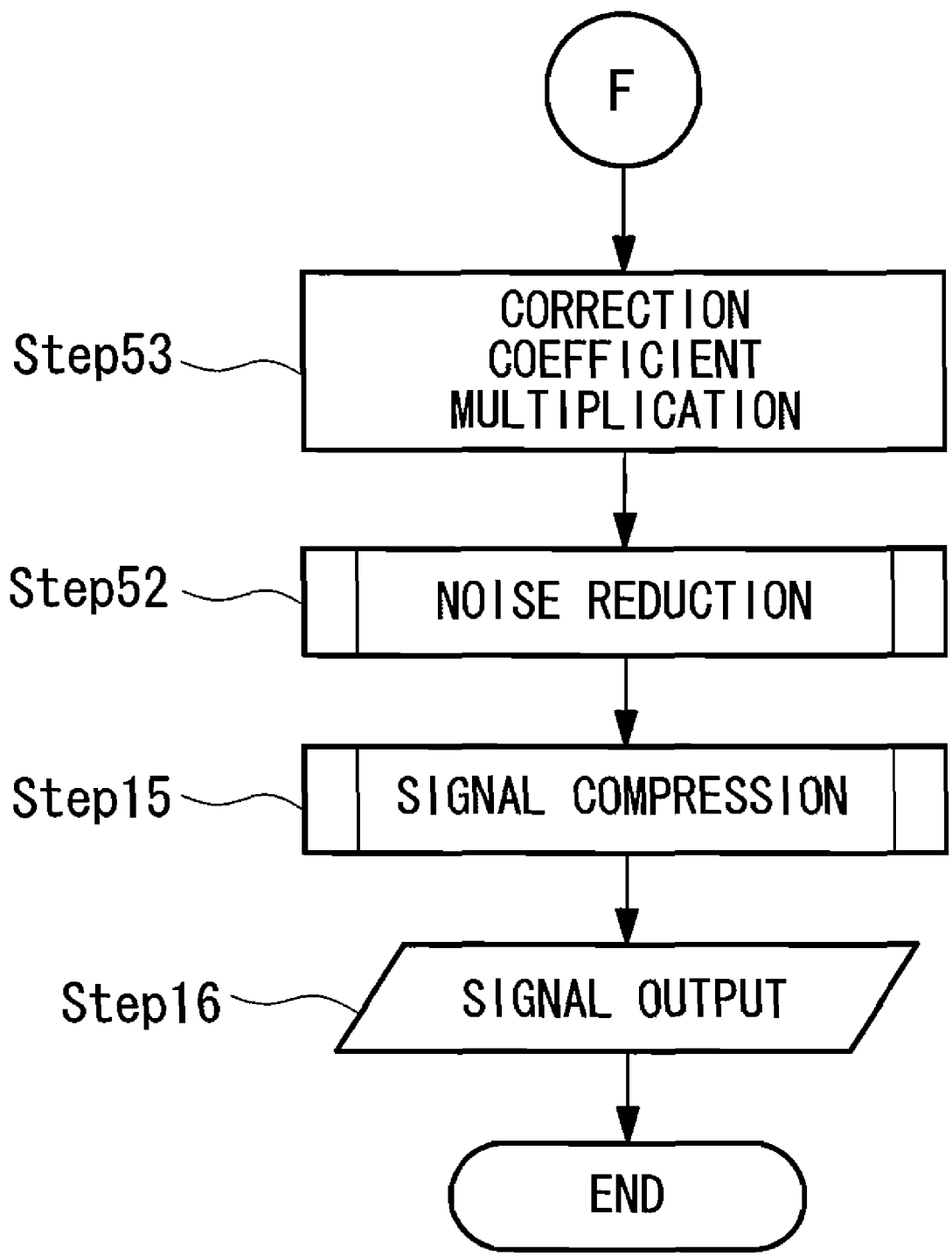
FIG. 43 is a flow chart illustrating the steps of signal processing executed by the image-acquisition apparatus according to the sixth embodiment of the present invention.

FIGS. 42 and 43 are flow charts illustrating the process of software signal processing. Steps that are the same as those in the flow according to the third embodiment illustrated in FIGS. 30 and 31 are represented by the same step number.

In Step 1 in FIG. 42, an image signal and header information including image-acquisition information, such as ISO sensitivity, are read out. In Step 66, signal processing, such as WB adjustment, color interpolation, and chroma enhancement, is carried out. In Step 67, edge correction coefficients are calculated and edge enhancement is performed. In Step 61, target pixels or prescribed areas are extracted. In Step 62, a grayscale conversion curve is set on the basis of the pixel values of the target pixels or the average pixel values in the prescribed areas, and then, correction coefficients for the pixels are calculated on the basis of the conversion curve. In Step 8, clipping is performed on the calculated correction coefficients. In Step 63, the correction coefficients are recorded. In Step 10, it is determined whether extraction of all of the pixels or all of the areas is completed. If it is determined that extraction is completed, the process proceeds to Step 53 in FIG. 43, whereas if it is determined that extraction is not completed, the process returns to Step 61.

In Step 53 in FIG. 43, the image signal is multiplied by the correction coefficients. In Step 52, noise reduction is performed on the basis of the correction coefficients, edge correction coefficients, and the ISO sensitivity.

In Step 15, signal compression is performed by a signal compression technology according to the related art. In Step 16, the processed signal is output, and the process ends.

The noise reduction in Step 52 and the edge enhancement in Step 67 are the same as those according to the above-described third embodiment.

The invention claimed is:

1. An image processing apparatus for performing grayscale conversion on each area in an image, the image processing apparatus comprising:
    a correction-coefficient calculation unit for calculating area correction coefficients from a first image signal, the area correction coefficients being correction coefficients for each area that are used for grayscale conversion of each area;
    a conversion unit for performing grayscale conversion of each area in the first image signal using the area correction coefficients; and
    a noise reducing unit for performing noise reduction on the first image signal obtained through the grayscale conversion using the area correction coefficients.

2. The image-acquisition apparatus according to claim 1, wherein the noise reducing unit includes noise-estimating unit for estimating an amount of noise in the image signal obtained through the grayscale conversion and a smoothing unit for performing smoothing on the basis of the amount of noise and the area correction coefficients, and performs noise reduction by smoothing.

* * * * *